US008749646B2

(12) United States Patent
Mitsunaga

(10) Patent No.: US 8,749,646 B2
(45) Date of Patent: Jun. 10, 2014

(54) IMAGE PROCESSING APPARATUS, IMAGING APPARATUS, SOLID-STATE IMAGING DEVICE, IMAGE PROCESSING METHOD AND PROGRAM

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 723 days.

(21) Appl. No.: 12/551,705

(22) Filed: Sep. 1, 2009

(65) Prior Publication Data

US 2010/0053346 A1  Mar. 4, 2010

(30) Foreign Application Priority Data

Sep. 3, 2008  (JP) ................................ P2008-225483

(51) Int. Cl.
*H04N 5/228* (2006.01)
(52) U.S. Cl.
USPC ....................................... 348/208.6; 348/241
(58) Field of Classification Search
USPC ....................................................... 348/208.6
See application file for complete search history.

(56) References Cited

U.S. PATENT DOCUMENTS

| 7,349,119 | B2* | 3/2008 | Tsukioka | 358/1.18 |
| 7,548,689 | B2* | 6/2009 | Yap et al. | 396/234 |
| 7,557,832 | B2* | 7/2009 | Lindenstruth et al. | 348/208.99 |
| 7,639,889 | B2* | 12/2009 | Steinberg et al. | 382/255 |
| 7,825,969 | B2* | 11/2010 | Tico et al. | 348/273 |
| 8,059,174 | B2* | 11/2011 | Mann et al. | 348/273 |
| 2007/0058073 | A1* | 3/2007 | Steinberg et al. | 348/362 |
| 2008/0166115 | A1* | 7/2008 | Sachs et al. | 396/55 |
| 2008/0253758 | A1* | 10/2008 | Yap et al. | 396/234 |
| 2009/0115856 | A1* | 5/2009 | Washisu | 348/208.1 |
| 2011/0050950 | A1* | 3/2011 | Nomura | 348/224.1 |

FOREIGN PATENT DOCUMENTS

| JP | 4-216534 | 8/1992 |
| JP | 2000-298300 | 10/2000 |
| JP | 2004-56573 | 2/2004 |
| JP | 2008-66937 | 3/2008 |
| JP | 2008-109176 | 5/2008 |
| JP | 2008-153917 | 7/2008 |
| WO | WO 02/056603 A1 | 7/2002 |
| WO | WO 2007/119680 A1 | 10/2007 |

OTHER PUBLICATIONS

M. Ben-Ezra et al., "Motion Deblurring Using Hybrid Imaging", Proceedings of IEEE International Conference on Comuter Vision and Pattern Recognition, vol. I, pp. 657-664 (2003).
L. Yuan et al., "Image Deblurring with Burred/Noisy Image Pairs", Proceeding of ACM SIGGRAPH 2007, Article 1, 10 pages (2007).

* cited by examiner

*Primary Examiner* — Twyler Haskins
*Assistant Examiner* — Fayez Bhuiyan
(74) *Attorney, Agent, or Firm* — Finnegan Henderson Farabow Garrett & Dunner LLP

(57) ABSTRACT

An image processing apparatus includes: a shaking estimating unit configured to estimate the shaking information of an image generated within a predetermined period of time; a short-time-exposure shaking correcting unit configured to correct the shaking of a plurality of short-time-exposure images generated due to intermittent exposure within the predetermined period of time based on the estimated shaking information; a long-time-exposure shaking correcting unit configured to correct the shaking of a long-time-exposure image generated due to consecutive exposure within the predetermined period of time based on the estimated shaking information; and an image synthesizing unit configured to synthesize the corrected short-time-exposure images and the corrected long-time-exposure image.

17 Claims, 37 Drawing Sheets

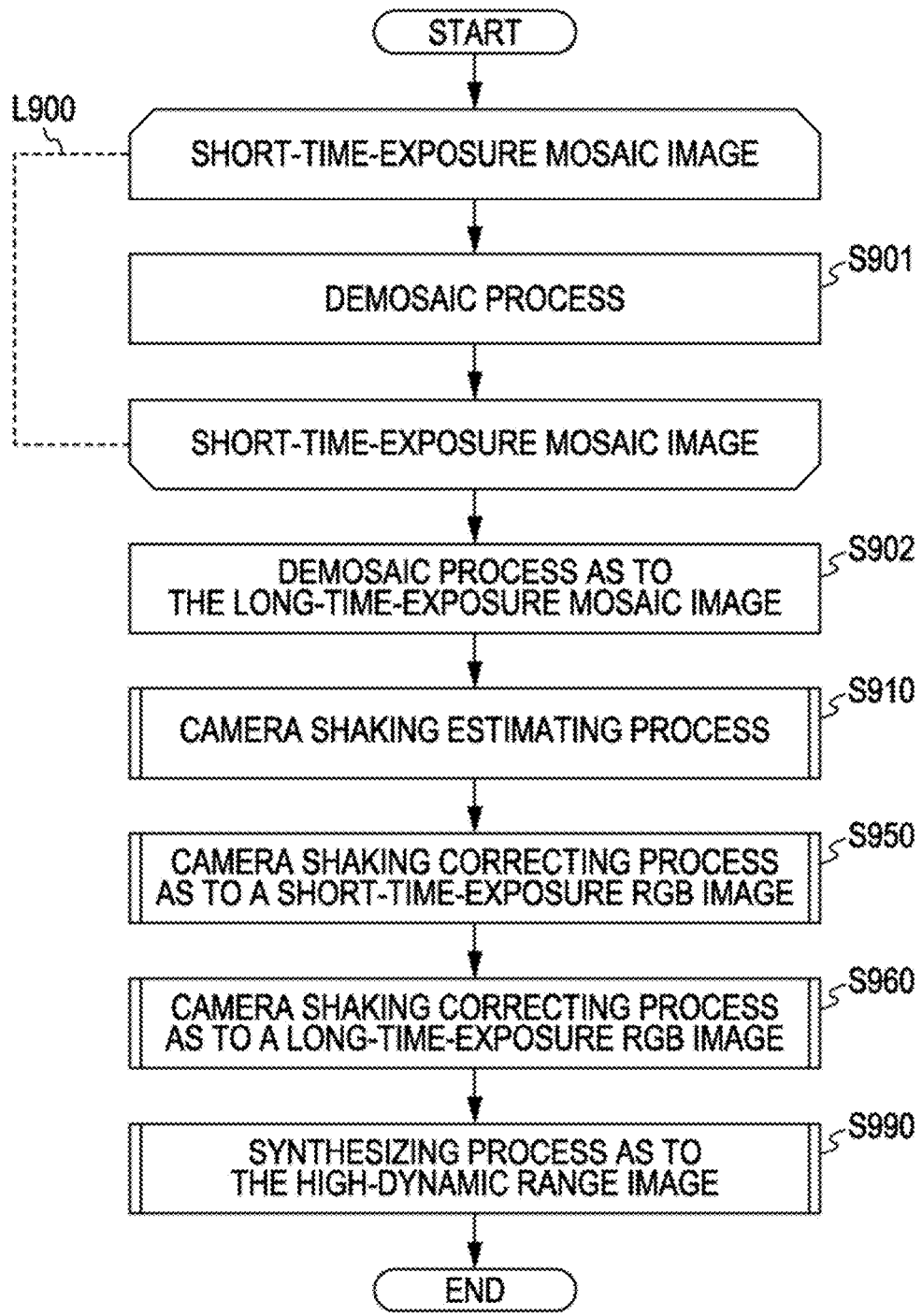

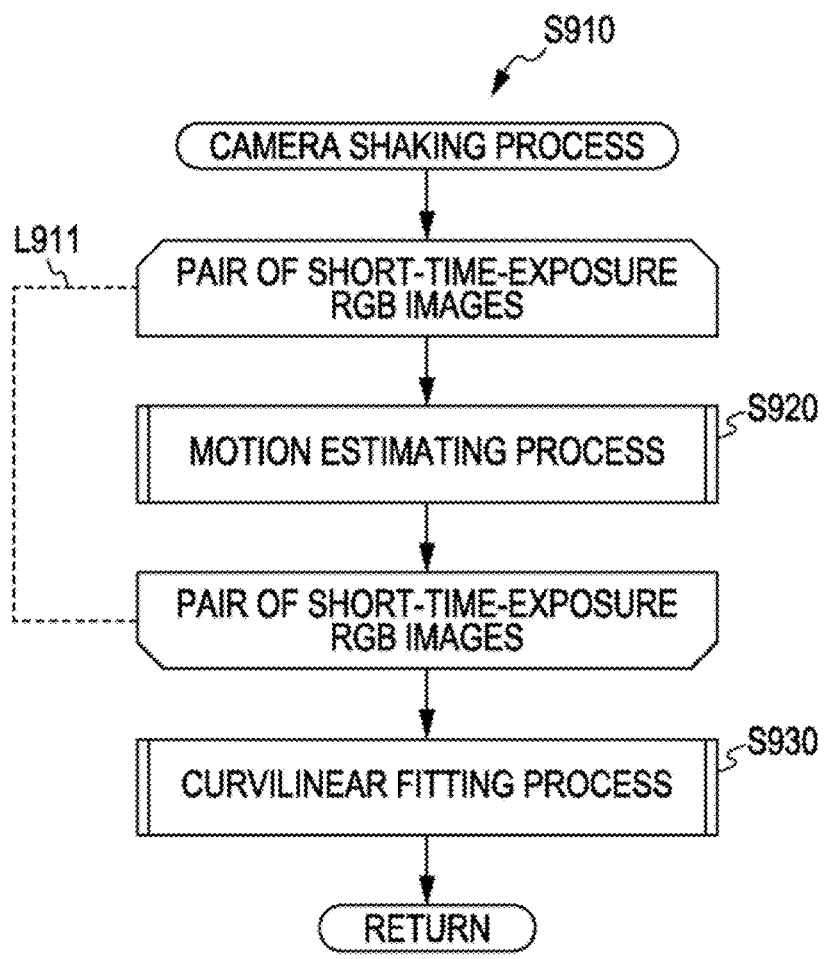

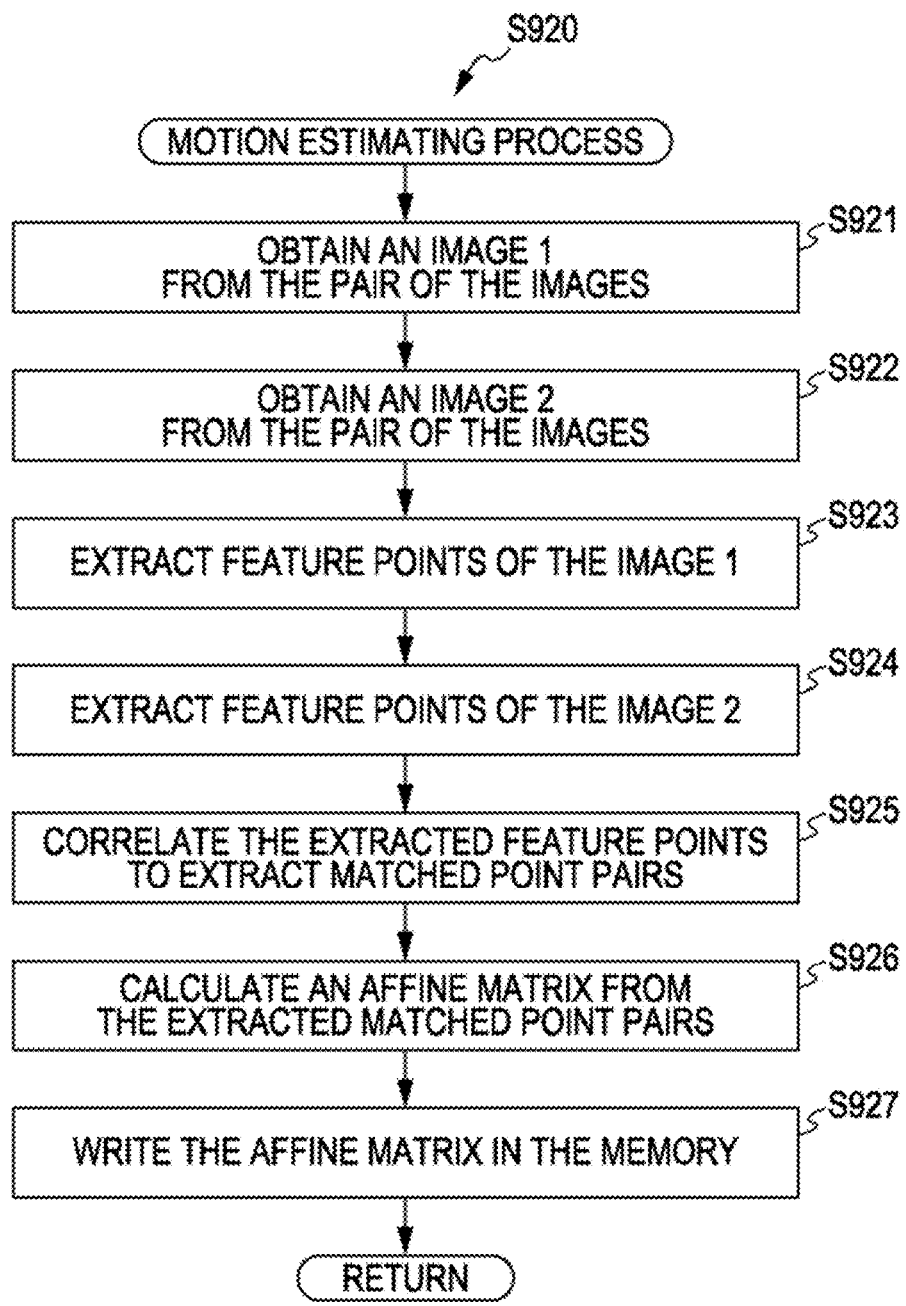

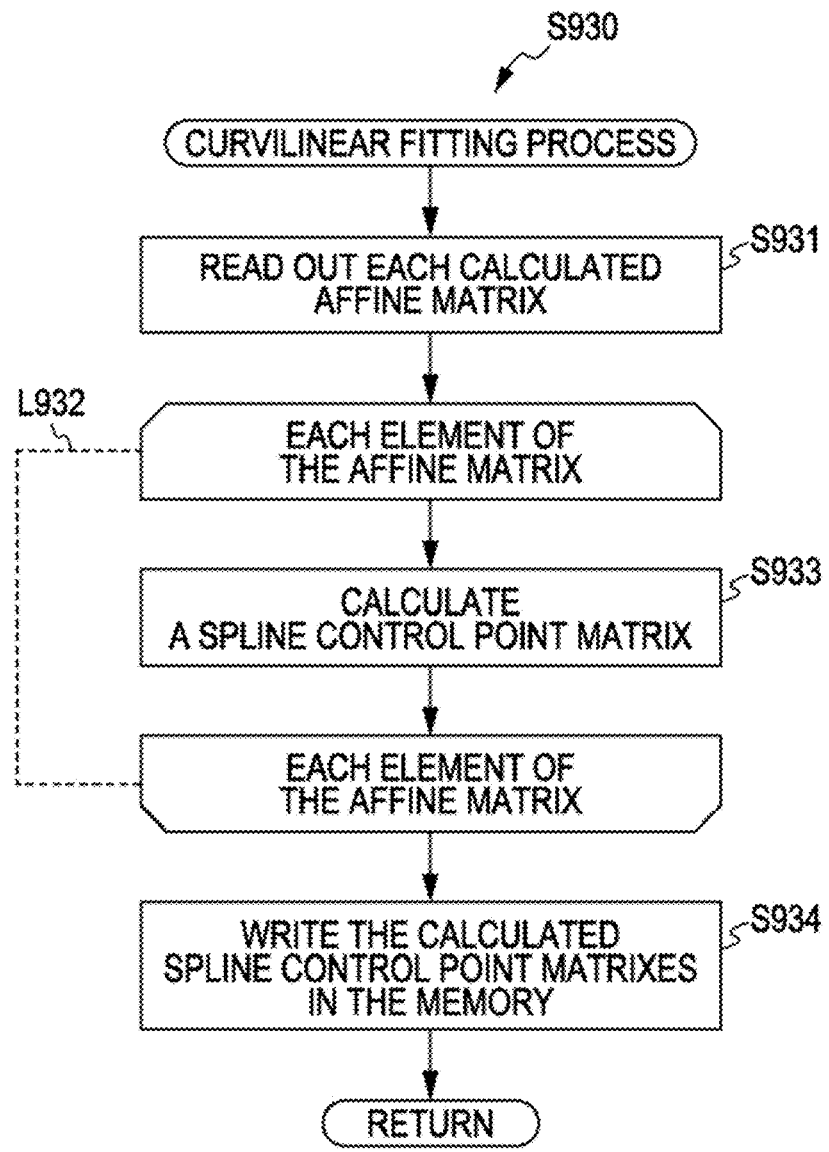

FIG. 25A

| -1 | 0 | 1 |
|----|---|---|
| -2 | 0 | 2 |
| -1 | 0 | 1 |

FIG. 25B

| 1  | 2  | 1  |
|----|----|----|
| 0  | 0  | 0  |
| -1 | -2 | -1 |

FIG. 32

| $R_L$ | $G_L$ | $B_L$ | $G_L$ | $R_L$ | $G_L$ | $B_L$ | $G_L$ |
|---|---|---|---|---|---|---|---|
| $G_S$ | $R_S$ | $G_S$ | $B_S$ | $G_S$ | $R_S$ | $G_S$ | $B_S$ |
| $B_L$ | $G_L$ | $R_L$ | $G_L$ | $B_L$ | $G_L$ | $R_L$ | $G_L$ |
| $G_S$ | $B_S$ | $G_S$ | $R_S$ | $G_S$ | $B_S$ | $G_S$ | $R_S$ |
| $R_L$ | $G_L$ | $B_L$ | $G_L$ | $R_L$ | $G_L$ | $B_L$ | $G_L$ |
| $G_S$ | $R_S$ | $G_S$ | $B_S$ | $G_S$ | $R_S$ | $G_S$ | $B_S$ |
| $B_L$ | $G_L$ | $R_L$ | $G_L$ | $B_L$ | $G_L$ | $R_L$ | $G_L$ |
| $G_S$ | $B_S$ | $G_S$ | $R_S$ | $G_S$ | $B_S$ | $G_S$ | $R_S$ |

FIG. 33

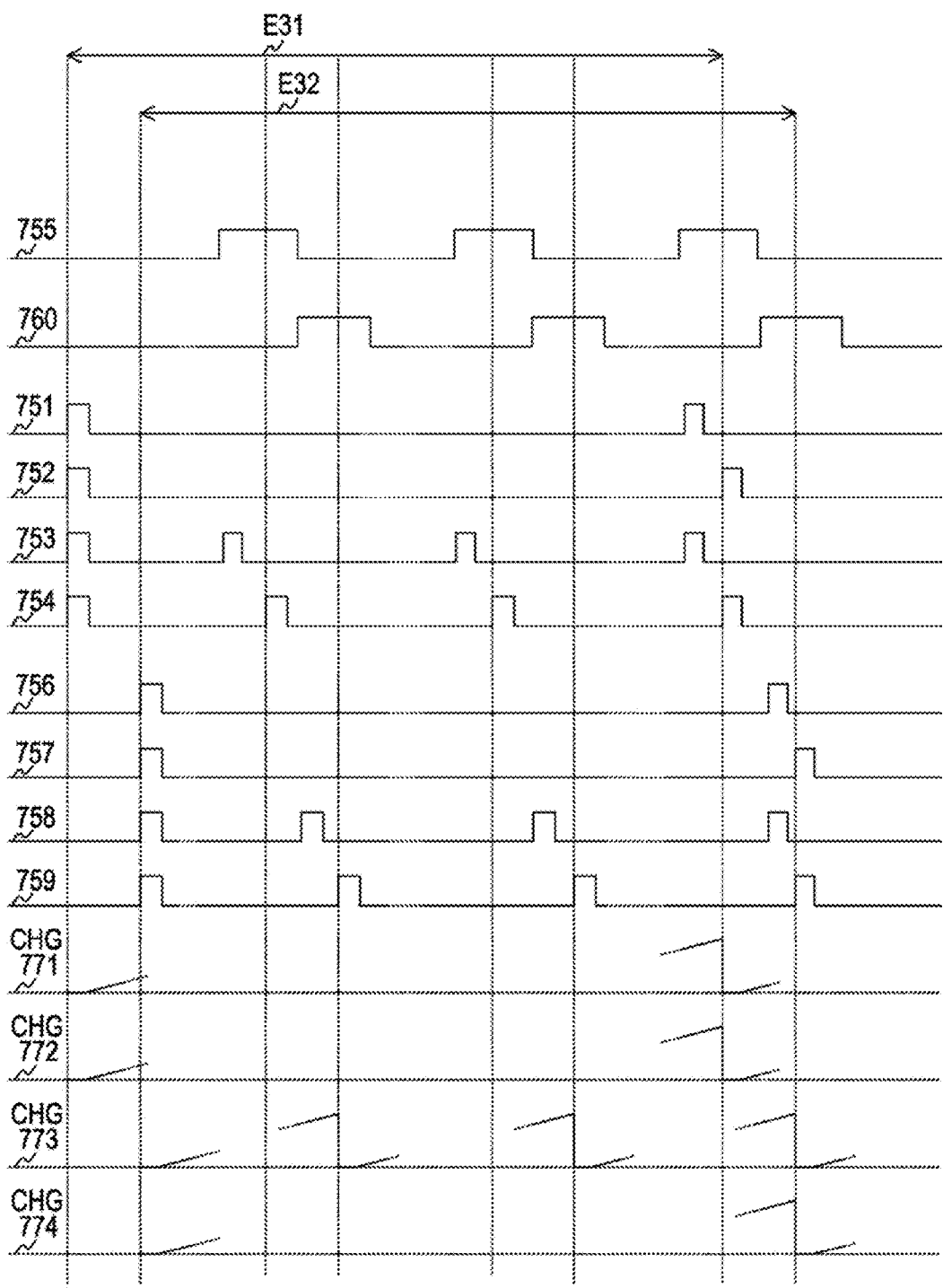

IMAGE PROCESSING APPARATUS, IMAGING APPARATUS, SOLID-STATE IMAGING DEVICE, IMAGE PROCESSING METHOD AND PROGRAM

BACKGROUND OF THE INVENTION

1. Field of the Invention

The present invention relates to an image processing apparatus, and specifically, relates to an image processing apparatus, an imaging apparatus, and a solid-state imaging device, which subject image data to an image process, and a processing method according thereto, and a program causing a computer to execute the method thereof.

2. Description of the Related Art

In recent years, CCD (Charge Coupled Device) sensors, CMOS (Complementary Metal Oxide Semiconductor) sensors, and so forth have come into widespread use as solid-state imaging devices which image a subject to generate image data. The dynamic range as to incident light of these solid-state imaging devices (i.e., the luminance range from a level wherein a signal is inextricable due to being lost in floor noise, to a saturation level) is improving steadily by progress of semiconductor technology. However, in reality, it is not so uncommon for incident light exceeding a predetermined dynamic range to occur when using solid-state imaging devices. Therefore, technology used for expanding a dynamic range is being actively studied.

As a technique used for obtaining a high dynamic range image, for example, a technique has been proposed wherein multiple images, imaged using different exposures, are synthesized into one image. However, with such a technique, exposure time for imaging of multiple images increases, and accordingly, such a technique has a problem in that moving subject blurring or camera shaking readily occurs. As a technique to solve this problem, for example, imaging technology has been proposed wherein multiple pixels having different sensitivity are disposed on the imaging surface of a single image sensor, thereby executing multistep exposure at once to generate a high dynamic range image (e.g., see International Publication WO 2002/056603 pamphlet (FIG. 1)). Imaging having a different sensitivity can be performed simultaneously by employing this imaging technology, whereby the whole exposure period can be relatively shortened. However, this imaging technology is the same as other existing imaging technology in that the sensitivity itself of the solid-state imaging device is not improved. Therefore, in the event that there is a low luminance subject, the exposure period increases in accordance with this low luminance subject, and occurrence of camera shaking is not reduced.

On the other hand, as for technology used for correcting an image of which the camera shaking has occurred, for example, technology has been proposed wherein a short exposure image (short-time-exposure image) and a long exposure image (long-time-exposure image) are employed to correct camera shaking that has occurred during the long-time-exposure image (e.g., see L. Yuan, J. Sun, L. Quan, H. Y. Shum: "Image Deblurring with Blurred/Noisy Image Pairs", Proceedings of ACM SIGGRAPH 2007, Article 1, 2007). With this camera shaking correction technology, a short-time-exposure image is employed to estimate the camera shaking function PSF (Point Spread Function) of the long-time-exposure image, and subject the long-time-exposure image to reverse correction thereof to correct camera shaking that has occurred upon the long-time-exposure image. That is to say, the short-time-exposure image is employed as reference data to estimate the camera shaking PSF of the long-time-exposure image.

Also, for example, there has been proposed camera shaking correction technology that employs an imaging apparatus capable of measuring operations of the imaging apparatus itself. For example, there has been proposed an imaging apparatus in which a high-resolution image sensor which executes imaging by long exposure, and a low-resolution image sensor which measures camera shaking by short consecutive exposure are combined (e.g., see M. Ben-Ezra, S. K. Nayar: "Motion Deblurring Using Hybrid Imaging", Proceedings of IEEE International Conference on Computer Vision and Pattern Recognition, Vol. I, pp 657-664, 2003). This camera shaking correction technology is camera shaking correction technology wherein the camera shaking PSF of a long-time-exposure image is estimated by measurement using a short-time-exposure image, and camera shaking that has occurred on the long-time-exposure image is corrected by subjecting this image to reverse correction thereof. That is to say, the short-time-exposure image generated by the low-resolution image sensor is used to estimate the camera shaking PSF of the long-time-exposure image.

SUMMARY OF THE INVENTION

According to the above-mentioned related art, the camera shaking of a long-time-exposure image can be corrected by using a short-time-exposure image. However, in the case of using a short-time-exposure image to correct the camera shaking of a long-time-exposure image, it is difficult to correctly compensate the restoration of a saturation area of the long-time-exposure image from the short-time-exposure image of which the exposure timing is completely different from that of the long-time-exposure image. That is to say, it is difficult to generate a high-dynamic-range image of which the camera shaking has been suitably corrected.

It has been found to be desirable to generate a high-dynamic-range image of which the camera shaking has been suitably corrected.

An according to an embodiment of the present invention, there are provided an image processing apparatus including: a shaking estimating unit configured to estimate the shaking information of an image generated within a predetermined period of time; a short-time-exposure shaking correcting unit configured to correct the shaking of a plurality of short-time-exposure images generated due to intermittent exposure within the predetermined period of time based on the estimated shaking information; a long-time-exposure shaking correcting unit configured to correct the shaking of a long-time-exposure image generated due to consecutive exposure within the predetermined period of time based on the estimated shaking information; and an image synthesizing unit configured to synthesize the corrected short-time-exposure images and the corrected long-time-exposure image, and a processing method according thereto, and a program that causes a computer to execute the method thereof. Thus, there is provided an effect wherein short-time-exposure images and a long-time-exposure image of which the shaking has been corrected based on shaking information are synthesized, thereby generating a high-dynamic-range image of which the shaking has been corrected.

The shaking estimating unit may calculate a parametric curve that represents the temporal change of image coordinates due to motion of an imaging apparatus within the predetermined period of time as the shaking information. Thus, there is provided an effect wherein camera shaking including not only translational motion but also rotational motion is corrected.

The shaking estimating unit may include: a calculating unit configured to calculate the discrete temporal change of each component of a coordinate transformation matrix between images making up the plurality of short-time-exposure images; and a curvilinear fitting unit configured to fit the discrete temporal change of each component of the coordinate transformation matrix into the parametric curve. Thus, there is provided an effect wherein shaking information is calculated based on short-time-exposure images imaged intermittently within a predetermined period of time.

The shaking estimating unit may include: an inter-image shaking information calculating unit configured to calculate a coordinate transformation matrix between consecutive images regarding each image making up the plurality of short-time-exposure images as shaking information between images; a shaking information calculating unit configured to calculate a parametric curve that represents the temporal change of each component based on the calculated shaking information between images as the shaking information; an image shaking correcting unit configured to correct shaking of the short-time-exposure images by aligning the pixel positions of the plurality of short-time-exposure images to synthesize these based on the calculated shaking information; a rendering unit configured to generate a point blurring function image at a plurality of target positions on the long-time-exposure images based on the calculated shaking information; a point blurring function image correcting unit configured to correct the point blurring function image for each of the target positions based on an image adjacent to the target positions of the corrected short-time-exposure images, and an image adjacent to the target positions of the long-time-exposure image; and a shaking information updating unit configured to update the shaking information based on the calculated shaking information between images, the corrected point blurring function image, and the calculated shaking information. Thus, there is provided an effect wherein shaking information is calculated by using short-time-exposure images imaged intermittently within a predetermined period of time, and a point blurring function of a long-time-exposure image imaged consecutively within a predetermined period of time.

The inter-image shaking information calculating unit may calculate the matched points between images of the plurality of short-time-exposure images, thereby calculating the shaking information between images; with the shaking estimating unit including a reliable point extracting unit configured to extract a matched point where matching has been obtained from most short-time-exposure images of the plurality of short-time-exposure images of the matched points, as a reliable point; the image shaking correcting unit aligning the pixel positions of the plurality of short-time-exposure images based on the calculated shaking information regarding a region adjacent to the extracted reliable point to synthesize these, thereby correcting the shaking of the short-time-exposure images; the rendering unit generating a point blurring function image at the position of the reliable point on the long-time-exposure image based on the calculated shaking information; and the point blurring function image correcting unit correcting the point blurring function image based on an image adjacent to the reliable point of the corrected short-time-exposure images, and an image adjacent to the reliable point of the long-time-exposure image. Thus, there is provided an effect wherein shaking information is detected with further high reliability by utilizing a reliable area where matching has been obtained during the longest period within a predetermined period of time.

The short-time-exposure shaking correcting unit may align the pixel positions of images making up the plurality of short-time-exposure images based on the estimated shaking information to synthesize these, thereby correcting the shaking of the short-time-exposure images. Thus, there is provided an effect wherein multiple short-time-exposure images are synthesized by aligning the pixel positions of the short-time-exposure images, thereby correcting the shaking of the short-time-exposure images.

The long-time-exposure shaking correcting unit may include: a rendering unit configured to generate point blurring function images at a plurality of target positions on the long-time-exposure image based on the estimated shaking information; and a deconvolution unit configured to subject the long-time-exposure image to a deconvolution process for each of the target positions based on each of the generated point blurring function images. Thus, there is provided an effect wherein point blurring function images at multiple target positions on a long-time-exposure image are generated based on estimated shaking information, and the long-time-exposure image is subjected to a deconvolution process for each of target positions based on each of the generated point blurring function images.

The image synthesizing unit may add a pixel value of the corrected short-time-exposure images and a pixel value of the corrected long-time-exposure image for each pixel, employs the inverse property of synthetic property between incident light intensity and pixel value response property according to short-time exposure, and incident light intensity and pixel value response property according to long-time exposure to correct the pixel values added for each pixel, thereby generating a synthetic image between the corrected short-time-exposure images and the corrected long-time-exposure image. Thus, there is provided an effect wherein a pixel value of the corrected short-time-exposure images and a pixel value of the corrected long-time-exposure image are added for each pixel, the pixel values added for each pixel are corrected by using the inverse property of synthetic property, thereby generating a synthetic image.

The short-time-exposure images may be mosaic images output from a solid-state imaging device; and the long-time-exposure image a mosaic image output from the solid-state imaging device; with the image synthesizing unit disposing a pixel of the corrected short-time-exposure images, and a pixel of the corrected long-time-exposure image so as to obtain a mosaic image having the same pixel array as the mosaic image output from the solid-state imaging device, thereby executing a demosaic process regarding the mosaic image thereof. Thus, there is provided an effect wherein a demosaic process is executed regarding an image having the same pixel array as a mosaic image where the pixels of the corrected short-time-exposure images, and the pixels of the corrected long-time-exposure images are rearranged.

Also, an according to an embodiment of the present invention, there are provided an imaging apparatus, a processing method thereof, and a program that causes a computer to execute the method thereof, the imaging apparatus including: a solid-state imaging device where a first pixel used for generating a long-time-exposure image by consecutive exposure within a predetermined period of time, and a second pixel used for generating a plurality of short-time-exposure images by intermittent exposure within the predetermined period of time are arrayed on the imaging surface; a shaking estimating unit configured to estimate shaking information within the predetermined period of time based on a plurality of shorttime-exposure images generated by using the second pixel; a short-time-exposure shaking correcting unit configured to correct shaking of the short-time-exposure images based on the estimated shaking information; a long-time-exposure shaking correcting unit configured to correct shaking of a long-time-exposure image generated by using the first pixel based on the estimated shaking information; and an image synthesizing unit configured to synthesize the corrected short-time-exposure images and the corrected long-time-exposure image. Thus, there is provided an effect wherein short-time-exposure images and a long-time-exposure image that have been corrected based on shaking information are synthesized, whereby a high-dynamic-range image of which the shaking has been corrected is generated.

With the solid-state imaging device, a first pixel line where the first pixels are arrayed in the horizontal direction, and a second pixel line where the second pixels are arrayed in the horizontal direction, may be alternately disposed in the vertical direction. Thus, there is provided an effect wherein imaging is executed by the solid-state imaging device wherein the first pixel line and the second pixel line are disposed alternately in the vertical direction.

With the solid-state imaging device, in order for pixels having first spectral sensitivity to be disposed in a checkered pattern, the pixels having first spectral sensitivity may be disposed on the first pixel line and the second pixel line alternately, and in order for pixels having second spectral sensitivity and pixels having third spectral sensitivity to be disposed alternately between the pixels having first spectral sensitivity on the first pixel line and the second pixel line, the pixels having second spectral sensitivity according to the first pixels, and the pixels having second spectral sensitivity according to the second pixels may be arrayed alternately in an oblique direction, and also the pixels having third spectral sensitivity according to the first pixels, and the pixels having third spectral sensitivity according to the second pixels may be arrayed alternately in the oblique direction. Thus, there is provided an effect wherein imaging is executed by the solid-state imaging device wherein, in order for pixels having first spectral sensitivity to be disposed in a checkered pattern, the pixels having first spectral sensitivity are disposed on the first pixel line and the second pixel line alternately, and in order for pixels having second spectral sensitivity and pixels having third spectral sensitivity to be disposed alternately between the pixels having first spectral sensitivity on the first pixel line and the second pixel line, the pixels having second spectral sensitivity according to the first pixels, and the pixels having second spectral sensitivity according to the second pixels are arrayed alternately in an oblique direction, and also the pixels having third spectral sensitivity according to the first pixels, and the pixels having third spectral sensitivity according to the second pixels are arrayed alternately in the oblique direction.

With the solid-state imaging device, the first pixels and the second pixels may be disposed in a checkered pattern. Thus, there is provided an effect wherein imaging is executed by the solid-state imaging device wherein the first pixels and the second pixels are disposed in a checkered pattern.

With the solid-state imaging device, an array made up of the pixels having first spectral sensitivity, the pixels having second spectral sensitivity, and the pixels having third spectral sensitivity according to the first pixels, are a Bayer array inclined obliquely, and an array made up of the pixels having first spectral sensitivity, the pixels having second spectral sensitivity, and the pixels having third spectral sensitivity according to the second pixels, are a Bayer array inclined obliquely. Thus, there is provided an effect wherein imaging is executed by the solid-state imaging device wherein an array made up of the pixels having first spectral sensitivity, the pixels having second spectral sensitivity, and the pixels having third spectral sensitivity according to the first pixels is a Bayer array inclined obliquely, and an array made up of the pixels having first spectral sensitivity, the pixels having second spectral sensitivity, and the pixels having third spectral sensitivity according to the second pixels is a Bayer array inclined obliquely.

With the solid-state imaging device, on the upper side of a horizontal line made up of the first pixels and the second pixels arrayed alternately in the horizontal direction, a line transfer signal line that supplies a control signal used for executing readout by consecutive exposure within the predetermined period of time in the horizontal direction, and a line rest signal line, may be disposed and connected to the first pixels included in the horizontal line, and on the lower side of the horizontal line, a line transfer signal line that supplies a control signal used for executing readout sequentially by intermittent exposure within the predetermined period of time in the horizontal direction, and a line rest signal line, may be disposed and connected to the second pixels included in the horizontal line. Thus, there is provided an effect wherein imaging is executed by the solid-state imaging device wherein on the upper side of the horizontal line, a line transfer signal line that supplies a control signal used for executing readout by consecutive exposure within the predetermined period of time, and a line rest signal line are disposed and connected to the first pixels included in the horizontal line, and on the lower side of the horizontal line, a line transfer signal line that supplies a control signal used for executing readout sequentially by intermittent exposure within the predetermined period of time, and a line rest signal line are disposed and connected to the second pixels included in the horizontal line.

With the solid-state imaging device, a first pixel group where the three first pixels arrayed in the horizontal direction, and the three first pixels arrayed in the vertical direction are connected in a staircase pattern, and a second pixel group where the three second pixels arrayed in the horizontal direction, and the three second pixels arrayed in the vertical direction are connected in a staircase pattern, may be disposed alternately in the horizontal direction. Thus, there is provided an effect wherein imaging is executed by the solid-state imaging device wherein the first pixel group and the second pixel group are disposed alternately in the horizontal direction.

With the solid-state imaging device, the array made up of the pixels having first spectral sensitivity, the pixels having second spectral sensitivity, and the pixels having third spectral sensitivity, may be a Bayer array. Thus, there is provided an effect wherein imaging is executed by the solid-state imaging device wherein the array made up of the pixels having first spectral sensitivity, the pixels having second spectral sensitivity, and the pixels having third spectral sensitivity is a Bayer array.

Also, according to an embodiment of the present invention, there is provided a solid-state imaging device in which pixels used for generating a long-time-exposure image by consecutive exposure within a predetermined period of time, and pixels used for generating a plurality of short-time-exposure images by intermittent exposure within the predetermined period of time are arrayed on the imaging surface. Thus, there is provided an effect wherein imaging is executed by the solid-state imaging device in which pixels used for generating a long-time-exposure image by consecutive exposure within a predetermined period of time, and pixels used for generating a plurality of short-time-exposure images by intermittent exposure within the predetermined period of time are arrayed on the imaging surface.

According to the above configurations, there is provided an advantage in that a high-dynamic-range image, of which the camera shaking has been corrected suitably, can be generated.

BRIEF DESCRIPTION OF THE DRAWINGS

FIG. 6 is a diagram illustrating an example of the pixel array of a color filter to be mounted on the light receiving portion of the solid-state imaging device according to the first embodiment of the present invention;

FIG. 8 is a diagram schematically illustrating the pixel array of a long-time-exposure mosaic image to be imaged with long-time exposure by the solid-state imaging device 13 according to the first embodiment of the present invention;

FIG. 13 is a flowchart illustrating the procedure of the RGB image synthesizing unit according to the first embodiment of the present invention;

FIG. 14 is a flowchart illustrating the procedure of a camera shaking estimating process by a camera shaking estimating unit according to the first embodiment of the present invention;

FIG. 15 is a flowchart illustrating the procedure of a motion estimating process by a motion estimating unit according to the first embodiment of the present invention;

FIG. 16 is a flowchart illustrating the procedure of a curvilinear fitting process by the curvilinear fitting unit according to the first embodiment of the present invention;

FIGS. 25A and 25B are diagrams illustrating an operator used at the time of the camera shaking information updating unit according to the second embodiment of the present invention executing an edge detecting process;

FIG. 32 is a diagram illustrating an example of the pixel array of a color filter to be mounted on the light receiving portion of a solid-state imaging device according to the fourth embodiment of the present invention;

FIG. 33 is a diagram illustrating an example of the pixel array of a color filter to be mounted on the light receiving portion of the solid-state imaging device according to the fourth embodiment of the present invention;

FIG. 37 is a timing chart schematically illustrating control signals as to four pixels of pixels (#11), (#12), (#16), and (#17) shown in FIG. 36, and the way in which charges are stored in each pixel.

DESCRIPTION OF THE PREFERRED EMBODIMENTS

Next, embodiments of the present invention will be described in detail with reference to the drawings.

First Embodiment

Figure 1:
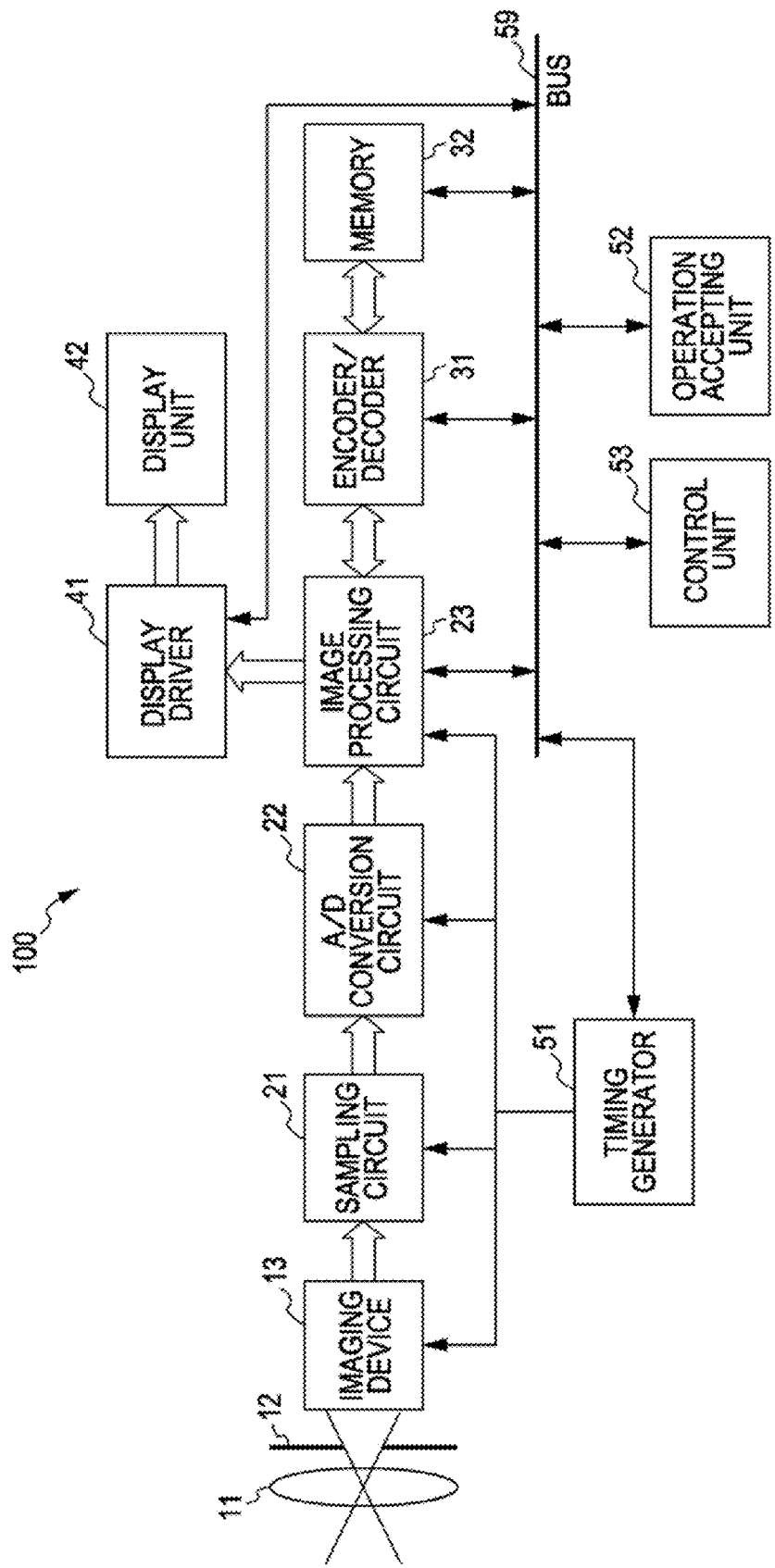
FIG. 1 is a block diagram illustrating an internal configuration example of an imaging apparatus according to a first embodiment of the present invention.

FIG. 1 is a block diagram illustrating an internal configuration example of an imaging apparatus 100 according to a first embodiment of the present invention. The imaging apparatus 100 includes a lens 11, a diaphragm 12, a solid-state imaging device 13, a sampling circuit 21, an A/D (Analog/Digital) conversion circuit 22, an image processing circuit 23, an encoder/decoder 31, and memory 32. Also, the imaging apparatus 100 includes a display driver 41, a display unit 42, a timing generator 51, an operation accepting unit 52, a control unit 53, and a bus 59. Note that the image processing circuit 23, the encoder/decoder 31, the memory 32, the display driver 41, the timing generator 51, the operation accepting unit 52, and the control unit 53 are connected mutually via the bus 59. The imaging apparatus 100 can be realized with, for example, a digital video camera (e.g., single unit camera recorder) which images a subject to generate a moving picture.

The lens 11 is a lens used for condensing light from a subject. The diaphragm 12 adjusts the light quantity of light condensed by the lens 11. Thus, the light from a subject, condensed by the lens 11, of which the light quantity has been adjusted by the diaphragm 12, is supplied to the solid-state imaging device 13.

The solid-state imaging device 13 is an image sensor which is driven by the timing generator 51, converts the light from a subject input via the lens 11 and the diaphragm 12 into an electric signal (image signal) by photoelectric conversion, and outputs this converted electric signal to the sampling circuit 21. That is to say, upon the light from the subject input via the lens 11 and the diaphragm 12 reaching light receiving elements on the sensor imaging surface of the solid-state imaging device 13, photoelectric conversion is carried out by these light receiving elements, thereby generating electric signals. Note that the solid-state imaging device 13 is realized with, for example, a CCD (Charge Coupled Device) or CMOS (Complementary Metal Oxide Semiconductor). Also, the imaging apparatus 100 realizes a dynamic range wider than usual by employing the solid-state imaging device 13, whereby imaging can be executed in a range from a dark subject to a bright subject without noise and saturation. Note that the array and readout control of pixels in the solid-state imaging device 13 will be described in detail with reference to FIGS. 2 through 8.

The sampling circuit 21 is driven by the timing generator 51, samples the electric signal supplied from the solid-state imaging device 13 to subject this to an analog process such as removal of noise components, and supplies the analog signal subjected to such a process to the A/D conversion circuit 22. Note that the sampling circuit 21 is realized with, for example, a correlated double sampling circuit (CDS). Thus, the noise that occurs at the solid-state imaging device 13 is reduced.

The A/D conversion circuit 22 is driven by the timing generator 51, converts the analog signal supplied from the sampling circuit 21 into a digital signal, and supplies this converted digital signal to the image processing circuit 23.

The image processing circuit 23 includes image memory (RAM (Random Access Memory) for images), and a processor for signal process. The image processing circuit 23 subjects the digital signal (image data) supplied from the A/D conversion circuit 22 to a predetermined image process, and supplies the image data subjected to this image process to the display driver 41 and the encoder/decoder 31. Specifically, the digital signal supplied from the image processing circuit 23 is temporarily stored in the image memory within the image processing circuit 23. Subsequently, the processor for signal process of the image processing circuit 23 subjects the digital signal stored in the image memory to an image process programmed beforehand. That is to say, the image processing circuit 23 executes a signal process to convert the output of the solid-state imaging device 13 into a high-dynamic-range RGB image. Note that the processor for signal processing of the image processing circuit 23 is realized with, for example, a DSP (Digital Signal Processor). Note that the details of the process executed by the image processing circuit 23 will be described in detail with reference to FIGS. 9 through 12.

The encoder/decoder 31 encodes the image data supplied from the image processing circuit 23, and supplies and records the encoded image data to the memory 32. Also, when displaying the image data stored in the memory 32, the encoder/decoder 31 reads out the image data from the memory 32 to decode this, and supplies this to the image processing circuit 23.

The memory 32 is memory which stores the image data encoded by the encoder/decoder 31. Also, the memory 32 supplies the stored image data to the encoder/decoder 31. Note that the memory 32 is realized with, for example, a recording apparatus employing semiconductor memory, a magnetic recording medium, a magneto-optical recording medium, an optical recording medium, or the like.

The display driver 41 converts the digital signal supplied from the image processing circuit 23 into an analog signal, and controls the display unit 42 to display the image corresponding to the converted analog signal.

The display unit 42 displays the image corresponding to the analog signal converted by the display driver 41. Note that, in a normal state, a digital signal (image data) is overwritten continuously in the built-in image memory of the image processing circuit 23 with a constant frame rate by the control of the timing generator 51. Subsequently, the image data of the built-in image memory of the image processing circuit 23 is output to the display unit 42 via the display driver 41, and the image corresponding to the image data thereof is displayed on the display unit 42. The display unit 42 is realized with, for example, a LCD (Liquid Crystal Display), and also has a function as a finder.

The timing generator 51 is a timing generator which controls the operation timing of the solid-state imaging device 13, the sampling circuit 21, the A/D conversion circuit, and the image processing circuit 23. For example, upon a signal generated by the user pressing the shutter button being supplied to the timing generator 51, the timing generator 51 suitably drives the solid-state imaging device 13, the sampling circuit 21, the A/D conversion circuit, and the image processing circuit 23. Thus, capturing of an imaged image is executed.

The operation accepting unit 52 is an operation accepting unit which accepts operation input such as a shutter operation or the other command input by the user, and supplies the content of the accepted operation input to the control unit 53. For example, the operation accepting unit 52 includes operation buttons such as a shutter button provided on the imaging apparatus 100 main unit, and so forth.

The control unit 53 is a control unit which controls the whole imaging apparatus 100, reads out a control program stored in the driver (not shown), and executes various types of control based on the control program thereof, or the command from the user accepted by the operation accepting unit 52, or the like. The control unit 53 is realized with, for example, a CPU (Central Processing Unit).

Figure 2:
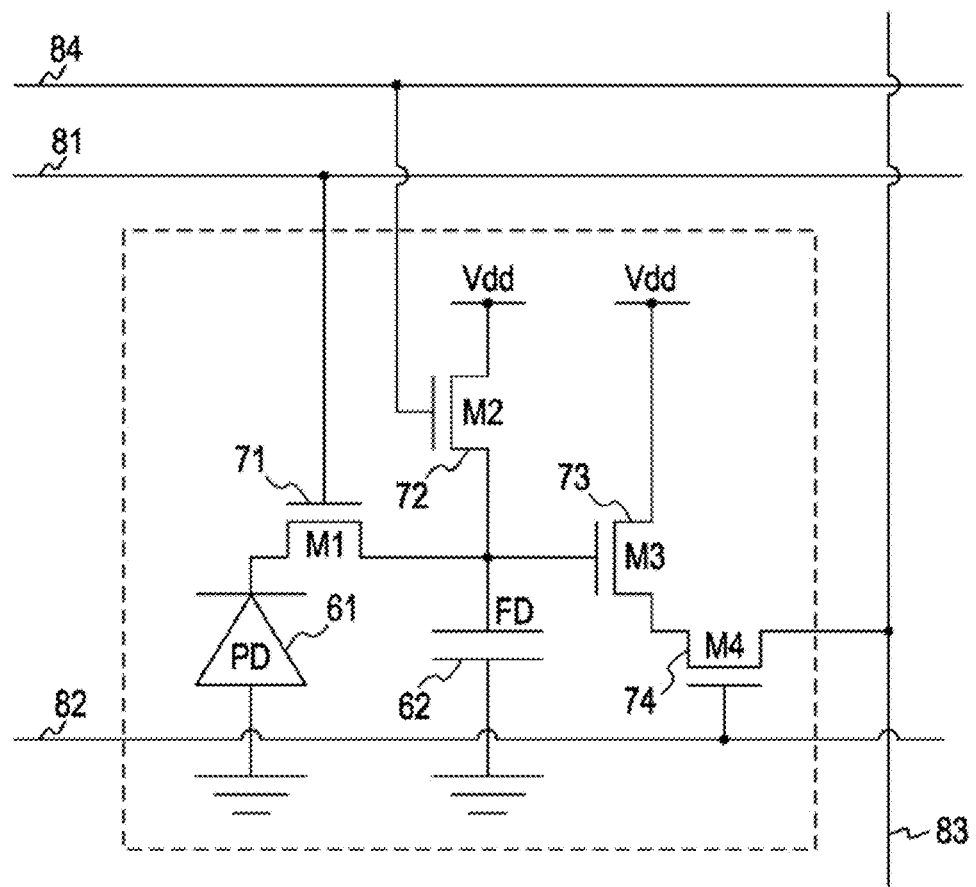
FIG. 2 is a diagram illustrating an equivalent circuit of a pixel provided to a solid-state imaging device according to the first embodiment of the present invention.

FIG. 2 is a diagram illustrating an equivalent circuit of pixels included in the solid-state imaging device 13 according to the first embodiment of the present invention. The pixels included in the solid-state imaging device 13 are made up of a photodiode (PD) 61 which is a light receiving unit, a floating diffusion (FD) 62, and four MOS-FETs (M1 through M4) 71 through 74.

The light irradiated on a pixel is converted into an electron at the PD 61, and charge according to light quantity thereof is stored in the PD 61. The MOS-FET (M1) 71 controls charge transfer between the PD 61 and the FD 62. A transfer signal (TR) 81 is applied to the gate electrode of the MOS-FET (M1) 71, whereby the charge stored in the PD 61 is transferred to the FD 62. The FD 62 is connected to the gate electrode of the MOS-FET (M3) 73. Upon a row select signal (RS) 82 being applied to the gate electrode of the MOS-FET (M4) 74, the voltage corresponding to the charge stored in the FD 62 can be read out from a readout line (RD) 83. Upon a reset signal (RST) 84 being applied to the gate electrode of the MOS-FET (M2) 72, the charge stored in the FD 62 flows through the MOS-FET (M2) 72, and accordingly, the charge storage state is reset.

Figure 3:
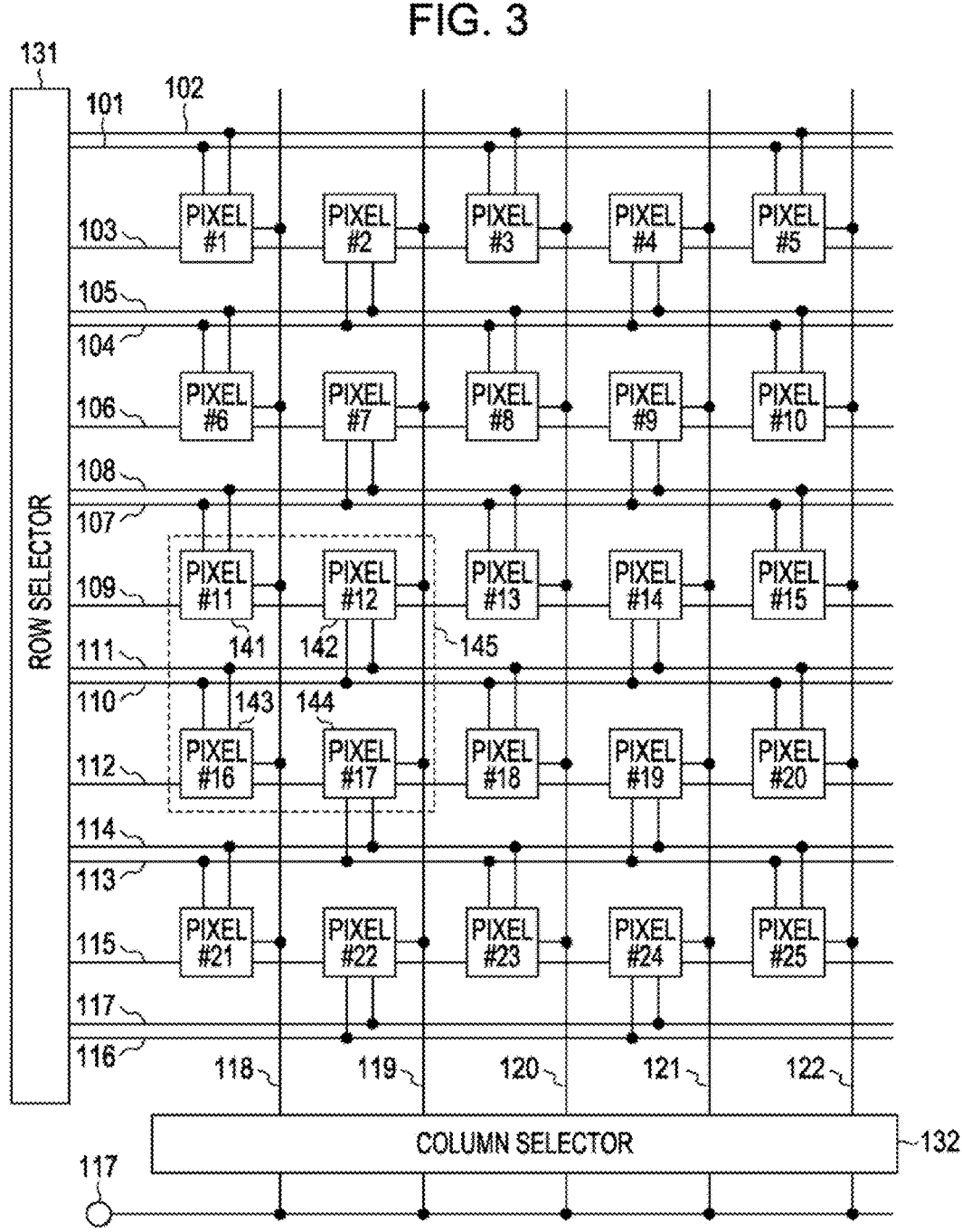
FIG. 3 is a diagram schematically illustrating the pixel wiring of the solid-state imaging device according to the first embodiment of the present invention.

FIG. 3 is a diagram schematically illustrating the pixel wiring of the solid-state imaging device 13 according to the first embodiment of the present invention. Pixels #1 through #25 having the configuration shown in FIG. 2 are disposed as a two-dimensional regular grid. Also, readout lines (RD) 118 through 122 are wired in the vertical column direction, where pixels on the same vertical column share one readout line. Also, the readout lines (RD) 118 through 122 are connected to an output terminal 117 exclusively by a column selector 132. Here, pixels (#1), (#3), (#5), and so on (pixels appended with an odd number) are pixels which expose a subject consecutively within a certain exposure period, and are read out finally. Also, pixels (#2), (#4), (#6), and so on (pixels appended with an even number) are pixels which expose a subject intermittently within a certain exposure period, and are read out each time.

One certain pixel can be connected to the output terminal 117 by selection of a row select signal controlled by the row selector 131, and selection of a readout line controlled by the column selector 132. Therefore, the signals of all the pixels can be read out by time sharing while selecting each pixel sequentially.

Also, the solid-state imaging device 13 is wired with transfer signal lines (TR) 101, 104, 107, 110, 113, and 116, and reset signal lines (RST) 102, 105, 108, 111, 114, and 117.

Here, signal lines used for supplying a different signal are disposed on the upper and lower sides of pixels on the same horizontal line, each pixel is connected to a transfer signal line (TR) and a reset signal line (RST) on the upper and lower sides alternately for each pixel. For example, the reset signal line (RST) 108 and the transfer signal line (TR) 107 are disposed on the upper side of the horizontal line of the pixels (#11) through (#15), and the pixel (#11) is connected to these signal lines. Also, the reset signal line (RST) 111 and the transfer signal line (TR) 110 are disposed on the lower side of the same horizontal line, and the pixel (#12) is connected to these signal lines. Note that, in FIG. 3, a subscript L (Long) that means long-time exposure, or a subscript S (Short) that means short-time exposure is appended to the names of the reset signal lines (RST) and the transfer signal lines (TR) according to the type of a control signal to be supplied. Thus, with the first embodiment of the present invention, a configuration is employed wherein different control signals are disposed alternately at every one horizontal line, and pixels on the same horizontal line are connected to the upper or lower signals, and accordingly, two types of pixels to be controlled differently are disposed in a checkered pattern. Thus, the solid-state imaging device 13 can image not only a subject having bright luminance but also a subject having dark luminance without blur by using two types of pixels to be controlled differently.

Figure 4:
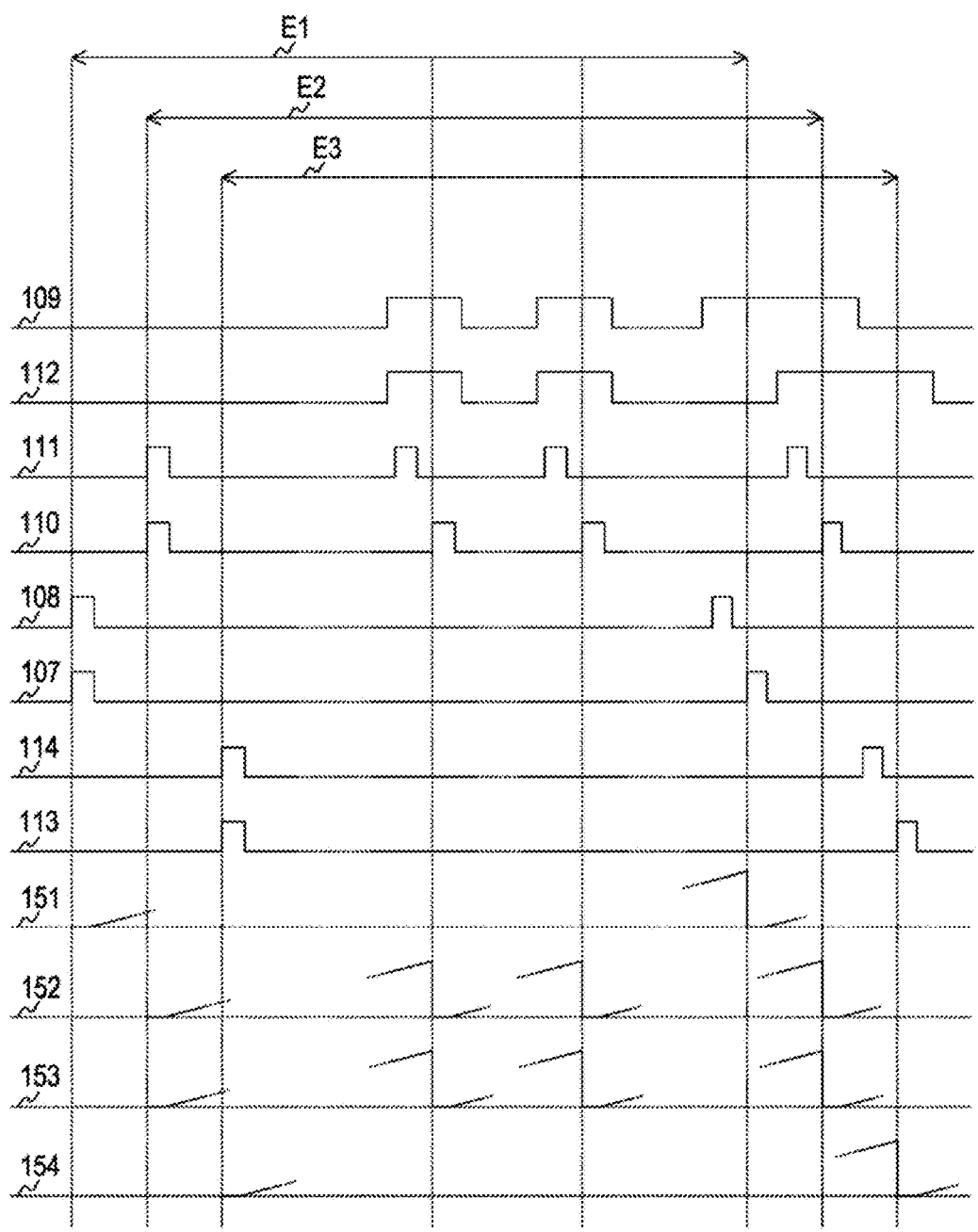
FIG. 4 is a timing chart schematically illustrating control signals as to four pixels of pixels (#11), (#12), (#16), and (#17) shown in FIG. 3, and the way in which charges are stored in each pixel.

FIG. 4 is a timing chart schematically expressing control signals as to four pixels of the pixels (#11), (#12), (#16), and (#17) shown in FIG. 3, and the way in which charges are stored in each pixel. Note that, in FIG. 3, the pixels (#11) 141, (#12) 142, (#16) 143, and (#17) 144 are shown by being surrounded with a dashed-line rectangle 145. Here, the horizontal axis shown in FIG. 4 is a temporal axis, but time periods regarding which explanation does not have to be performed will be shown in an abbreviated manner with dashed-lines. Also, description will be made by each waveform shown in FIG. 4 being appended with the same reference symbol as the corresponding signal line shown in FIG. 3. Also, exposure periods E1 and E3 are periods corresponding to long-time exposure, and an exposure period E2 is a period corresponding to short-time exposure. Note that the exposure periods E1 through E3 differ greatly, but actual exposure periods E1 through E3 are generally the same.

The waveforms shown in FIG. 4 are, in order from the top, the row select signal (RS) 109 as to the horizontal line of the pixels (#11) through (#15), and the row select signal (RS) 112 as to the horizontal line of the pixels (#16) through (#20), the reset signal (RST) 111 and the transfer signal (TR) 110 as to the pixels (#12), (#16), and so forth, the reset signal (RST) 108 and the transfer signal (TR) 107 as to the pixel (#11) and so forth, and the reset signal (RST) 114 and the transfer signal (TR) 113 as to the pixel (#17) and so forth. Subsequently, stored charge (CHG) 151 as to the pixel (#11), stored charge (CHG) 152 as to the pixel (#12), stored charge (CHG) 153 as to the pixel (#16), and stored charge (CHG) 154 as to the pixel (#17) are shown in FIG. 4.

First, description will be made regarding the pixel (#11). The pixel (#11) is connected to the row select signal line (RS) 109, the reset signal line (RST) 108, and the transfer signal line (TR) 107, and accordingly, operates in accordance with these control signals. Specifically, the pixel (#11) receives the signals of the reset signal line (RST) 108 and the transfer signal line (TR) 107 at the beginning of the exposure period E1, and after the charge for the PD and FD is reset, the charge storage of the PD by exposure is started. Here, even if the row select signal (RS) 109 is applied to the pixel (#11) several times in the middle of the exposure period E1, the pixel (#11)

continues charge storage unless the signals of the reset signal line (RST) 108 and the transfer signal line (TR) 107 are given to the pixel (#11) simultaneously. Subsequently, at the time of end of the exposure period E1, the row select signal (RS) 109 is applied to the pixel (#11), and the signal of the reset signal line (RST) 108 is applied to the pixel (#11), whereby the potential at the time of FD reset is output to the readout line (RD) 118. Immediately thereafter, upon the signal of the transfer signal line (TR) 107 being applied to the pixel (#11), the charge stored in the PD is transferred to the FD, and simultaneously, the signal potential equivalent to the stored charge is output to the readout line (RD) 118.

Next, description will be made regarding the pixel (#12). The pixel (#12) is connected to the row select signal line (RS) 109, the reset signal line (RST) 111, and the transfer signal line (TR) 110, and accordingly, operates in accordance with these control signals. Specifically, the pixel (#12) receives the signals of the reset signal line (RST) 111 and the transfer signal line (TR) 110 at the beginning of the exposure period E2, and after the charge for the PD and FD is reset, the charge storage of the PD by exposure is started. Subsequently, the row select signal (RS) 109 is applied to the pixel (#12) several times in the middle of the exposure period E2, and immediately thereafter the signal of the reset signal line (RST) 111 is applied to the pixel (#12), whereby the potential at the time of FD reset is output to the readout line (RD). Immediately thereafter, upon the signal of the transfer signal line (TR) 110 being applied to the pixel (#12), the charge stored in the PD is transferred to the FD, and simultaneously, the signal potential equivalent to the stored charge is output on the readout line (RD) 119. The PD from which the charge has been transferred becomes a charge-zero state, and resumes charge storage from this point in time. Subsequently, such operation is repeated multiple times during the exposure period E2. Also, the stored charge is read out once more at the end of the exposure period E2, and the exposure operation is ended.

Next, description will be made regarding the pixel (#16). The pixel (#16) is connected to the row select signal (RS) 112, the reset signal line (RST) 111, and the transfer signal line (TR) 110, and accordingly, operates in accordance with these control signals. Here, the pixel (#16) is the same as the pixel (#12) except that the row select signal (RS) 112 differs. Also, the signal waveforms of the row select signal (RS) 109 and the row select signal (RS) 112 during the exposure period E2 are mostly the same except for the later half portion of the exposure period E2. Also, at the time of end of the exposure period E2, the signals from the reset signal line (RST) 111 and the transfer signal line (TR) 110 are applied to the pixel (#16) at timing wherein the signals of the row select signal (RS) 109 and the row select signal (RS) 112 are overlapped. Therefore, the pixel (#16) operates in the same way as with the pixel (#12).

Next, description will be made regarding the pixel (#17). The pixel (#17) is connected to the row select signal (RS) 112, the reset signal line (RST) 114, and the transfer signal line (TR) 113, and accordingly, operates in accordance with these control signals. Here, the waveforms of the row select signal (RS) 112, the reset signal line (RST) 114, and the transfer signal line (TR) 113 are the same waveforms of the row select signal (RS) 109, the reset signal line (RST) 108, and the transfer signal line (TR) 107 except that the waveforms are shifted. Therefore, the pixel (#17) of the exposure period E3 operates such that the operation time of the pixel (#11) of the exposure period E1 is shifted.

The operation of the pixels (#11) and (#17) will be summarized as follows. That is to say, the pixels (#11) and (#17) store charge consecutively during the exposure period, and outputs the stored charge to the readout lines (RD) 118 and 119 at the time of the end of the exposure period. On the other hand, the pixels (#12) and (#16) operate such that charge storage and output are repeated intermittently during the exposure period. Thus, the solid-state imaging device 13 has a feature wherein pixels which execute long-time exposure consecutively, and pixels which repeat short-time exposure intermittently and output the stored charge each time are disposed in a checkered pattern.

Next, description will be made in detail regarding a method used for the solid-state imaging device 13 obtaining high-dynamic-range scene information, with reference to the drawings.

Figure 5A:
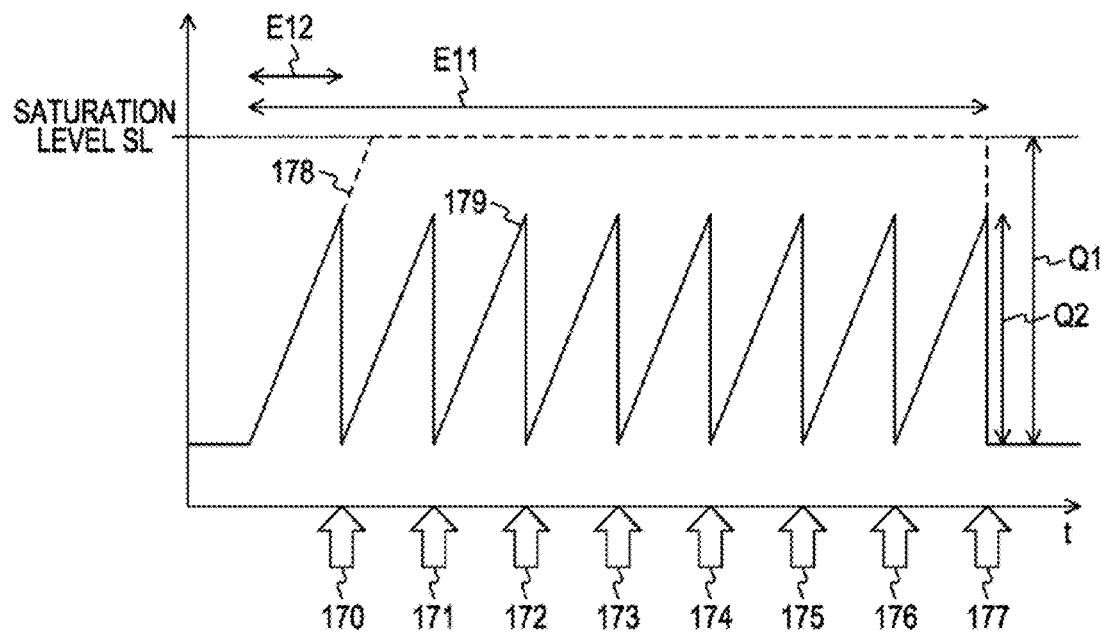
FIGS. 5A and 5B are diagrams illustrating the temporal change of charge storage of a photodiode during an exposure period E11 of the solid-state imaging device according to the first embodiment of the present invention.
Figure 5B:
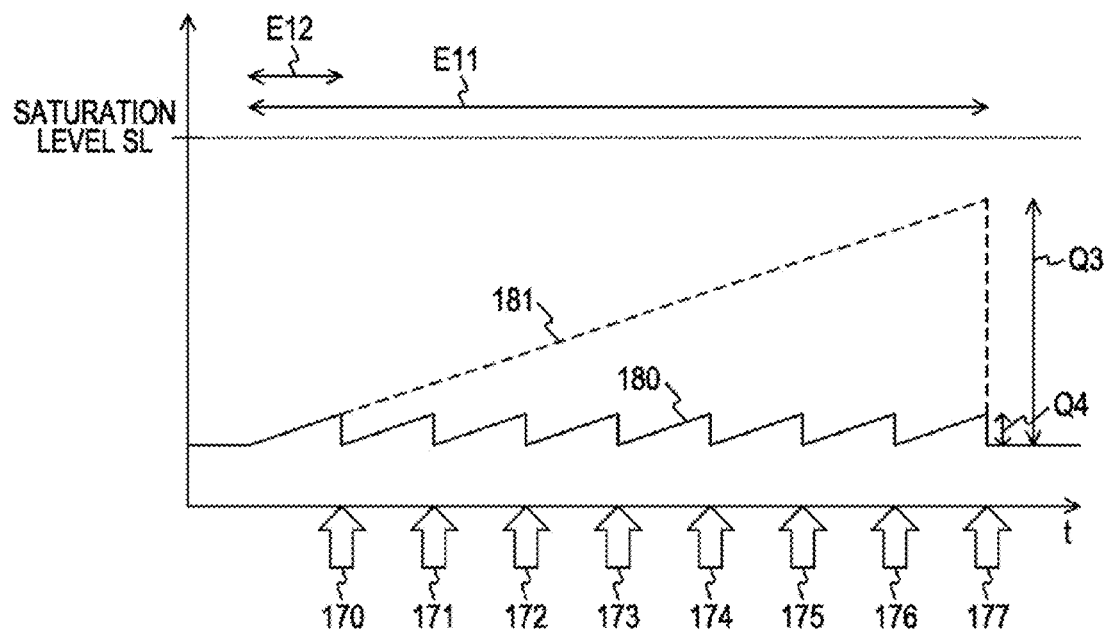

FIGS. 5A and 5B are diagrams illustrating the temporal change of charge storage of a PD during an exposure period E11 of the solid-state imaging device 13 according to the first embodiment of the present invention. FIG. 5A illustrates an example in the case of exposing a subject having bright luminance, and FIG. 5B illustrates an example in the case of exposing a subject having dark luminance. Also, the horizontal axes shown in FIGS. 5A and 5B are temporal axes, and the vertical axes thereof are axes that indicate the charge quantity of the PD.

First, description will be made regarding the case of exposing a subject having bright luminance, with reference to FIG. 5A. Of the two types of pixels with the solid-state imaging device 13, the pixel which executes long-time exposure exposes the subject consecutively during the exposure period E11, and executes charge transfer from the PD to the FD once at timing shown in an arrow 177 at the time of the end of the exposure period E11. A dashed line 178 indicates change in the charge quantity of the PD of this pixel. In a situation wherein subject luminance is high, with the pixel which thus executes long-time exposure, the charge quantity of the PD reaches a saturation level SL during the exposure period. Consequently, the charge quantity Q1 to be transferred at the time of charge transfer is equal to the saturation level SL.

On the other hand, the pixel which executes short-time exposure intermittently executes exposure multiple times intermittently within a short exposure period E12 during the exposure period E11. Charge transfer from the PD to the FD is carried out at timing indicated with arrows 170 through 177 for each multiple times of exposure, and a signal equivalent to transfer charge quantity Q2 is output from the solid-sate imaging device 13. Thus, the pixel which executes short-time exposure is not saturated in a state of a bright subject.

Next, description will be made regarding the case of exposing a subject having dark luminance, with reference to FIG. 5B. Let us say that the temporal axis shown in FIG. 5B indicates the same exposure period as the exposure period in FIG. 5A. Also, the exposure period E11 of the long-time-exposure pixel, and the exposure period E12 of the short-time-exposure pixel are the same as those in FIG. 5A. Further, the transfer timings of long-time exposure and short-time exposure (shown in arrows 170 through 177) is the same as those in FIG. 5A.

Here, in a state in which subject luminance is low, as shown in a dashed line 181, change in the stored charge of the PD of a long-time-exposure pixel is delayed, and accordingly, transfer charge quantity Q3 does not reach the saturation level SL. On the other hand, with the short-time-exposure pixels, as shown in a solid line 180, before the charge storage of the PD is sufficiently executed, the transfer timings 170 through 177 as to the FD come, and accordingly, transfer charge quantity Q4 at each exposure becomes extremely small. Therefore, there is a possibility that charge to be transferred may be lost in noise.

As described above, a pixel which executes long-time exposure consecutively, and a pixel which executes short-time exposure intermittently can be used generally within the same period by controlling the two types of pixels, and accordingly, even in the case of a bright subject or a dark subject, at least any one of effective signals can be output. Thus, the two types of signals output from the solid-state imaging device 13 are used to generate an image, whereby a high-dynamic-range image of which the luminance difference between a bright portion and a dark portion is great can be generated. Also, a high-dynamic-range scene of which the luminance difference between a bright portion and a dark portion is great can be imaged without causing whiteout and blackout.

Figure 6:
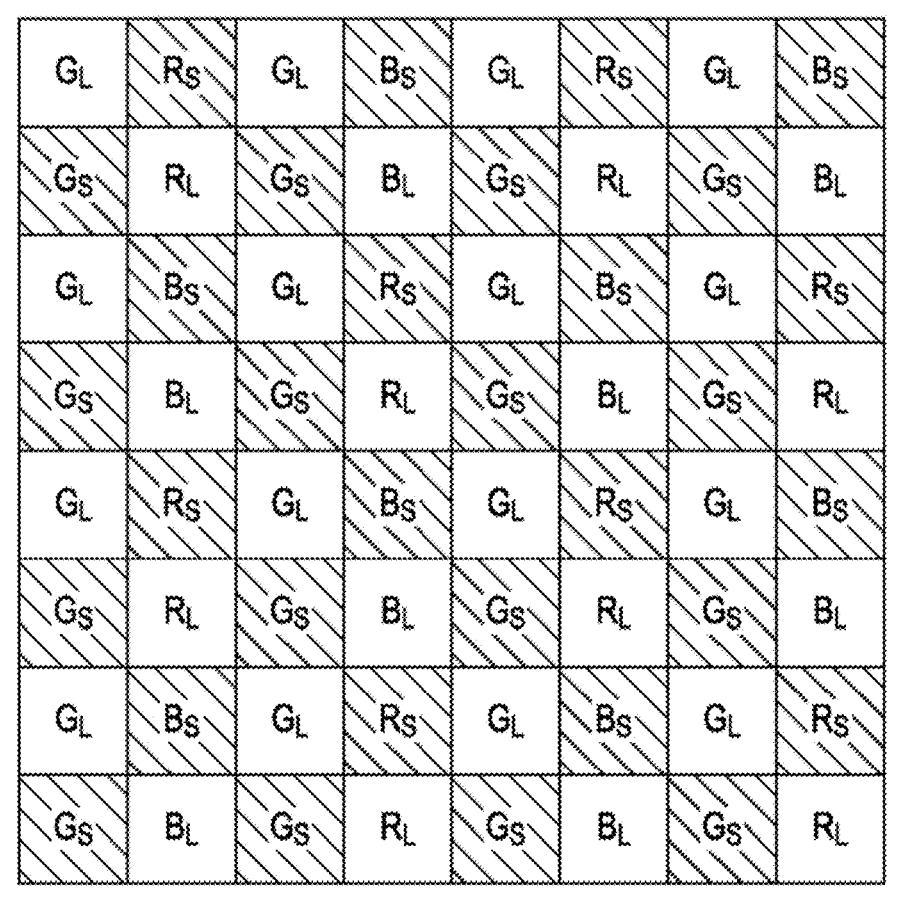

FIG. 6 is a diagram illustrating an example of the pixel array of a color filter to be mounted on the light receiving portion of the solid-state imaging device 13 according to the first embodiment of the present invention. In FIG. 6, each square schematically represents a pixel. With the first embodiment of the present invention, a color filter of three colors of R, G, and B made up of G (Green), R (Red), and B (Blue) is illustrated as an example. Here, squares not hatched indicate long-time-exposure pixels, and squares internally hatched indicate short-time-exposure pixels. Also, a symbol that indicates the type of the color filter is shown in the inside of each square. For example, of G pixels, "$G_L$" is appended to a long-time-exposure pixel, and "$G_S$" is appended to a short-time-exposure pixel. Also, of R pixels, "$R_L$" is appended to a long-time-exposure pixel, and "$R_S$" is appended to a short-time-exposure pixel. Further, of B pixels, "$B_L$" is appended to a long-time-exposure pixel, and "$B_S$" is appended to a short-time-exposure pixel. Note that G pixels are an example of pixels having first spectral sensitivity that realizes a feature of the present invention. Also, R pixels are an example of pixels having second spectral sensitivity that realizes a feature of the present invention. Further, B pixels are an example of pixels having third spectral sensitivity that realizes a feature of the present invention.

FIG. 6 illustrates an example wherein long-time-exposure pixels and short-time-exposure pixels are disposed in a checkered pattern. With the color filer for three colors of RGB, Long-time-exposure pixels and short-time-exposure pixels are disposed in a Bayer array inclined 45 degrees. With the example shown in FIG. 6, with regard to the spatial layout of pixel exposure control, and the spatial layout of colors, the density and isotropy of the spatial layout of exposure control have priority over the spatial layout of colors. Thus, with a high-dynamic-range image, a pixel layout advantageous to the spatial layout for exposure control can be provided.

Figure 7:
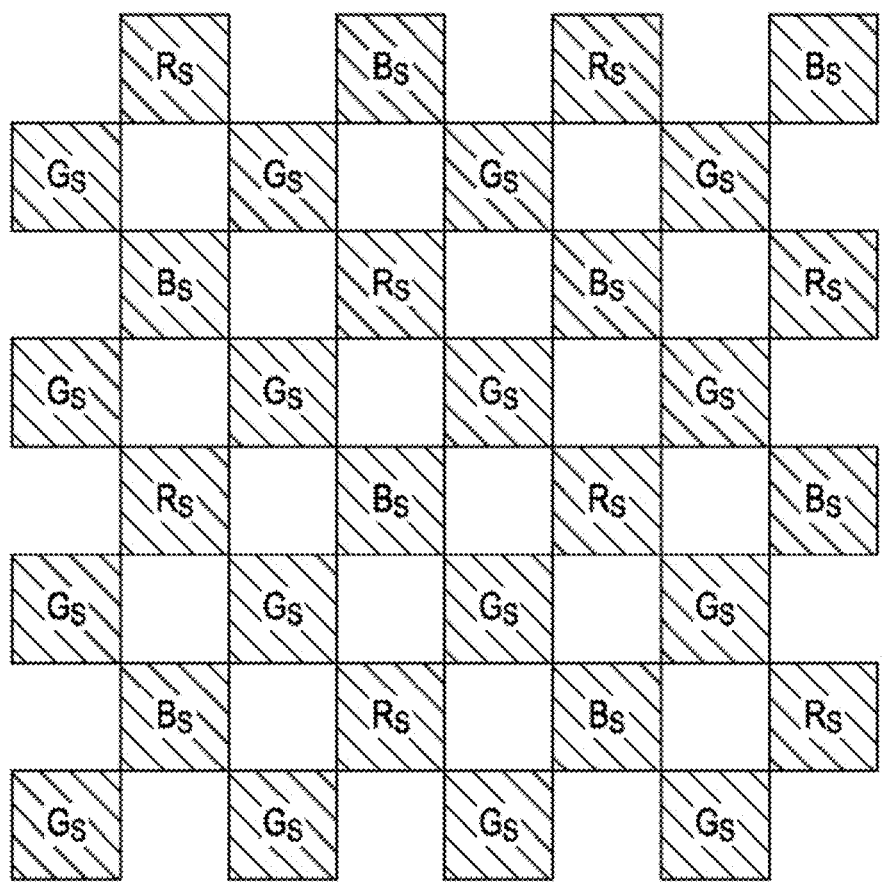
FIG. 7 is a diagram schematically illustrating the pixel array of a short-time-exposure mosaic image to be imaged intermittently with short-time exposure by the solid-state imaging device according to the first embodiment of the present invention.

FIG. 7 is a diagram schematically illustrating the pixel array of a short-time-exposure mosaic image to be imaged intermittently with short-time exposure by the solid-state imaging device 13 according to the first embodiment of the present invention. The pixel array of the short-time-exposure mosaic image shown in FIG. 7 corresponds to the pixel array of the solid-state imaging device 13 shown in FIG. 6. This short-time-exposure mosaic image is data wherein the information of long-time-exposure pixel positions are excluded from the pixel array of the solid-state imaging device 13 shown in FIG. 6.

Figure 8:
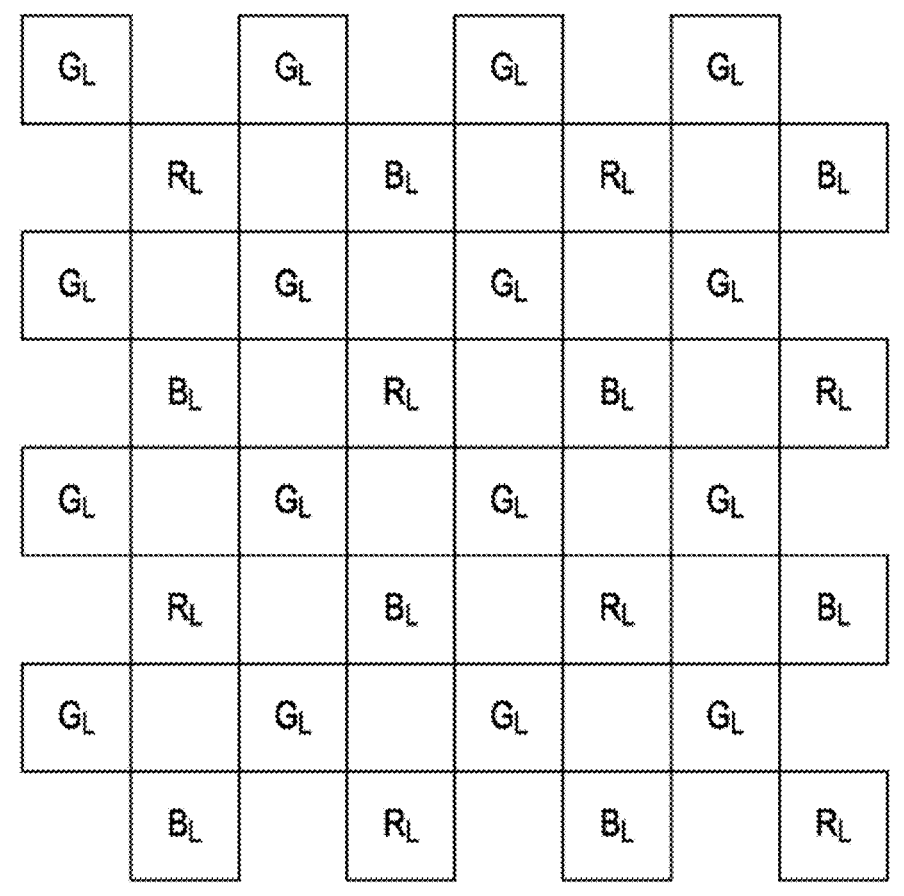

FIG. 8 is a diagram schematically illustrating an example of the pixel array of a long-time-exposure mosaic image to be imaged with long-time exposure by the solid-state imaging device 13 according to the first embodiment of the present invention. The pixel array of the long-time-exposure mosaic image shown in FIG. 8 corresponds to the pixel array of the solid-state imaging device 13 shown in FIG. 6. This long-time-exposure mosaic image is data wherein the information of short-time-exposure pixel positions are excluded from the pixel array of the solid-state imaging device 13 shown in FIG. 6.

Next, the signal process executed by the image processing circuit 23 will be described in detail with reference to the drawing. The signal process shown in each embodiment of the present invention is realized by the computation unit within the image processing circuit 23 executing calculation described with predetermined program code as to the digital signal (image data) input to the image processing circuit 23. Therefore, each of the processing increments within the program will be described as a function block, and the sequence executed by each process will be described with a flowchart. Note that, in addition to an embodiment by a program described with each embodiment of the present invention, an arrangement may be made wherein a hardware circuit which realizes a process equivalent to the function block shown below is implemented.

Figure 9:
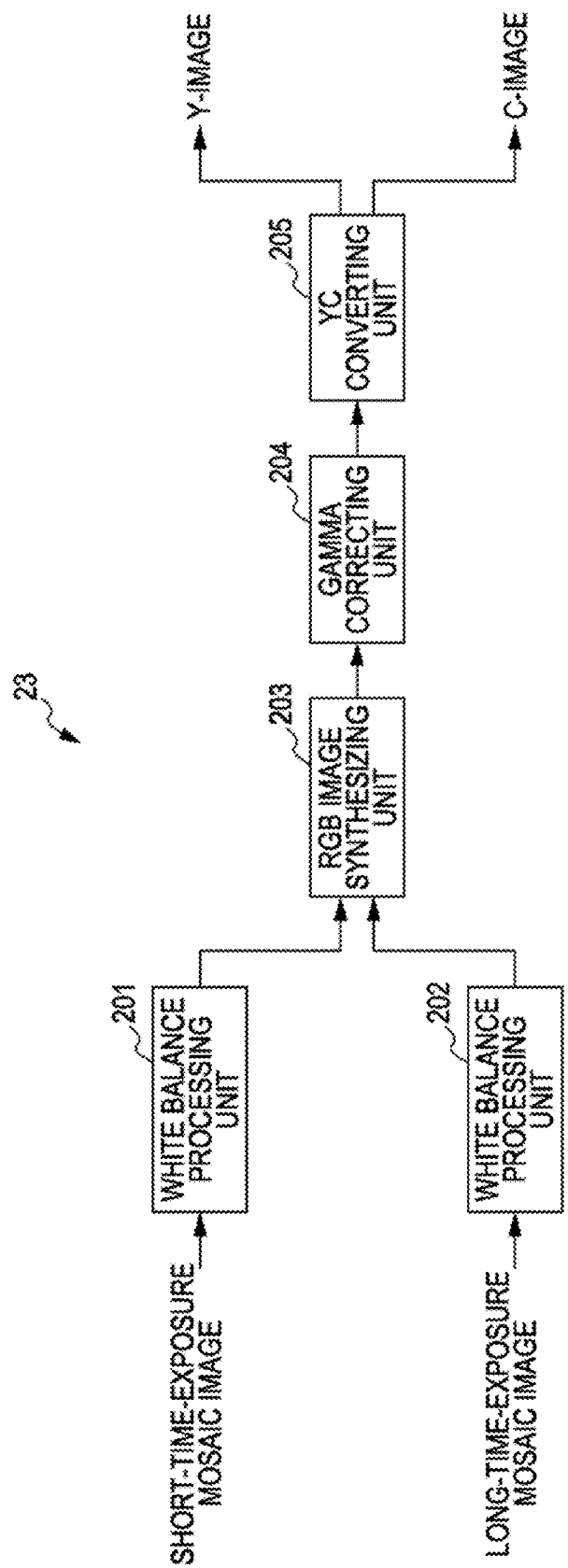
FIG. 9 is a block diagram illustrating a functional configuration example of an image processing circuit according to the first embodiment of the present invention.

FIG. 9 is a block diagram illustrating a functional configuration example of the image processing circuit 23 according to the first embodiment of the present invention. Note that FIG. 9 illustrates the configuration of the whole signal process executed by the image processing circuit 23. The image processing circuit 23 includes white balance processing units 201 and 202, an RGB image synthesizing unit 203, a gamma correcting unit 204, and a YC converting unit 205.

The white balance processing unit 201 subjects a short-time-exposure mosaic image imaged intermittently with short-time exposure by the solid-state imaging device 13 (see FIG. 7) to a white balance process, and outputs the image data subjected to the white balance process to the RGB image synthesizing unit 203. The white balance processing unit 202 subjects a long-time-exposure mosaic image imaged with long-time exposure by the solid-state imaging device 13 (see FIG. 8) to a white balance process, and outputs the image data subjected to the white balance process to the RGB image synthesizing unit 203. Such a white balance process is a process to apply a suitable coefficient to a mosaic image according to the color that each of pixel intensities has such that the color balance of an achromatic color subject area becomes achromatic, for example.

The RGB image synthesizing unit 203 synthesizes a short-time-exposure mosaic image and a long-time-exposure mosaic image, subjected to the white balance process, synthesizes high-dynamic-range RGB images, and outputs the synthesized RGB image to the gamma correcting unit 204. Note that the RGB image synthesizing unit 203 will be described in detail with reference to FIG. 10 and other drawings.

The gamma correcting unit 204 subjects the RGB image synthesized by the RGB image synthesizing unit 203 to gamma correction, and outputs the RGB image subjected to the gamma correction to the YC converting unit 205. The YC converting unit 205 is a YC matrix unit which converts the RGB image subject to the gamma correction by the gamma correcting unit 204 into a Y-image and a C-image. Subsequently, the converted Y image and C image are supplied to the display driver 41 and the encoder/decoder 31.

Thus, the image processing circuit 23 inputs the two types of image data of multiple mosaic images imaged intermittently with short-time exposure, and a mosaic image imaged with long-time exposure, and outputs the Y-image and C-image of a high-dynamic-range based on these two types of image data.

Figure 10:
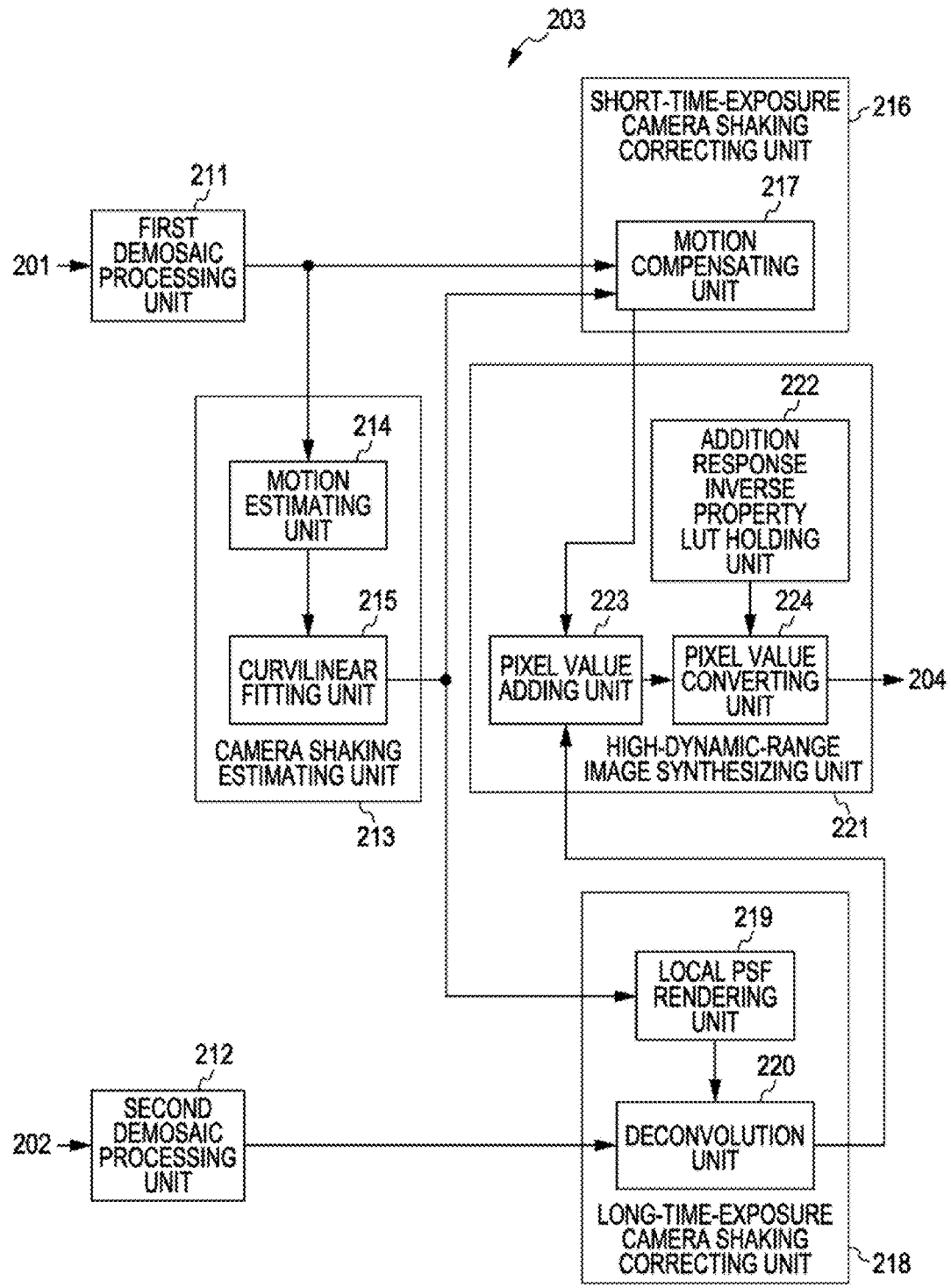
FIG. 10 is a block diagram illustrating a functional configuration example of an RGB image synthesizing unit according to the first embodiment of the present invention.

FIG. 10 is a block diagram illustrating a functional configuration example of the RGB image synthesizing unit 203 according to the first embodiment of the present invention. The RGB image synthesizing unit 203 includes a first demosaic processing unit 211, a second demosaic processing unit 212, a camera shaking estimating unit 213, a short-time-exposure camera shaking correcting unit 216, a long-time-exposure camera shaking correcting unit 218, and a high-dynamic-range image synthesizing unit 221.

The first demosaic processing unit 211 subjects each of the multiple short-time-exposure mosaic images subjected to the white balance processing by the white balance processing unit 201 to a demosaic process to generate multiple short-time-exposure RGB images, and subsequently, outputs each of the generated short-time-exposure RGB images to the camera shaking estimating unit 213 and the short-time-exposure camera shaking correcting unit 216. Note that the short-time-exposure RGB images are images having the intensities of all the channels of R, G, and B at each pixel position.

The second demosaic processing unit 212 subjects the long-time-exposure mosaic image subjected to the white balance processing by the white balance processing unit 202 to a demosaic process to generate a long-time-exposure RGB image, and subsequently, outputs the generated long-time-exposure RGB image to the long-time-exposure camera shaking correcting unit 218. Note that the long-time-exposure RGB image is an image having the intensities of all the channels of R, G, and B at each pixel position.

Here, the demosaic processes by the first and second demosaic processing units 211 and 212 is an interpolation process wherein the values of RGB at all the pixel positions including a pixel position where pixel information has been missed are calculated such that each pixel position has the intensities of all the channels of R, G, and B. For example, as shown in FIGS. 7 and 8, with either one of a short-time-exposure mosaic image and a long-time-exposure mosaic image, upon the pixel array being rotated 45 degrees, the pixel array thereof becomes a Bayer array. Therefore, for example, the first and second demosaic processing units 211 and 212 can apply a demosaic process for a common Bayer array to the Bayer array where each mosaic image is inclined obliquely. Subsequently, the RGB values of a missed pixel position are subjected to bilinear interpolation from the surrounding pixels, whereby the demosaic process of each mosaic image is executed. Note that description has been made regarding an example wherein each mosaic image is inclined obliquely, and is subjected to the demosaic process, but another demosaic process may be applied thereto.

The camera shaking estimating unit 213 includes a motion estimating unit 214, and a curvilinear fitting unit 215, and calculates the motion of the camera (camera shaking information) during an exposure period based on the multiple short-time-exposure RGB images output from the first demosaic processing unit 211. Note that the camera shaking estimating unit 213 is an example of the shaking estimating unit referred to in the Summary of the Invention.

The motion estimating unit 214 calculates inter-frame camera shaking information that is camera shaking information between frames adjacent to each other on the temporal axis regarding the multiple short-time-exposure RGB images output from the first demosaic processing unit 211, and subsequently, outputs the calculated inter-frame camera shaking information to the curvilinear fitting unit 215. With the first embodiment of the present invention, an example will be described wherein a camera motion matrix between images is employed as this inter-frame camera shaking information. Now, with the first embodiment of the present invention, an example will be described wherein an affine matrix. H is employed as a camera motion matrix, which executes coordinate transformation from a point m1 on an image to a point m2 on the image, such as shown in Expression 1. This affine matrix H is a matrix of 3×3, i.e., a transformation matrix with six degrees of freedom.

$$m_2 = H m_1 \qquad \text{Expression 1}$$

$$m_2 = \begin{bmatrix} x_2 \\ y_2 \\ 1 \end{bmatrix}$$

$$H = \begin{bmatrix} a & b & c \\ d & e & f \\ 0 & 0 & 1 \end{bmatrix}$$

$$m_1 = \begin{bmatrix} x_1 \\ y_1 \\ 1 \end{bmatrix}$$

Now, the calculation method of an affine matrix by the motion estimating unit 214 will be described. For example, two images (frames) adjacent to each other on the temporal axis are obtained regarding the multiple short-time-exposure RGB images output from the first demosaic processing unit 211. Of these two images, let us say that an image of which the point-in-time on the temporal axis is earlier is taken as an image 1, and an image of which the point-in-time is later is taken as an image 2. Subsequently, extraction of feature points of the images 1 and 2 is executed. For example, edge detection technology is employed so as to extract a point of which the gradient of the edge is strong in the vertical direction and in the horizontal direction (e.g., corner point) as a feature point. Also, another feature point extracting process may be employed to extract a feature point where search for a matched point between images can be performed.

Subsequently, matching between the feature points extracted from the image 1 and the feature points extracted from the image 2 is executed. This matching between the feature points is to extract a pair of feature points regarded as the same subject regarding the images 1 and 2. For example, a technique may be employed as this matching method for feature points wherein a pair of similar feature points is extracted based on an index such as a normalized function between rectangular images around a feature point. Also, as long as a camera motion matrix can be calculated correctly, another matching method may be employed. For example, a gradient method, a block matching method, or the like may be employed.

Subsequently, an affine matrix is calculated by using the extracted matched point pairs (matched feature point pairs). For example, an affine matrix calculation method employing RANSAC (RANdom SAmple Consensus) may be employed as this affine matrix calculating method. Specifically, an operation is repeated wherein a matched points pair is selected from the extracted matched points pairs randomly, and the selected matched points pair is used to carry out least squares estimation of an affine matrix. Subsequently, the calculated affine matrix that decreases inexplicable matched point pairs as less as possible is selected as an estimation result. With this example, the affine matrix calculating method employing RANSAC has been described as an example, but another affine matrix calculating method may be employed.

Thus, the calculated affine matrix is written in the memory within the motion estimating unit 214. Also, with regard to the other short-time-exposure RGB images output from the first demosaic processing unit 211 as well, similarly, an affine matrix between two images adjacent to each other on the temporal axis is calculated sequentially, and is written in the memory. Thus, the motion estimating unit 214 calculates discrete temporal change of each component of the coordinate transformation matrix between images making up the multiple short-time-exposure images, and is an example of the calculating unit referred to in the Summary of the Invention.

The curvilinear fitting unit 215 calculates camera shaking information within a certain section (long-time-exposure section) regarding the multiple short-time-exposure RGB image output from the first demosaic processing unit 211. Specifically, the curvilinear fitting unit 215 calculates control points of a spline curve (spline control points) that connect camera shaking between images smoothly, as camera shaking information, based on the inter-frame camera shaking information (affine matrix) output from the motion estimating unit 214, and subsequently outputs the calculated spline control points to the short-time-exposure camera shaking correcting unit 216 and the long-time-exposure camera shaking correcting unit 218. Here, with the first embodiment of the present invention, spline control points that determine a spline curve that indicates the temporal change of each component of a motion matrix that represents a motion of the camera will be described as camera shaking information. This calculation method for spline control points will be described in detail with reference to the next drawing.

Figure 11A:
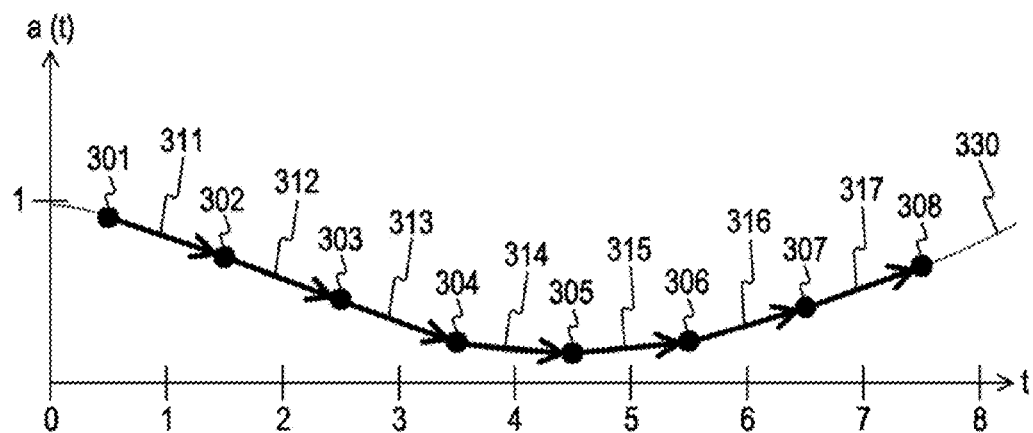
FIGS. 11A and 11B are diagrams illustrating spline control points calculated by a curvilinear fitting unit according to the first embodiment of the present invention, and an affine matrix (inter-frame camera shaking information) employed at the time of calculating these.
Figure 11B:
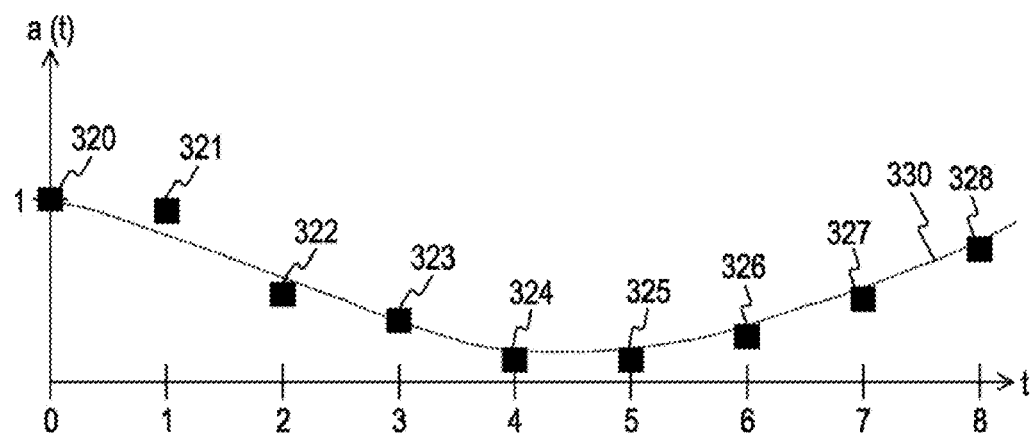

FIGS. 11A and 11B are diagrams illustrating spline control points calculated by the curvilinear fitting unit 215 according to the first embodiment of the present invention, and an affine matrix (inter-frame camera shaking information) employed at the time of calculating these. FIG. 11A illustrates a graph that represents change of one component of the affine matrix output from the motion estimating unit 214 in chronological order, and FIG. 11B illustrates a graph that represents spline control points calculated based on the change of one component of the affine matrix thereof. Here, with the graphs illustrated in FIGS. 11A and 11B, the horizontal axes are temporal axes, and the vertical axes are axes that indicate the value of one component of the affine matrix. Note that the images are exposed sequentially along time course, and accordingly, scale marks with a frame of the multiple short-time-exposure RGB images as increments are appended to the horizontal axes of the graphs illustrated in FIGS. 11A and 11B. For example, the first (0'th) short-time exposure is started at t=0, and is ended at t=1. Also, in FIGS. 11A and 11B, the first component a of the affine matrix shown in Expression 1 will be described as an example of a component of the affine matrix. Also, the example shown in FIGS. 11A and 11B illustrate a case where eight short-time-exposure images are generated while one long-time-exposure image is generated (long-time-exposure section) as an example.

Here, the affine matrix calculated by the motion estimating unit 214 is equivalent to temporal change from the exposure point-in-time of one short-time-exposure image to the exposure point-in-time of the next short-time-exposure image. Also, the length of the exposure of each short-time-exposure image is one section on the horizontal axis of the graphs shown in FIGS. 11A and 11B, but it is desirable to typify the exposure point-in-time by using the center position of the section thereof. Therefore, the temporal change of one component of the affine matrix between short-time-exposure images can be represented with arrows 311 through 317 wherein "i−0.5" is taken as a starting point, and "i+0.5" on the horizontal axis is taken as a terminal point (i is an integer (1≤i≤7)), as shown in FIG. 11A. Note that in FIG. 11A, the starting point or terminal point of the arrows 311 through 317 are indicated with points 301 through 308.

Here, the affine matrix is a matrix that indicates relative motion between two images. Therefore, in order to draw a spline curve on the graph shown in FIG. 11A, a position serving as a reference on the vertical axis relating to each component of the affine matrix has to be set. Therefore, with the graph shown in FIG. 11A, the point-in-time position serving as a camera position reference is set to one position on the horizontal axis. For example, let us say that the point-in-time position serving as a camera position reference is set to t=0, and the value of the vertical axis in this case is set to a=1. Description will be made below regarding the case where the point-in-time position serving as a camera position reference is set to t=0, but may be set to another position on the horizontal axis as a camera position reference. Also, even in a case where any position on the horizontal axis is set, the calculation method for a spline curve described below holds.

The curvilinear fitting unit 215 calculates, for example, a curve such that the starting point through the terminal point 301 through 308 of the arrows 311 through 317 shown in FIG. 11A are connected, as a spline curve. With the graphs shown in FIGS. 11A and 11B, this spline curve is, for example, a smooth parametric curve (a curve 330 indicated with a dashed line on the graphs) from point-in-time t=0 to t=8, and is calculated based on the temporal change of the component a of the affine matrix H shown in Expression 1. The spline curve thus calculated is shown in the dashed line 330 in the graphs shown in FIGS. 11A and 11B. Specifically, the spline curve may be calculated by employing a three-dimensional B-spline function a(t) shown in Expression 2. Note that N in the right side of Expression 2 can be represented by employing Expression 3.

$$a(t) = \sum_{i=0}^{n-1} N_{i,4}(t) A_i \quad \text{Expression 2}$$

$$N_{i,k}(t) = \frac{(t - x_i) N_{i,k-1}(t)}{x_{i+k-1} - x_i} + \frac{(x_{i+k} - t) N_{i+1,k-1}(t)}{x_{i+k} - x_{i+1}} \quad \text{Expression 3}$$

$$\begin{cases} \sum_{i=0}^{n-1} N_{i,4}(0) A_i = 1 \\ \sum_{i=0}^{n-1} \{N_{i,4}(1.5) - N_{i,4}(0.5)\} A_i = \Delta a_{0 \to 1} \\ \sum_{i=0}^{n-1} \{N_{i,4}(2.5) - N_{i,4}(1.5)\} A_i = \Delta a_{1 \to 2} \\ \sum_{i=0}^{n-1} \{N_{i,4}(3.5) - N_{i,4}(2.5)\} A_i = \Delta a_{2 \to 3} \\ \sum_{i=0}^{n-1} \{N_{i,4}(4.5) - N_{i,4}(3.5)\} A_i = \Delta a_{3 \to 4} \\ \sum_{i=0}^{n-1} \{N_{i,4}(5.5) - N_{i,4}(4.5)\} A_i = \Delta a_{4 \to 5} \\ \sum_{i=0}^{n-1} \{N_{i,4}(6.5) - N_{i,4}(5.5)\} A_i = \Delta a_{5 \to 6} \\ \sum_{i=0}^{n-1} \{N_{i,4}(7.5) - N_{i,4}(6.5)\} A_i = \Delta a_{6 \to 7} \\ \sum_{i=0}^{n-3} N_{i+2,2}(0)(A_{i+2} - A_i) = 0 \\ \sum_{i=0}^{n-3} N_{i+2,2}(8)(A_{i+2} - A_i) = 0 \end{cases} \quad \text{Expression 4}$$

Here, $x_j (j=0, \ldots, 12)$ is a spline knot, and with this example, 13 integers of [0, 0, 0, 1, ..., 7, 8, 8, 8] are employed. Also, the spline control points $(A_0)$ 320 through $(A_8)$ 328 shown in FIG. 11B can be calculated by solving the simultaneous equation shown in Expression 4 by using the component a of the affine matrix. Here, $\Delta a_{i \rightarrow j}$ that appears in the right side of each simultaneous equation of Expression 4 represents the component a of the affine matrix of (i, j) between images. As shown in FIG. 11B, ten equations (Expression 4) are obtained as to the nine spline control points $(A_0)$ 320 through $(A_8)$ 328, and accordingly, these can be solved by the least square method. Note that the simultaneous equations shown in Expression 4 are simultaneous equations relating to the component a of the affine matrix. In the case of other components of the affine matrix, the right side value of the first equation shown in Expression 4 differs depending on the components. Specifically, with regard to the components a and e, the right side value of Expression 4 is "1", but with regard to the other components (b, c, d, and f), the right side value of Expression 4 is "0" (however, in the case of the reference being t=0). This is to correspond to a component of the unit matrix. Note that, in FIG. 11B, the calculated spline control points $(A_0)$ 320 through $(A_8)$ 328 are shown in solid squares. Also, according to the calculated spline control points $(A_0)$ 320 through $(A_8)$ 328, the shape of a spline curve is determined.

In FIG. 10, the short-time-exposure camera shaking correcting unit 216 corrects the camera shaking of the multiple short-time-exposure RGB images output from the first demosaic processing unit 211 based on the camera shaking information output from the curvilinear fitting unit 215, and subsequently, outputs the corrected short-time-exposure RGB images to the high-dynamic-range image synthesizing unit 221. That is to say, the short-time-exposure camera shaking correcting unit 216 includes a motion compensating unit 217, and this motion compensating unit 217 executes camera shaking compensation regarding each frame of the multiple short-time-exposure RGB images output from the first demosaic processing unit 211. According to this compensation, each pixel of the multiple short-time-exposure RGB images is overlapped on the same position, and is averaged.

Specifically, of the multiple short-time-exposure RGB images, the motion compensating unit 217 determines one frame serving as a camera position reference (e.g., image corresponding to t=0.5 in FIG. 11A) as a reference frame. Subsequently, of the pixel positions of the image (reference image) corresponding to this reference frame, the motion compensating unit 217 takes one pixel position as a reference pixel position, and calculates the pixel value of a position corresponding to the reference pixel position sequentially regarding each image (target image) other than the reference image. Here, an affine matrix from the reference image to the point-in-time t=0, and an affine matrix from the point-in-time t=0 to the target image can be calculated by using camera shaking information (spline control points). Therefore, the affine matrix thus calculated is used to obtain the position of the target image corresponding to the reference pixel position. Subsequently, the pixel value at the position of the target image corresponding to the obtained reference pixel position is calculated sequentially. Note that an arrangement may be made wherein the motion compensating unit 217 holds the affine matrix calculated by the motion estimating unit 214, and this affine matrix is used.

The motion compensating unit 217 adds the pixel value of each target image thus calculated to the pixel value at the position of the reference pixel of the reference image sequentially. Subsequently, in a case where addition of the pixel value of the reference pixel position of all the target images other than the reference image has been completed, the pixel value after addition relating to the reference pixel position is divided by the number of images serving as the target images for addition of pixel values to calculate an average value. Subsequently, the pixel value (average value) after division is written in the memory (not shown) within the motion compensating unit 217 as the camera shaking correction result of the reference pixel position. Subsequently, the reference pixel position of the reference image is changed sequentially, and in the same way as described above, calculation of an average value is executed sequentially regarding all the pixel positions of the reference image, and the average value thereof is written in the memory within the motion compensating unit 217 as the camera shaking correction result of the reference pixel position. Subsequently, calculation of an average value, and writing in the memory within the motion compensating unit 217 are repeated regarding all the pixel positions of the reference image until calculation of an average value, and writing in the memory within the motion compensating unit 217 are completed. Note that the short-time-exposure camera shaking correcting unit 216 is an example of the short-time-exposure shaking correcting unit referred to in the Summary of the Invention.

The long-time-exposure camera shaking correcting unit 218 corrects the camera shaking of the long-time-exposure RGB image output from the second demosaic processing unit 212 based on the camera shaking information output from the curvilinear fitting unit 215. Specifically, the long-time-exposure camera shaking correcting unit 218 includes a local PSF rendering unit 219, and a deconvolution unit 220. Note that the long-time-exposure camera shaking correcting unit 218 is an example of the long-time-exposure shaking correcting unit referred to in the Summary of the Invention.

The local PSF rendering unit 219 generates a local PSF image at each local area of an image based on the camera shaking information output from the curvilinear fitting unit 215, and outputs each generated local PSF image to the deconvolution unit 220. Note that a PSF (point spread function, point blurring function) is a function that indicates that when a point light source is given as input, how much blurring image appears as output. A PSF image is calculated to correct an image by using this PSF. That is to say, the local PSF rendering unit 219 calculates a local PSF image regarding each of rectangular small areas (i, j) divided from the long-time-exposure RGB image. Specifically, the local PSF rendering unit 219 reads out a minimal PSF image stored as data beforehand. Here, the minimal PSF image is image data that represents the PSF of the imaging system thereof in the case of having no camera shaking. Subsequently, the variable t that represents point-in-time is initialized to 0. Subsequently, the movement position due to camera shaking at the center pixel position of a small area at point-in-time t is calculated from the camera shaking information regarding each point-in-time t graduated with a suitable step size. Specifically, Expression 1 is used to calculate the movement position (x(t), y(t)) from the center pixel position (x(0), y(0)) of the small area in the case of t=0. Here, the affine matrix H shown in Expression 1 can be calculated by substituting the point-in-time t for Expression 2 that indicates the temporal change of the affine matrix H. Subsequently, the minimal PSF image is drawn at the movement position (x(t), y(t)) at the calculated point-in-time t. In a case where the result drawn before the point-in-time t, and the drawn area are overlapped at the time of this drawing, the drawn value is integrated to the value so far, rather than being overwritten. Subsequently, the point-in-time t is advanced by the minute step size $\Delta t$. In a case where the new point-in-time t has passed the exposure finish point-in-time, the drawn result so far is written in the memory within the local PSF rendering unit 219 as a local PSF image. Note that the local PSF rendering unit 219 is an example of the rendering unit referred to in the Summary of the Invention.

The deconvolution unit 220 executes a blurring correcting process for each spot regarding the long-time-exposure RGB image output from the second demosaic processing unit 212 based on the local PSF image output from the local PSF rendering unit 219. A long-time-exposure RGB image of which the camera shaking correction has been executed is generated by this blurring correction process, and the generated long-time-exposure RGB image is output to the high-dynamic-range image synthesizing unit 221. Specifically, the deconvolution unit 220 generates a tentative resulting image X to execute long-time-exposure camera shaking correction, and initializes this tentative resulting image X by using the long-time-exposure RGB image output from the second demosaic processing unit 212. That is to say, the tentative resulting image X is replaced with the long-time-exposure RGB image. Subsequently, the long-time-exposure RGB image is divided into small rectangular areas, and regarding each small area after division, the values of the local PSF image corresponding to the small areas $(i, j)$ generated by the local PSF rendering unit 219 are converted into a matrix format to generate a matrix $A(i, j)$. Here, if we say that the sizes of the small areas $(i, j)$ are $(m \times n)$, the matrix $A(i, j)$ is a matrix of $((m \times n) \times (m \times n))$, and each row of the matrix $A(i, j)$ represents the coefficient of a local PSF at each pixel position of the small areas $(i, j)$ (the pixel value of the local PSF image). Also, let us say that the size of the local PSF image of each of the small areas $(i, j)$ generated by the local PSF rendering unit 219 is $(p \times q)$. In this case, of the $(m \times n)$ components of each row of the matrix $A(i, j)$, the coefficient of a local PSF is set to $(p \times q)$ components, and 0 is set to the remaining $((m \times n)-(p \times q))$ components. Note that which component the coefficient of a local PSF is set to depends on which pixel position of the small areas $(i, j)$ the row thereof corresponds to. Also, the deconvolution unit 220 converts the pixel value of each of the small areas $(i, j)$ after division of the long-time-exposure RGB image into a vector format to create a vector $b(i, j)$. Now, if we say that the sizes of the small areas $(i, j)$ after division of the long-time-exposure RGB image are $(m \times n)$, the vector $b(i, j)$ is a column vector of $((m \times n) \times 1)$ where the pixel values thereof are arrayed in one column sequentially. Subsequently, the deconvolution unit 220 creates a matrix $A(i, j)$ and a vector $b(i, j)$ regarding all of the small areas $(i, j)$.

Also, after a matrix $A(i, j)$ and a vector $b(i, j)$ are created regarding all of the small areas $(i, j)$, the deconvolution unit 220 converts the portions corresponding to the small areas $(i, j)$ into a vector format regarding each of the small areas $(i, j)$ of the tentative resulting image X. According to this conversion, the deconvolution unit 220 creates a vector $x(i, j)$. Now, if we say that the sizes of the small areas $(i, j)$ are $m \times n$, the vector $x(i, j)$ is a column vector of $(m \times n) \times 1$ where the pixel values of the small areas $(i, j)$ are arrayed in one column sequentially. Subsequently, the deconvolution unit 220 updates the vector $x(i, j)$ based on Expression 5 (in Expression 5, a tilde is appended to the vector x after updating), and calculates difference $\Delta x(i, j)$ between the vector $x(i, j)$ and the vector x (x with a tilde) $(i, j)$ after updating. In Expression 5, $\lambda$ is a constant that has been set beforehand. Here, the vector x (x with a tilde) $(i, j)$ after updating and the difference $\Delta x(i, j)$ before and after updating are also column vectors of $(m \times n) \times 1$. Note that the unit matrix I shown in Expression 5 is a matrix of $((m \times n) \times (m \times n))$.

$$\tilde{x}_{(i,j)} = x_{(i,j)} + A^+_{(i,j)}(b_{(i,j)} - A_{(i,j)} x_{(i,j)})$$

$$A^+_{(i,j)} = (A^t_{(i,j)} A_{(i,j)} - \lambda^2 I)^{-1} A^t_{(i,j)} \qquad \text{Expression 5}$$

Subsequently, in the case of the difference $\Delta x(i, j)$ being calculated regarding all the small areas, the deconvolution unit 220 updates the tentative resulting image X based on the vector $x(i, j)$ after updating of each of the small areas. Subsequently, the deconvolution unit 220 calculates an evaluated value $\min(\Delta x(i, j))$. Here, the evaluated value $\min(\Delta x(i, j))$ indicates a minimum value function that represents the minimum value of the absolute values of the difference $\Delta x(i, j)$. Subsequently, the deconvolution unit 220 determines whether or not the evaluated value $\min(\Delta x(i, j))$ becomes smaller than a predetermined reference $\epsilon 1$. The deconvolution unit 220 repeats the creation process of the vector $x(i, j)$, and the calculation process of the difference $\Delta x(i, j)$ until the evaluated value $\min(\Delta x(i, j))$ becomes smaller than the reference $\epsilon 1$. Also, in the case of the evaluated value $\min(\Delta x(i, j))$ becoming smaller than the reference $\epsilon 1$, the deconvolution unit 220 outputs the tentative resulting image X at that time as a long-time-exposure RGB image after the camera shaking correction.

The high-dynamic-range image synthesizing unit 221 synthesizes the short-time-exposure RGB image subjected to the camera shaking correction by the short-time-exposure camera shaking correcting unit 216, and the long-time-exposure RGB image subjected to the camera shaking correction by the long-time-exposure camera shaking correcting unit 218 to generate a high-dynamic-range image, and outputs this to the gamma correcting unit 204. Specifically, the high-dynamic-range image synthesizing unit 221 includes an addition response inverse property LUT holding unit 222, and a pixel value adding unit 223, and a pixel value converting unit 224. Note that the high-dynamic-range image synthesizing unit 221 is an example of the image synthesizing unit referred to in the Summary of the Invention.

The addition response inverse property LUD holding unit 222 holds an addition response inverse property LUT (Look up Table), and supplies the held addition response inverse property LUT to the pixel value converting unit 224. Note that the addition response inverse property LUT will be described in detail with reference to FIGS. 12A and 12B.

The pixel value adding unit 223 adds the pixel values of the two images output from the short-time-exposure camera shaking correcting unit 216 and the long-time-exposure camera shaking correcting unit 218 for each pixel, and outputs the addition pixel value that is the addition result to the pixel value converting unit 224. Specifically, the pixel value adding unit 223 adds the pixel values of the same pixel position (target pixel position) for each pixel regarding the short-time-exposure RGB image subjected to the camera shaking correction, and the long-time-exposure RGB image subjected to the camera shaking correction.

The pixel value converting unit 224 uses the addition response inverse property LUT held at the addition response inverse property LUT holding unit 222 to convert the addition pixel value output from the pixel value adding unit 223. Specifically, the pixel value converting unit 224 uses the addition response inverse property LUT to correct the addition pixel value, and writes the corrected addition pixel value in the memory as the pixel value of the synthesis result at the target pixel position. Subsequently, upon writing of the pixel value of a synthesis result in all the pixel positions of the short-time-exposure RGB image subjected to the camera shaking correction, and the long-time-exposure RGB image subjected to the camera shaking correction being completed, this result image is output as a high-dynamic-range image.

Now, the addition response inverse property LUT used at the time of generating a high-dynamic-range image will be described in detail with reference to FIGS. 12A and 12B.

Figure 12A:
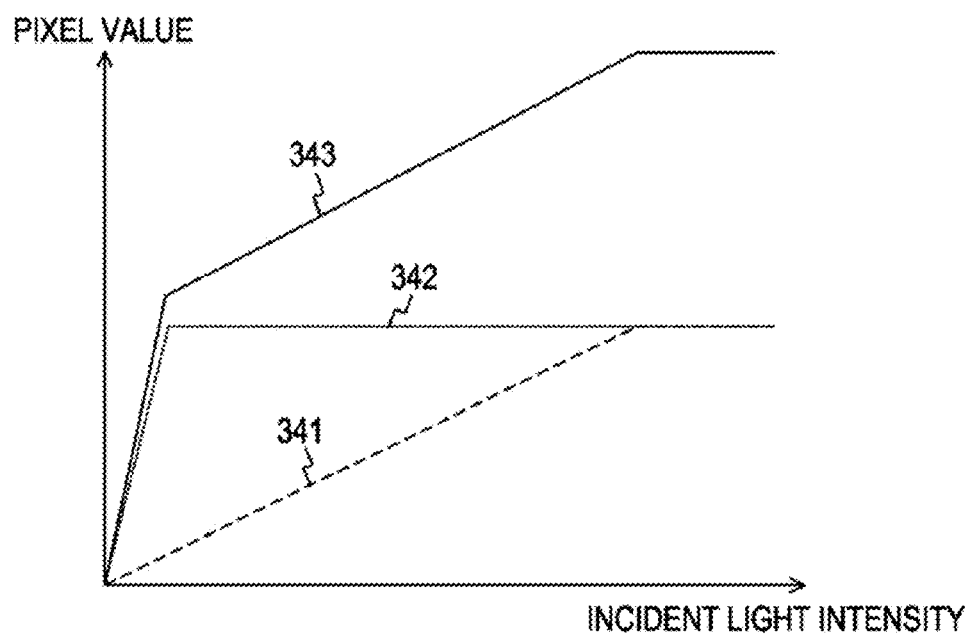
FIGS. 12A and 12B are diagrams illustrating relationship between incident light intensity as to the solid-state imaging device according to the first embodiment of the present invention, and the response property of a pixel value to be output.
Figure 12B:
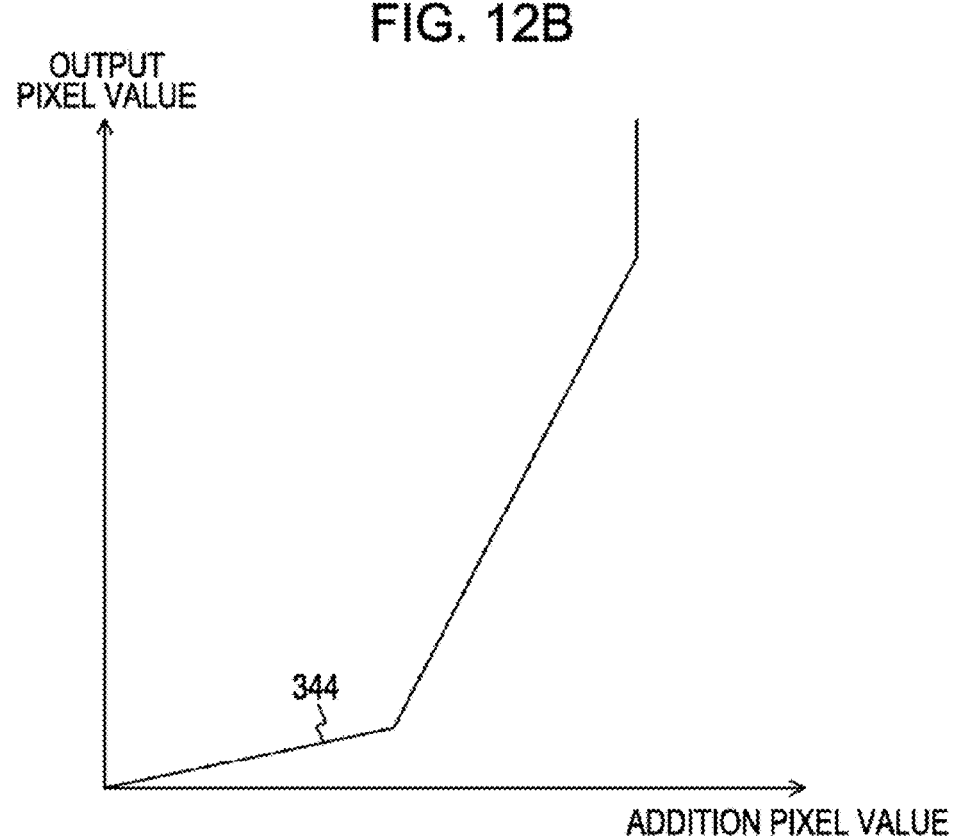

FIGS. 12A and 12B are diagrams illustrating relationship between incident light intensity as to the solid-state imaging device 13 according to the first embodiment of the present invention, and the response property of a pixel value to be output. FIG. 12A illustrates a graph wherein the horizontal axis indicates the value of incident light intensity as to the solid-state imaging device 13, and the vertical axis indicates a pixel value.

Solid-state imaging devices (image sensors) usually have linear property as to incident light intensity, and accordingly, the response property of a short-time-exposure image becomes, for example, such as a dashed line 341 shown in FIG. 12A. On the other hand, a long-time-exposure image of which the exposure is greater than short-time exposure, and accordingly, the response property of the long-time-exposure image becomes, for example, such as a dotted line 342 such as shown in FIG. 12A. Accordingly, the response property of an image to which the short-time-exposure image and the long-time-exposure image have been added becomes a solid line 343 shown in FIG. 12A. This addition response property may be calculated beforehand in the case of the property of the image sensor included in the imaging apparatus, and the exposure ratio between short-time exposure and long-time exposure being determined.

The addition response inverse property LUT is data wherein the inverse property of the above-mentioned addition response is represented with a table, and is used for inversely citing an addition pixel value wherein the property of the solid-state imaging device is considered. This addition response inverse property LUT becomes, for example, a shape such as shown in the solid line 344 on the graph in FIG. 12B. Note that the graph shown in FIG. 12B is a graph wherein the horizontal axis indicates an addition pixel value, and the vertical axis indicates an output pixel value. The pixel value converting unit 224 uses the graph shown in FIG. 12B to convert the addition pixel value output from the pixel value adding unit 223 into an output pixel value. Thus, a suitable high-dynamic-range image can be generated by converting the value obtained by adding the pixel values of a short-time-exposure image and a long-time-exposure image by using the addition response inverse property LUT. Also, luminance does not have to be matched to either a short-time-exposure image or a long-time-exposure image at the time of this image synthesis, whereby increase in noise can be prevented. Therefore, the S/N ratio can be improved.

Next, the operation of the imaging apparatus 100 according to the first embodiment of the present invention will be described with reference to the drawings.

FIG. 13 is a flowchart illustrating the procedure of the RGB image synthesizing unit 203 according to the first embodiment of the present invention.

First, in loop L900, the first demosaic processing unit 211 subjects the short-time-exposure mosaic image output from the white balance processing unit 201 to a demosaic process to generate a short-time-exposure RGB image (step S901). Upon the demosaic process being executed regarding the short-time-exposure mosaic image within the long-time exposure section output from the white balance processing unit 201, loop L900 is ended, and the flow proceeds to step S902.

Next, the second demosaic processing unit 212 subjects the long-time-exposure mosaic image output from the white balance processing unit 202 to the demosaic process to generate a long-time-exposure RGB image (step S902).

Subsequently, the camera shaking estimating unit 213 executes a camera shaking estimating process (step S910). This camera shaking estimating process will be described in detail with reference to FIGS. 14 through 16. Note that step S910 is an example of the shaking estimating procedure referred to in the Summary of the Invention.

Subsequently, the short-time-exposure camera shaking correcting unit 216 executes the camera shaking correcting process of the short-time-exposure RGB image (step S950). The camera shaking correcting process in step S950 will be described in detail with reference to FIG. 17. Note that step S950 is an example of the short-time-exposure shaking correcting procedure referred to in the Summary of the Invention.

Subsequently, the long-time-exposure camera shaking correcting unit 218 executes the camera shaking correcting process of the long-time-exposure RGB image (step S960). The camera shaking correcting process in step S960 will be described in detail with reference to FIGS. 18 and 19. Note that step S960 is an example of the long-time-exposure shaking correcting procedure referred to in the Summary of the Invention.

Subsequently, the high-dynamic-range image synthesizing unit 221 executes the synthesizing process of the high-dynamic-range image (step S990), and ends the process of the RGB image synthesizing unit 203. The synthesizing process of the high-dynamic-range image will be described in detail with reference to FIG. 20. Note that step S990 is an example of the image synthesizing procedure referred to in the Summary of the Invention.

FIG. 14 is a flowchart illustrating the procedure of the camera shaking estimating process (step S910 in FIG. 13) by the camera shaking estimating unit 213 according to the first embodiment of the present invention.

First, in Loop L911, the motion estimating unit 214 executes a motion estimating process to calculate an affine matrix between temporally adjacent frames regarding each short-time-exposure RGB image output from the first demosaic processing unit 211 (step S920). This motion estimating process will be described in detail with reference to FIG. 15. Upon the motion estimating process being executed regarding the short-time-exposure RGB image within the long-time-exposure section output from the first demosaic processing unit 211, loop L911 is ended, and the flow proceeds to step S930.

Next, the curvilinear fitting unit 215 executes a curvilinear fitting process to calculate control points of a spline curve (i.e., camera shaking information) that connect the shaking between images smoothly (step S930), and ends the operation of the camera shaking estimating process. This curvilinear fitting process will be described in detail with reference to FIG. 16.

FIG. 15 is a flowchart illustrating the procedure of the motion estimating process (step S920 in FIG. 14) by the motion estimating unit 214 according to the first embodiment of the present invention.

The motion estimating unit 214 obtains a temporally early image (image 1) on the temporal axis, of adjacent two images on the temporal axis (step S921), and of the two images thereof, obtains a temporally later image (image 2) (step S922).

Next, the motion estimating unit 214 extracts feature points of the image 1 (step S923), and extracts feature points of the image 2 (step S924). Subsequently, the motion estimating unit 214 executes matching between the feature points extracted from the image 1 and the feature points extracted from the image 2 to extract matched point pairs (step S925).

Next, the motion estimating unit 214 uses the extracted matched point pairs to calculate an affine matrix (step S926). Subsequently, the motion estimating unit 214 writes the calculated affine matrix in the memory (step S927), and ends the process of the motion estimating unit 214.

FIG. 16 is a flowchart illustrating the procedure of the curvilinear fitting process (step S930 in FIG. 14) by the curvilinear fitting unit 215 according to the first embodiment of the present invention.

The curvilinear fitting unit 215 reads out each affine matrix calculated by the motion estimating unit 214 from the memory (step S931). Subsequently, in loop L932, the curvilinear fitting unit 215 uses Expression 4 to calculate spline control points to determine a spline curve that is the temporal change of each component regarding six components of each affine matrix (step S933). Upon the process to calculate spline control points being executed regarding all of the six components of each affine matrix, loop L932 is ended, and the flow proceeds to step S934.

Next, the curvilinear fitting unit 215 writes all the calculated spline control points in the memory as camera shaking information (step S934), and ends the process of the curvilinear fitting unit 215.

Figure 17:
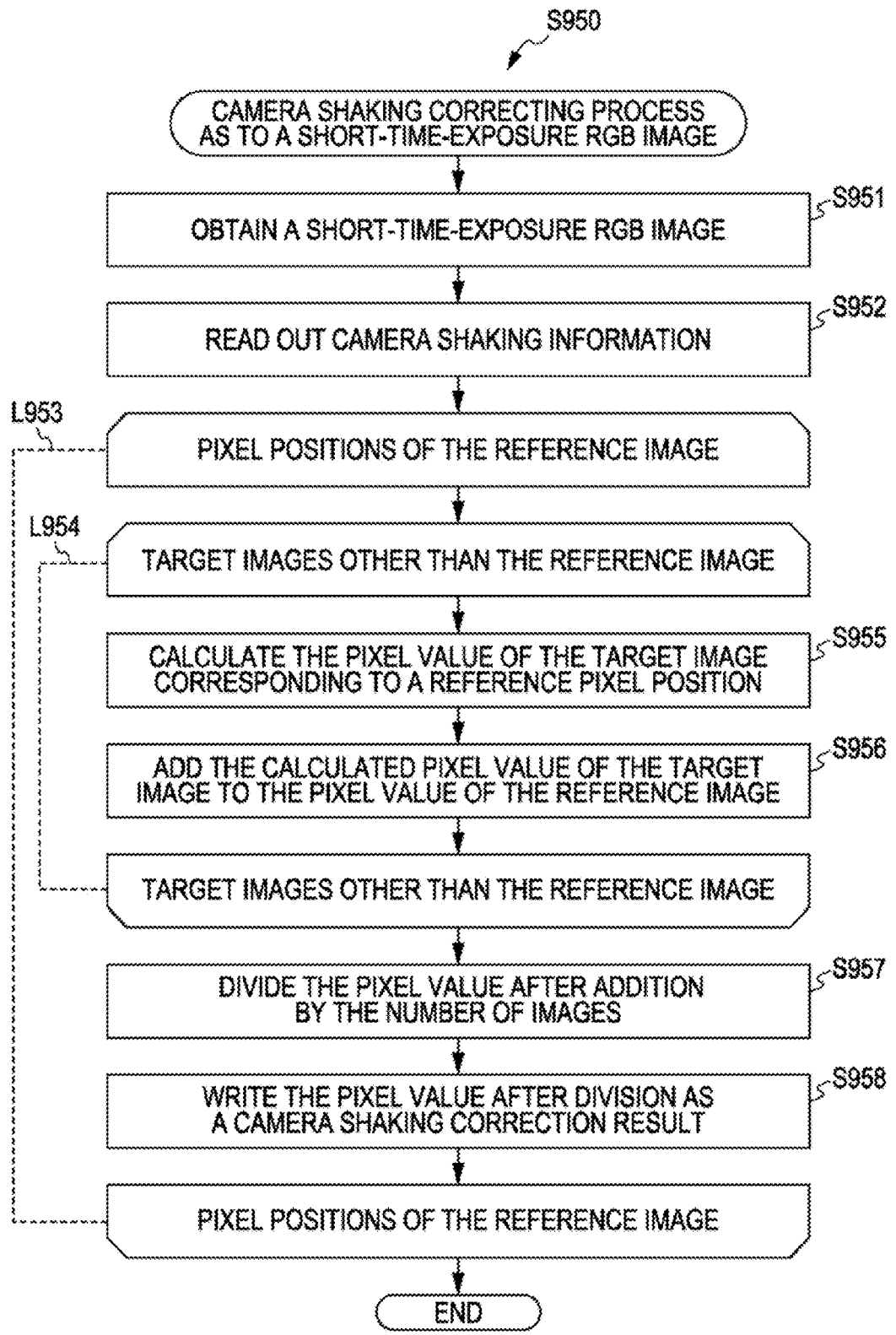
FIG. 17 is a flowchart illustrating the procedure of a camera shaking correcting process for a short-time-exposure RGB image by a short-time-exposure camera shaking correcting unit according to the first embodiment of the present invention.

FIG. 17 is a flowchart illustrating the procedure of the camera shaking correcting process for a short-time-exposure RGB image (step S950 in FIG. 13) by the short-time-exposure camera shaking correcting unit 216 according to the first embodiment of the present invention.

The short-time-exposure camera shaking correcting unit 216 obtains the short-time-exposure RGB image subject to the demosaic process by the first demosaic processing unit 211 (step S951), and subsequently, reads out camera shaking information (i.e., spline control points) (step S952).

Next, in loop L953, of the multiple short-time-exposure RGB images, the short-time-exposure camera shaking correcting unit 216 determines one reference image, and executes processes in loop L954 and steps S957 and S958 regarding each pixel position of this reference image. That is to say, the short-time-exposure camera shaking correcting unit 216 takes one pixel position of the reference image as a reference pixel position, and executes the processes in loop L954 and step S957 and S958 regarding this reference pixel position.

In loop L954, the short-time-exposure camera shaking correcting unit 216 determines one target image of the target images other than the reference image sequentially, calculates the pixel position corresponding to the reference pixel position regarding this one target image, and calculates the pixel value of the pixel position corresponding to this reference pixel position (step S955). Subsequently, the short-time-exposure camera shaking correcting unit 216 adds the calculated pixel value of the target image to the pixel value of the reference pixel position of the reference image (step S956). In loop L954, the short-time-exposure camera shaking correcting unit 216 repeats the above-mentioned steps until addition of the pixel value of the reference pixel position is completed regarding all the target images.

In the case of addition of the pixel value of the reference pixel position being completed regarding all the target images, loop L954 is ended, and the flow proceeds to step S957. Subsequently, the short-time-exposure camera shaking correcting unit 216 calculates an average value by dividing the pixel value after addition relating to the reference pixel position by the number of pixels serving as the targets for calculation of the pixel value (step S957). Subsequently, the short-time-exposure camera shaking correcting unit 216 writes the pixel value (average value) after division in the memory as the camera shaking correction result of the reference pixel position (step S958). Subsequently, in the case of calculation of an average value, and writing of camera shaking correction result in the memory being completed, loop L953 is ended, the operation of the camera shaking correcting process of the short-time-exposure RGB image is ended.

Figure 18:
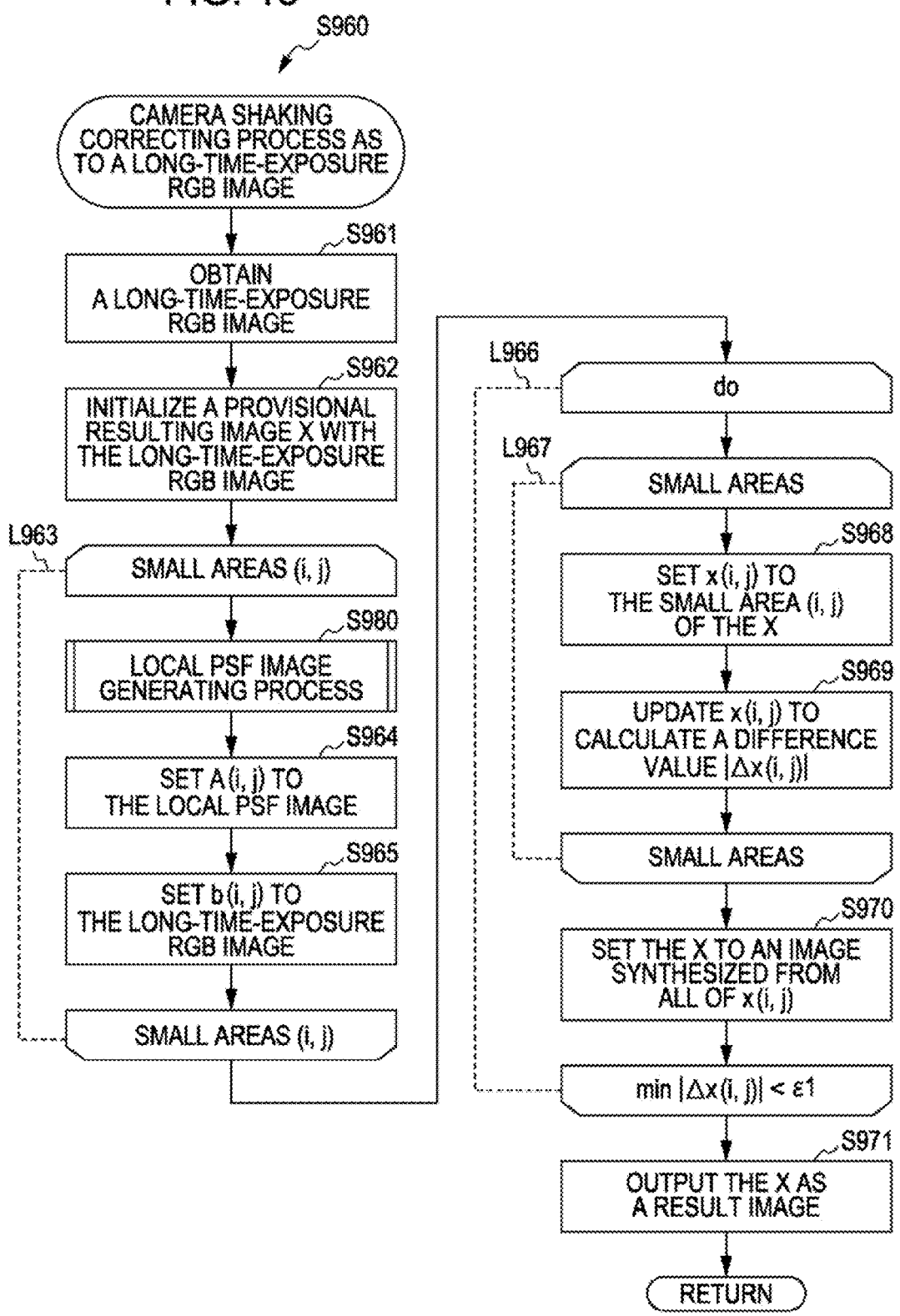
FIG. 18 is a flowchart illustrating the procedure of a camera shaking correcting process for a long-time-exposure RGB image by a long-time-exposure camera shaking correcting unit according to the first embodiment of the present invention.

FIG. 18 is a flowchart illustrating the procedure of the camera shaking correcting process for a long-time-exposure RGB image (step S960 in FIG. 13) by the long-time-exposure camera shaking correcting unit 218 according to the first embodiment of the present invention.

The long-time-exposure camera shaking correcting unit 218 obtains the long-time-exposure RGB image subjected to the demosaic process by the second demosaic processing unit 212 (step S961). Subsequently, the deconvolution unit 220 generates a tentative resulting image X, and initializes this tentative resulting image X by using the obtained long-time-exposure RGB image (step S962).

In loop L963, the long-time-exposure RGB image is divided into small rectangular areas, and processes in step S980, S964, and S965 are executed at each of the divided areas.

First, the local PSF rendering unit 219 executes a local PSF image generating process (step S980). This local PSF image generating process will be described in detail with reference to FIG. 19. Subsequently, the deconvolution unit 220 converts the values of the local PSF image corresponding to the small areas (i, j) into a matrix format to create a matrix A(i, j) (step S964). Subsequently, the deconvolution unit 220 converts the pixel values of the small areas (i, j) into a vector format to create a vector b(i, j) (step S965). Subsequently, upon the processes in step S964, S965, and S980 being completed regarding each small area after division of the long-time-exposure RGB image, loop L963 is ended, and the flow proceeds to loop L966.

In loop L966, processes in loop L967 and step S970 are repeated until the evaluated value min(Δx(i, j)) becomes smaller than a predetermined reference ε1. In loop L967, processes in steps 3968 and S969 are executed regarding each small area of the tentative resulting image X.

The deconvolution unit 220 converts the portions corresponding to the small areas (i, j) of the tentative resulting image X into a vector format to create a vector x(i, j) (step S968). Subsequently, the deconvolution unit 220 updates the vector x(i, j) based on Expression 5 to calculate difference Δx(i, j) (step S969). Upon the processes in steps S968 and S969 being completed regarding each small area of the tentative resulting image X, loop L967 is ended, and the flow proceeds to step S970.

Next, the deconvolution unit 220 updates the tentative resulting image X based on the vector x(i, j) after updating calculated regarding all the small areas (step S970). Subsequently, in the case of the evaluated value min(Δx(i, j)) becoming smaller than the predetermined reference ε1, loop L966 is ended, the flow proceeds to step S971. Subsequently, the deconvolution unit 220 outputs the tentative resulting image X at that time as the long-time-exposure RGB image after the camera shaking correction (step S971).

Figure 19:
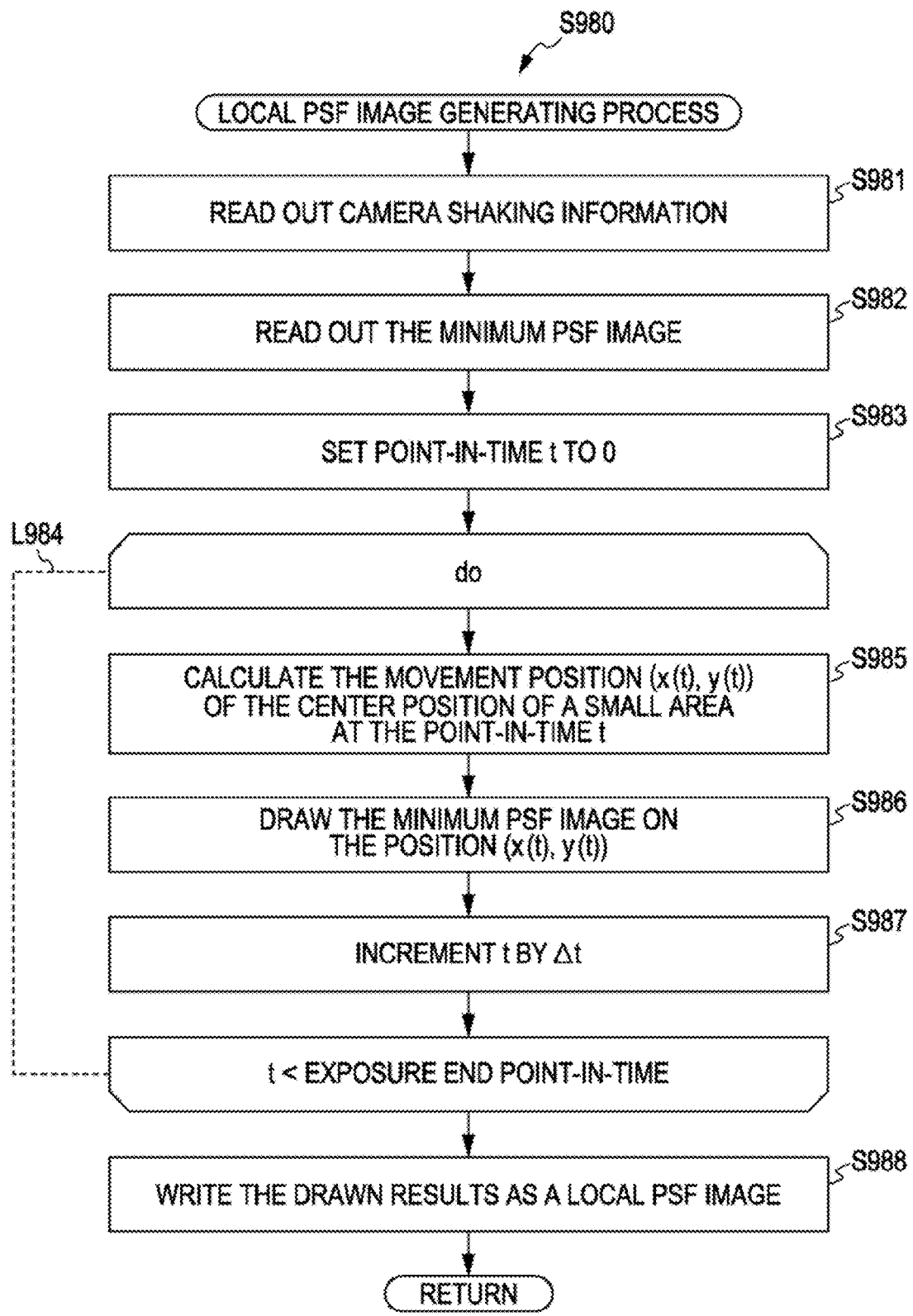
FIG. 19 is a flowchart illustrating the procedure of a local PSF (Point Spread Function) image generating process by a local PSF rendering unit according to the first embodiment of the present invention.

FIG. 19 is a flowchart illustrating the procedure of the local PSF image generating process (step S980 in FIG. 18) by the local PSF rendering unit 219 according to the first embodiment of the present invention.

The local PSF rendering unit 219 reads out camera shaking information (i.e., spline control points) (step S981). Subsequently, the local PSF rendering unit 219 reads out the minimum PSF image stored as data beforehand (step S982), and initializes the variable t that represents point-in-time to zero (step S983).

Next, in loop L984, the local PSF rendering unit 219 calculates a movement position (x(t), y(t)) due to camera shaking of the center pixel position of a small area at point-in-time t from the camera shaking information (step S985), for each point-in-time t at suitable increments. Subsequently, the local PSF rendering unit 219 draws the minimum PSF image at the calculated position (x(t), y(t)) at the point-in-time t (step S986), and advances the point-in-time t by a minute step width Δt (step S987). In a case where new point-in-time t has not passed exposure end point-in-time, the processes in step S985 and S987 are repeated. On the other hand, in a case where new point-in-time t has passed exposure end point-in-time, loop L984 is ended, and the results of drawing so far are written in the memory as a local PSF image (step S988).

Figure 20:
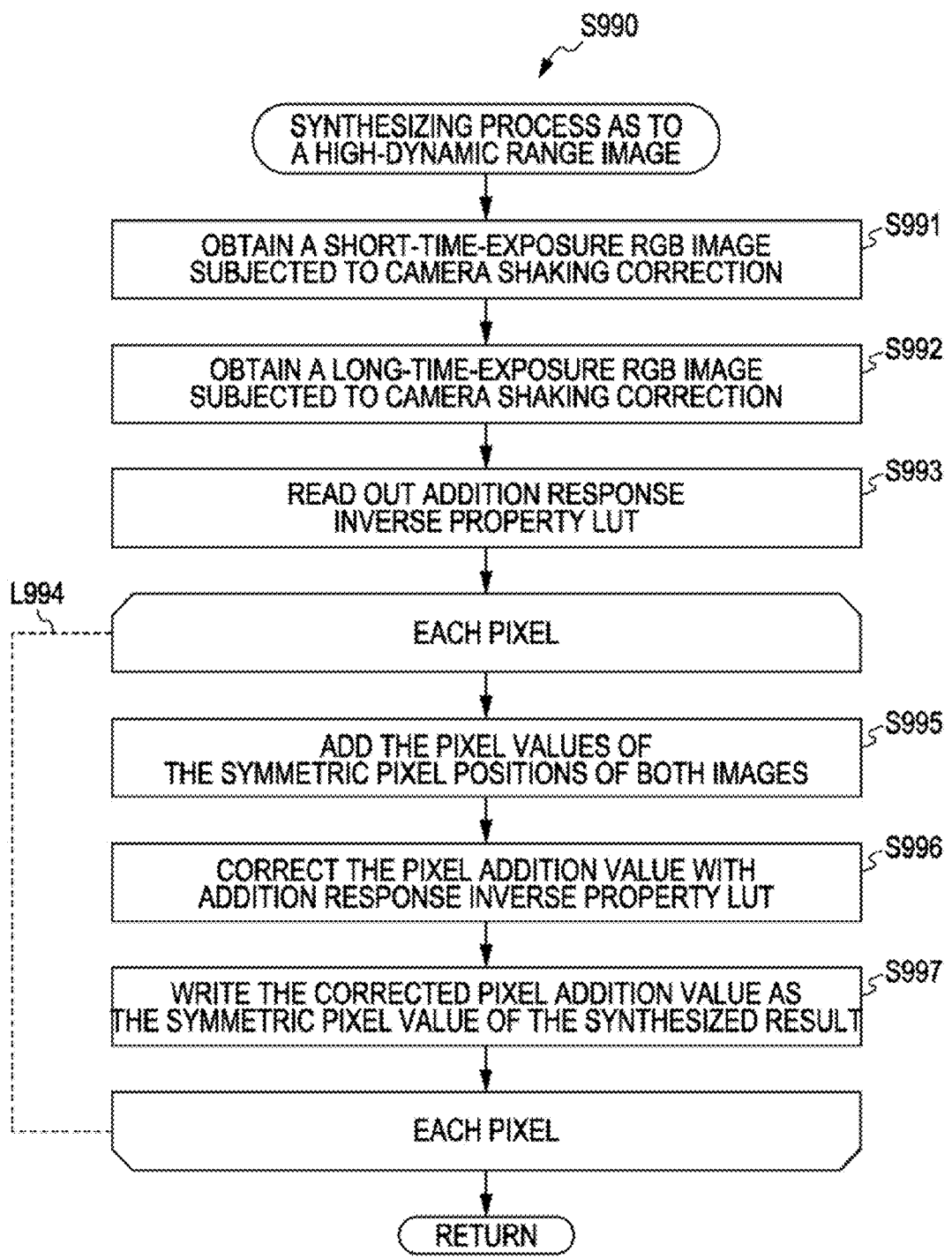
FIG. 20 is a flowchart illustrating the procedure of a synthesizing process for a high-dynamic-range image by a high-dynamic-range image synthesizing unit according to the first embodiment of the present invention.

FIG. 20 is a flowchart illustrating the procedure of the synthesizing process for a high-dynamic-range image (step S990 in FIG. 13) by the high-dynamic-range image synthesizing unit 221 according to the first embodiment of the present invention.

The high-dynamic-range image synthesizing unit 221 obtains the short-time-exposure RGB image after the camera shaking correction (step S991), and obtains the long-time-exposure RGB image after the camera shaking correction (step S992). Subsequently, the pixel value converting unit 224 reads out the addition response inverse property LUT held at the addition response inverse property LUT holding unit 222 (step S993).

Next, in loop L994, processes in step S995 through S997 are repeated regarding each pixel position of the short-time-exposure RGB image, and the long-time-exposure RGB image. First, the pixel value adding unit 223 adds the pixel value of a target pixel position of both images (step S995). Next, the pixel value converting unit 224 uses the addition response inverse property LUT to correct the calculated addition pixel value (step S996), and writes the corrected addition pixel value in the memory as the pixel value of the synthesis result (step S997).

In a case where the processes in steps S995 through S997 have been completed regarding all the pixel positions of the short-time-exposure image and the long-time-exposure image, loop L994 is ended, and the operation of the synthesizing process for a high-dynamic-range image is ended.

With the first embodiment, an example has been described wherein camera shaking information is calculated based on the short-time-exposure RGB image, but camera shaking information may be estimated by using both of the short-time-exposure RGB image and the long-time-exposure image. Thus, a process is repeated multiple times wherein camera shaking information is estimated by using both of the short-time-exposure RGB image and the long-time-exposure image, whereby camera shaking information with further high precision can be obtained. Therefore, with a second embodiment, an example will be described wherein camera shaking information is estimated by using both of the short-time-exposure RGB image and the long-time-exposure RGB image.

Second Embodiment

Figure 21:
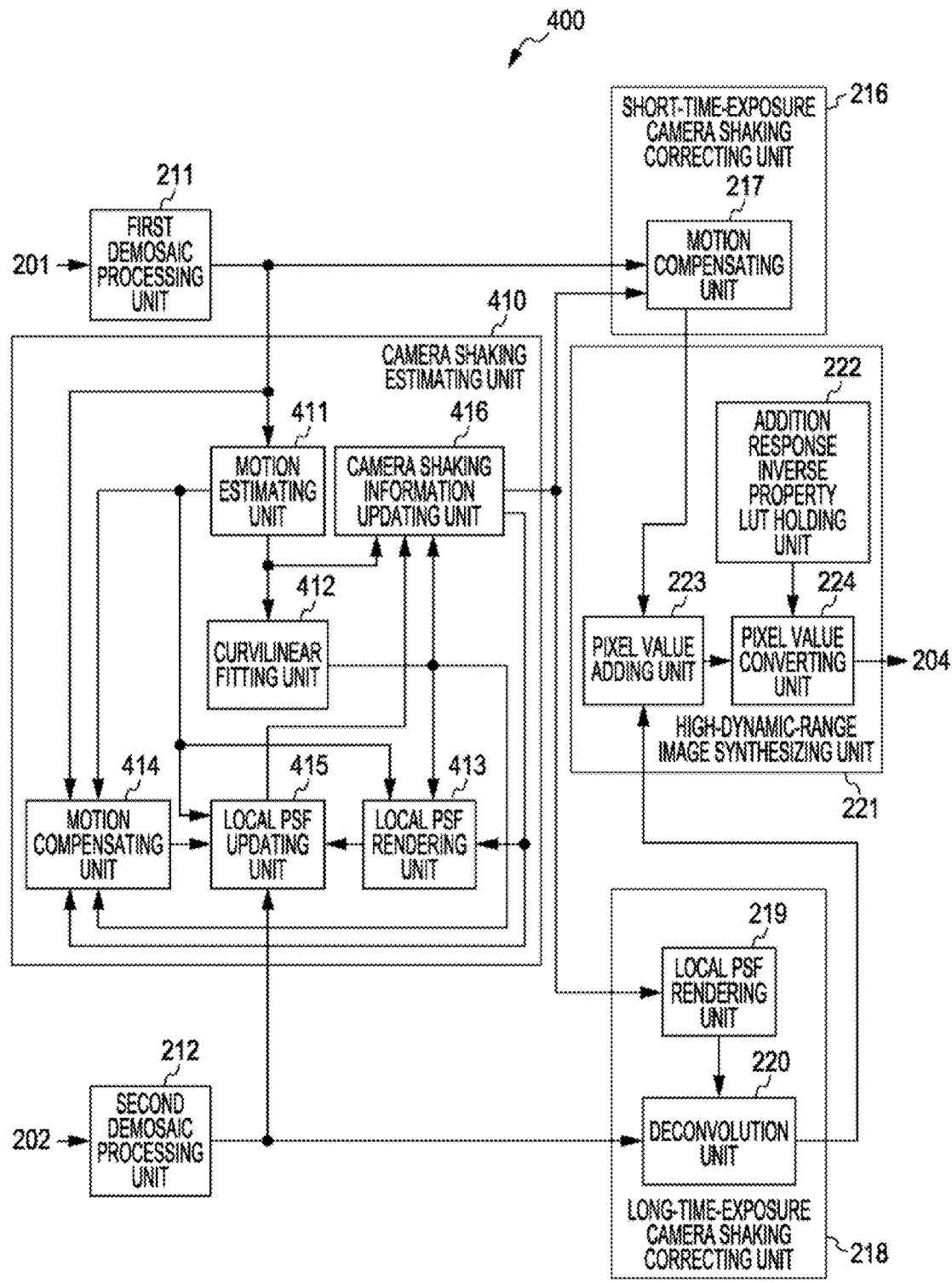
FIG. 21 is a block diagram illustrating a functional configuration example of an RGB image synthesizing unit according to a second embodiment of the present invention.

FIG. 21 is a block diagram illustrating a functional configuration example of an RGB image synthesizing unit 400 according to a second embodiment of the present invention. The RGB image synthesizing unit 400 is a modification of the RGB image synthesizing unit 203 shown in FIG. 10, and differs from the RGB image synthesizing unit 203 in that a camera shaking estimating unit 410 has been provided instead of the camera shaking estimating unit 213. Accordingly, description will be made mainly regarding the camera shaking estimating unit 410, and description of points which are the same as those in the RGB image synthesizing unit 203 shown in FIG. 10 will be omitted.

The camera shaking estimating unit 410 includes a motion estimating unit 411, a curvilinear fitting unit 412, a local PSF rendering unit 413, a motion compensating unit 414, a local PSF updating unit 415, and a camera shaking information updating unit 416.

The motion estimating unit 411 calculates the inter-frame camera shaking information of multiple short-time-exposure RGB images output from the first demosaic processing unit 211, and also extracts a list of matched point pairs with high reliability over multiple short-time-exposure RGB image frames. Note that in the following, matched points with high reliability will be referred to as "reliable points", and the list of matched point pairs with high reliability will be referred to as a "reliable point list". Also, the motion estimating unit 411 outputs the calculated inter-frame camera shaking information to the curvilinear fitting unit 412 and the camera shaking information updating unit 416. The extracted reliable point list is output to the local PSF rendering unit 413, motion compensating unit 414, and local PSF updating unit 415. Specifically, the motion estimating unit 411 sequentially calculates affine matrices between frames adjacent on the temporal axis for the multiple short-time-exposure RGB images, by way of the above-described affine matrix calculation method. Also, matched point pairs actually contributing to calculation of the affine matrix are extracted from the matched point pairs extracted at the time of affine matrix calculation, and the information of the matched point pairs (matched point pair information) is held. Moreover, matched points which can be connected throughout all frames of all of the frame pairs subjected to calculation of affine matrices are extracted from the held matched point pair information. Subsequently, the extracted matched points which can be connected throughout all frames are written out in a reliable point list, as reliable points. Note that the motion estimating unit 411 is one example of the inter-frame camera shaking information calculating unit and reliable point extracting unit referred to in the Summary of the Invention.

The curvilinear fitting unit 412 calculates camera shaking information (spline control points) based on the inter-frame camera shaking information (affine matrix) output from the motion estimating unit 411. The calculated camera shaking information is output to the local PSF rendering unit 413 and motion compensating unit 414. The spline control point calculation method is the same as that with the curvilinear fitting unit 215, so description thereof will be omitted here. Also, the curvilinear fitting unit 412 is an example of the shaking information calculating unit referred to in the Summary of the Invention.

The local PSF rendering unit 413 calculates local PSF images in small areas around the reliable points included in the reliable point list output from the motion estimating unit 411, based on the newest camera shaking information at the current point-in-time. Calculated local PSF images are output to the local PSF updating unit 415. In the event that updated camera shaking information has been output from the camera shaking information updating unit 416, this camera shaking information, which is camera shaking information which has been updated by the camera shaking information updating unit 416, is used. In the event that no updated camera shaking information has been output, camera shaking information output from the curvilinear fitting unit 412 is used. Note that the local PSF image calculation method here is the same as that with the local PSF rendering unit 413, so description thereof will be omitted here. Also, the local PSF rendering unit 413 is an example of the rendering unit referred to in the Summary of the Invention.

The motion compensating unit 414 corrects camera shaking regarding the small areas around the reliable points in the multiple short-time-exposure RGB images output from the first demosaic processing unit 211, and generates multiple short-time-exposure RGB images with the camera shaking corrected. The multiple short-time-exposure RGB images following camera shaking correction are output to the local PSF updating unit 415. Note that the reliable points in the multiple short-time-exposure RGB images are the reliable points included in the reliable point list output from the motion estimating unit 411. Also, the motion compensating unit 414 is an example of the image shaking correcting unit referred to in the Summary of the Invention.

The local PSF updating unit 415 updates the small area images around reliable points included in the reliable point list output from the motion estimating unit 411 for local PSF images output from the local PSF rendering unit 413 regarding the local PSF images output form the local PSF rendering unit 413, so as to generate updated local PSF images. Generated updated local PSF images are output to the camera shaking information updating unit 416. Specifically, the local PSF updating unit 415 updates local PSF images of the small areas around the reliable points, based on the short-time-exposure RGB images following camera shaking correction, that are output from the motion compensating unit 414, and long-time-exposure RGB images output from the second demosaic processing unit 212.

Specifically, the local PSF updating unit 415 transforms the values of the local PSF images corresponding to the small areas around the reliable points into a matrix format, so as to generate a matrix A. This matrix A is a is a matrix of $((m \times n) \times (m \times n))$, and each row of the matrix $A(i, j)$ represents the coefficient of a local PSF at each pixel position of the small areas $(i, j)$. Also, let us say that the size of the local PSF image of each of the small areas $(i, j)$ generated by the local PSF rendering unit 413 is $(p \times q)$. In this case, of the $(m \times n)$ components of each row of the matrix $A(i, j)$, the pixel value of a local PSF image (i.e., coefficient of local PSF) is set to $(p \times q)$ components, and 0 is set to the remaining $((m \times n) - (p \times q))$ components. Note that which component that the coefficient of a local PSF is set to depends on which pixel position of the small areas $(i, j)$ the row thereof corresponds to. Next, the pixel values of the long-time-exposure RGB image of the small area are transformed into a vector format, so as to generate a vector b. Now, if we say that the sizes of the small areas $(i, j)$ are $(m \times n)$, the vector b is a column vector of $((m \times n) \times 1)$ where the pixel values thereof are arrayed in one column sequentially. Subsequently, the pixel values of the short-time-exposure RGB image following camera shaking correction of the small area are transformed into a vector format, so as to generate a vector x. The vector x is a column vector of $((m \times n) \times 1)$ where the pixel values thereof are arrayed in one column sequentially. The pixel values of the short-time-exposure RGB image following camera shaking correction that are used here are multiplied by a scaling coefficient corresponding to the exposure ratio as to the long-time-exposure RGB image, so as to be the same brightness. Next, an updated matrix Ã of the matrix A is calculated using Expression 6. In Expression 6, λ is a preset constant. The updated matrix Ã is output to the camera shaking information updating unit 416 as an updated local PSF image. Note that the unit matrix I shown in Expression 6 is a matrix of $((m \times n) \times (m \times n))$. Also, the local PSF updating unit 415 is an example of the point blurring function image correcting unit referred to in the Summary of the Invention.

$$\tilde{A} = A + (b - Ax)x^+$$

$$x^+ = x^t(xx^t + \lambda^2 I)^{-1} \qquad \text{Expression 6}$$

The camera shaking information updating unit 416 also serves to update the camera shaking information (spline control points) output from the curvilinear fitting unit 412. The updated camera shaking information (spline control points) is the output to the short-time-exposure camera shaking correcting unit 216 and long-time-exposure camera shaking correcting unit 218. Specifically, the camera shaking information is updated based on the inter-frame camera shaking information output from the motion estimating unit 411, the camera shaking information output from the curvilinear fitting unit 412, and the local PSF image output from the local PSF updating unit 415. Note that in the event that the correction amount of the updated camera shaking information is greater than the preset threshold, the updated camera shaking information is output to the local PSF rendering unit 413 and the motion compensating unit 414. This camera shaking information updating process will be described in detail with reference to FIGS. 22 through 25B. Note that the camera shaking information updating unit 416 is an example of the shaking information updating unit referred to in the Summary of the Invention.

Figure 22:
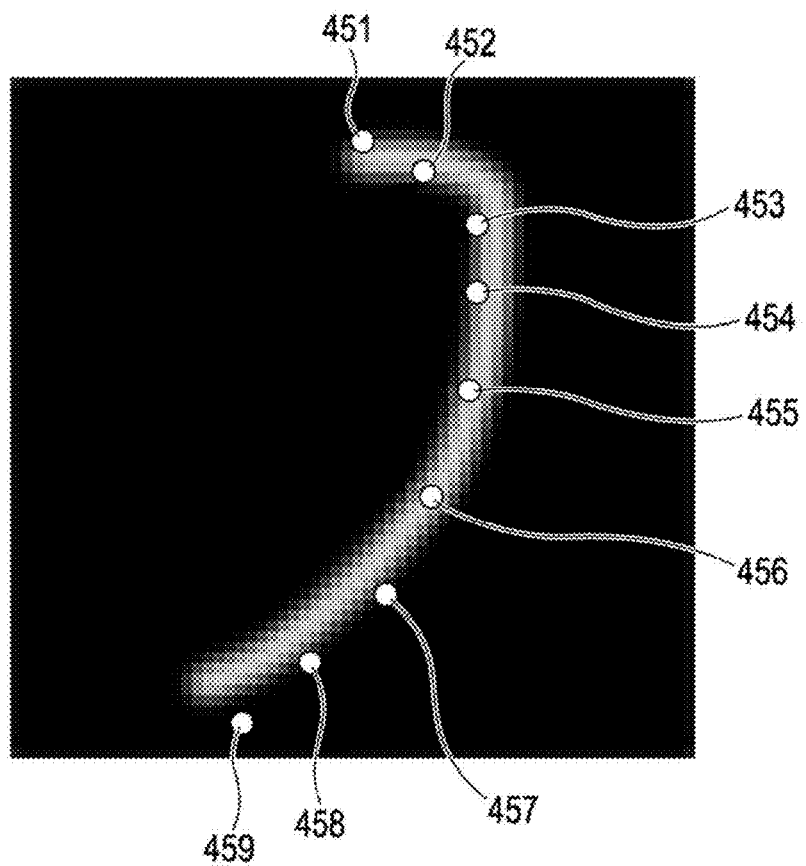
FIG. 22 is a diagram where points on a camera shaking locus are drawn on a updated local PSF image used at the time of a camera shaking information updating unit according to the second embodiment of the present invention executing maximal point search.
Figure 23:
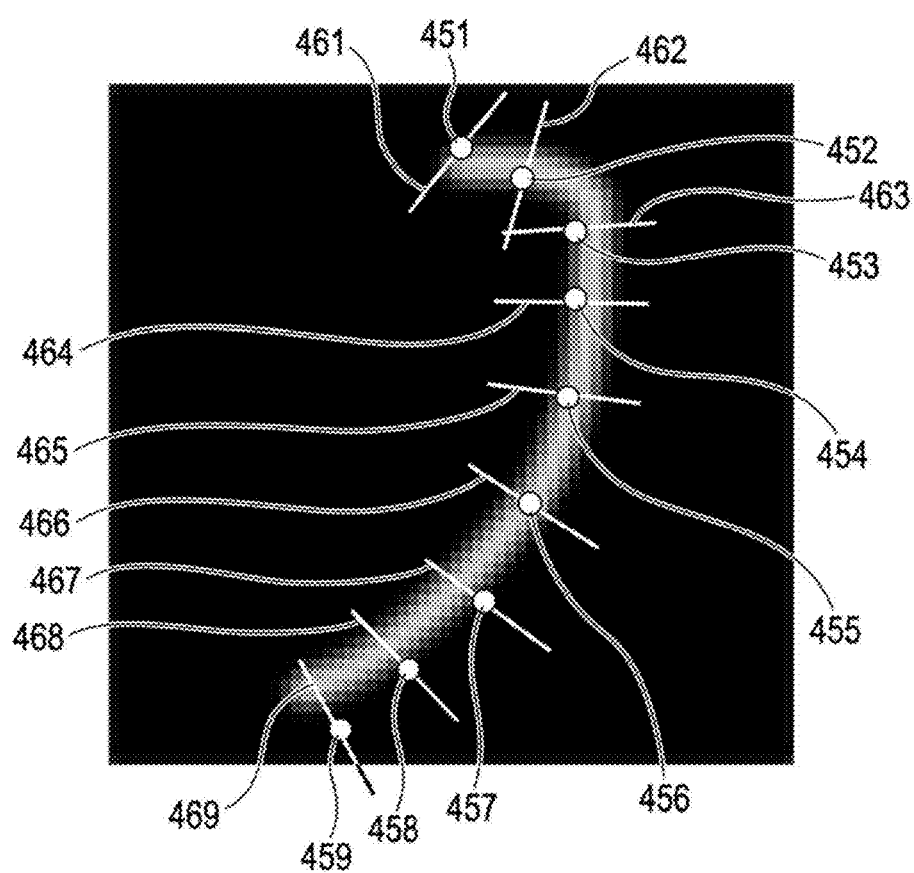
FIG. 23 is a diagram where maximum gradient directions are drawn on the updated local PSF image used at the time of the camera shaking information updating unit according to the second embodiment of the present invention executing maximal point search.
Figure 24:
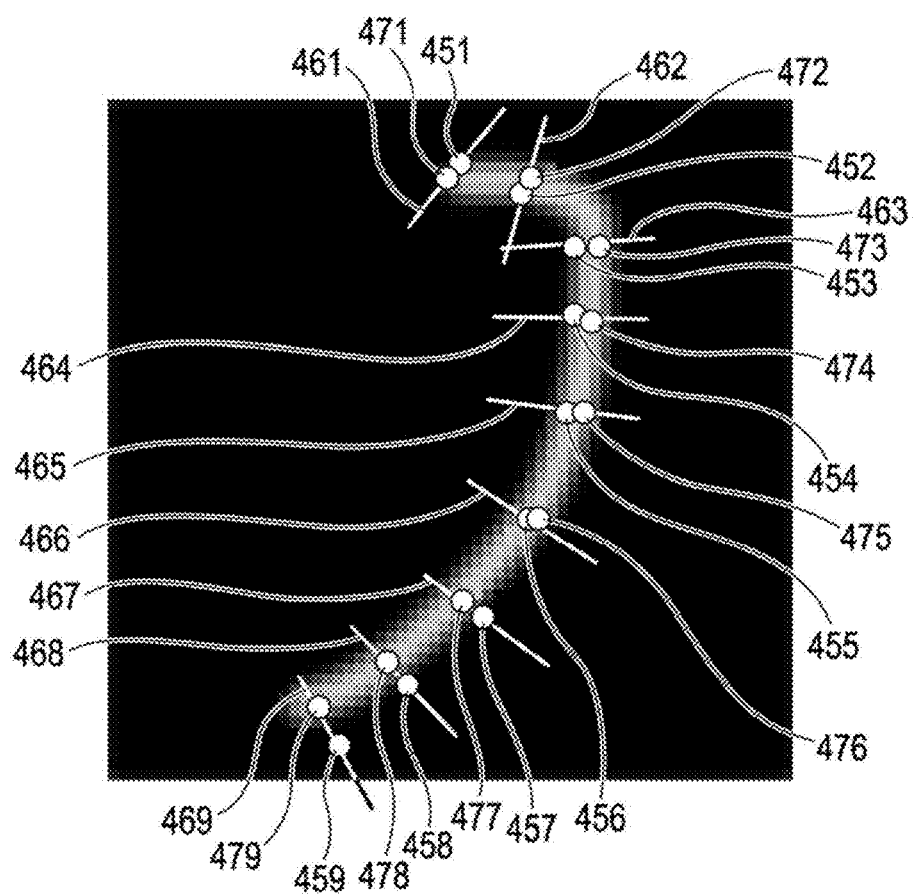
FIG. 24 is a diagram where maximal points are drawn on the updated local PSF image used at the time of the camera shaking information updating unit according to the second embodiment of the present invention executing maximal point search.
Figures 25A, 25B:
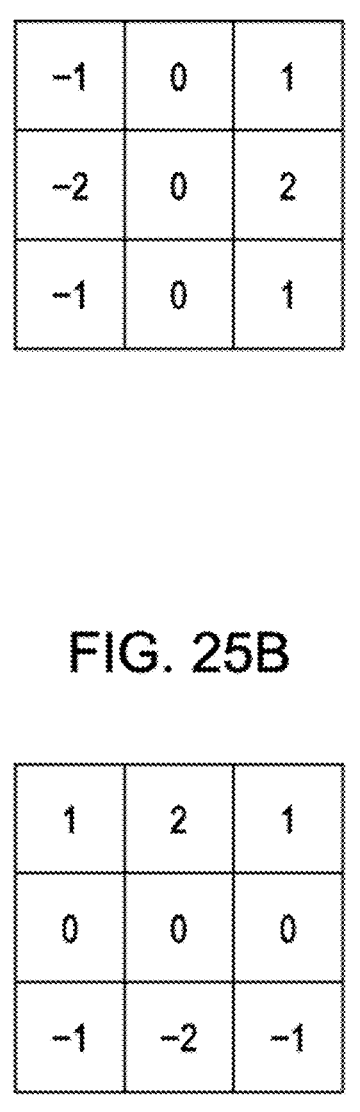

FIGS. 22 through 24 are diagrams illustrating a grayscale image which is an example of an updated local PSF image used at the time of the camera shaking information updating unit 416 according to the second embodiment of the present invention performing maximal point search. Also, FIGS. 25A and 25B are diagrams illustrating first derivation operator examples used at the time of the camera shaking information updating unit 416 according to the second embodiment of the present invention performing edge detecting processing, wherein FIG. 25A illustrates a Sobel operator having a set of 3×3 coefficients used for horizontal direction edge detection processing, and FIG. 25B illustrates a Sobel operator having a set of 3×3 coefficients used for vertical direction edge detection processing.

First, the camera shaking information updating unit 416 obtains the newest camera shaking information at the current point-in-time output from the curvilinear fitting unit 412. Next, the camera shaking information updating unit 416 obtains updated local PSF images corresponding to the reliable points included in the reliable point list, from the local PSF updating unit 415. Subsequently, the variable t representing the point-in-time is initialized (reliable point $(x(0), y(0))$. Next, the moved position of the reliable point at the current point-in-time t $(x(t), y(t))$ is calculated from the obtained camera shaking information. That is to say, $x_p(0) = x(0)$, $y_p(0) = y(0)$ is set to the right side of Expression 7, and the left side value $(x_p(t), y_p(t))$ regarding which the results of substituting the current point-in-time t have been calculated is the moved position. The values of $A_i$ and so forth shown in Expression 7 correspond to those shown in Expression 2. Also, $B_i, C_i, D_i, E_i$, and $F_i$, are values calculated with regard to the components b, c, d, e, and f of the affine matrix. Now, in FIG. 22, positions (movement positions) of points on a camera shaking track identified by the camera shaking information before updating in the corresponding small area, calculated at suitable time intervals Δt, are indicated by the white dots 451 through 459.

$$\begin{bmatrix} x_p(t) \\ y_p(t) \end{bmatrix} = \begin{bmatrix} \sum_{i=0}^{n-1} N_{i,A}(t)(x_p(0)A_i - y_p(0)B_i + C_i) \\ \sum_{i=0}^{n-1} N_{i,A}(t)(x_p(0)D_i + y_p(0)E_i + F_i) \end{bmatrix}$$ Expression 7

$$p = 1, \ldots, P$$
$$t = 0, \Delta t, 2\Delta t \ldots, n-1$$

Next, the camera shaking information updating unit 416 calculates the direction in which the gradient of the local PSF image is greatest (maximum gradient direction) at the position (x(t), y(t)). This maximum gradient direction can be calculated by edge detection processing using the Sobel operators shown in FIGS. 25A and 25B. Applying the Sobel operators shown in FIGS. 25A and 25B to a 3×3 image nearby the position (x(t), y(t)) of the local PSF image allows first differential coefficients in the horizontal direction and vertical direction to be calculated. The maximum gradient direction can be obtained as the orientation of the two-dimensional vector composed of the calculated first differential coefficients. FIG. 23 illustrates the maximum gradient directions of the local PSF images calculated regarding the points 451 through 459 on the camera shaking track, as solid lines 461 through 469.

Next, the camera shaking information updating unit 416 extracts the luminance values of the local PSF images following the maximum gradient directions that have been calculated, with the position (x(t), y(t)) as a base, and searches for the position where the luminance value peaks (peak point). FIG. 24 shows the positions of peak points where the luminance values extracted in the maximum gradient directions (solid lines 461 through 469) peak, as white dots 471 through 479. Thus, new camera shaking information can be obtained by calculating a spline curve so as to pass through the peak points as much as possible.

Next, the camera shaking information updating unit 416 calculates the equation in Expression 7 based on the point-in-time t, reliable point position (x(0), y(0)), and searched peak points. That is to say, in Expression 7, $x_p(0)=x(0)$, $y_p(0)=y(0)$ is set, and the searched peak points are substituted to the left side. For example, if a peak point p (where p=1 to P) is extracted, the position of the reliable point p at the point-in-time t can be expressed with the equation in Expression 7. Accordingly, one set of the equation in Expression 7 can be obtained for each peak point detected with the updated local PSF image. Next, the point-in-time t is advanced by a preset suitable graduation $\Delta t$, and this is repeated until the point-in-time t exceeds the exposure end point-in-time.

Next, the camera shaking information updating unit 416 calculates the spline control points. Specifically, an equation obtained from the inter-frame camera shaking information output from the motion estimating unit 411 (i.e., the equation in Expression 4), and an equation obtained by updating a local PSF image at a reliable point (i.e., the equation in Expression 7) are formed into simultaneous equations, which are then solved to calculate spline control points. The calculated spline control points are output as updated camera shaking information. Note that in the event that the correction amount of the updated camera shaking information is greater than the preset threshold, the updated camera shaking information is output to the local PSF rendering unit 413 and the motion compensating unit 414, and the camera shaking information updating processing is repeated. On the other hand, in the event that the correction amount of the updated camera shaking information is not greater than the preset threshold, the updated camera shaking information is output to the short-time-exposure camera shaking correcting unit 216 and long-time-exposure camera shaking correcting unit 218.

Thus, updated local PSF images calculated by the local PSF updating unit 415 at small areas around the reliable points can be used to reflect the updated amount in the camera shaking information. That is to say, a spline curve which best fits all updated local PSF images that have been generated can be calculated, thereby calculating even more optimal camera shaking information.

Next, the operations of the imaging apparatus 100 according to the second embodiment of the present invention will be described with reference to the drawings. Note that the operations described below are a partial modifications of the processing procedures of the RGB image synthesizing unit 203, so only the different parts will be described, and description of parts which are the same will be omitted here.

Figure 26:
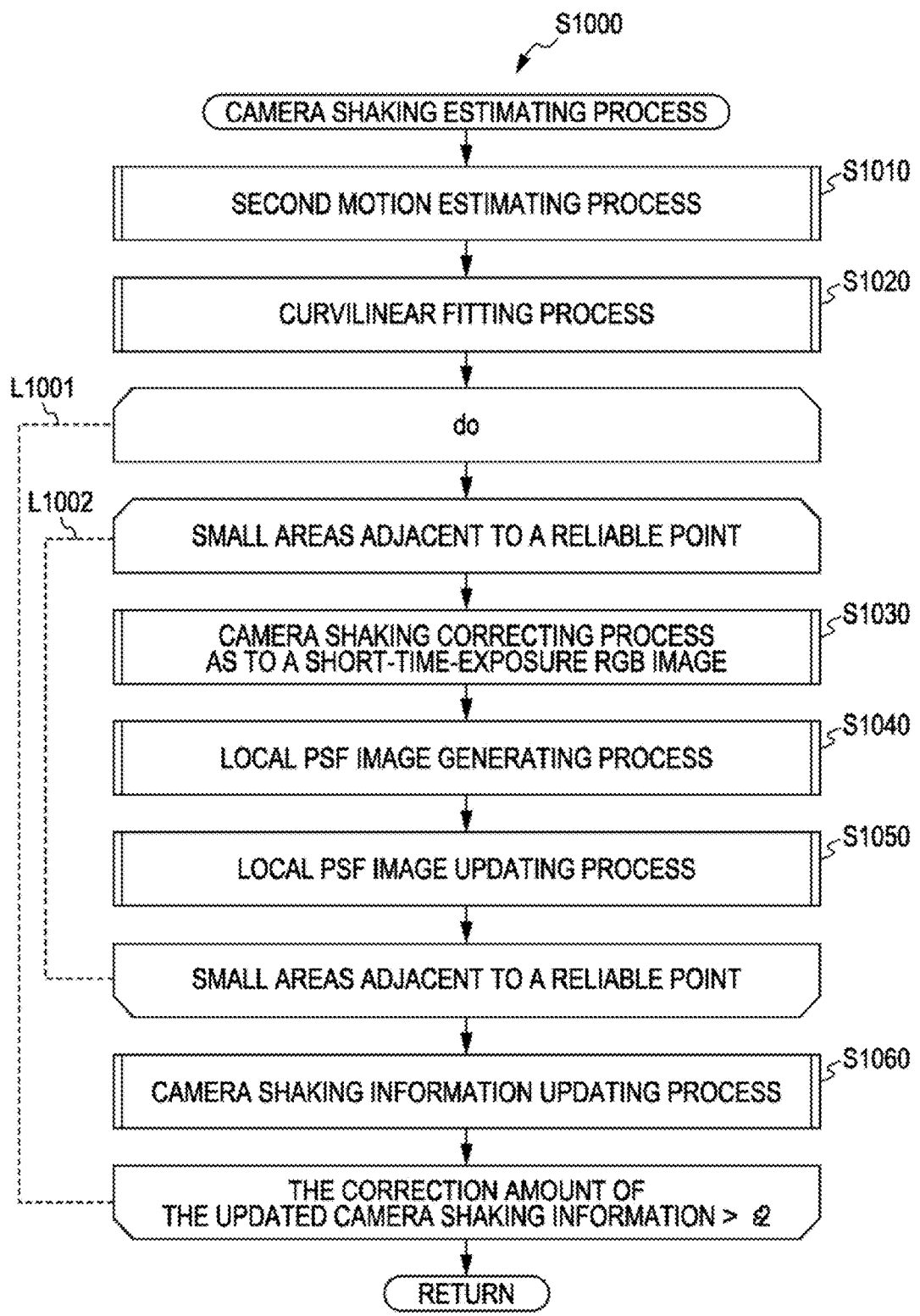
FIG. 26 is a flowchart illustrating the procedure of a camera shaking estimating process by a camera shaking estimating unit according to the second embodiment of the present invention.

FIG. 26 is a flowchart illustrating the processing of camera shaking estimation processing performed by the camera shaking estimating unit 410 according to the second embodiment of the present invention. The processing procedures here are processing procedures performed instead of step S910 in FIG. 13.

First, the motion estimating unit 411 performs second motion estimating processing, which includes calculation of inter-frame camera shaking information (affine matrix) of the multiple short-time-exposure RGB images, and extracting of the reliable point list (Step S1010). This second motion estimating processing will be described in detail with reference to FIG. 27.

Next, the curvilinear fitting unit 412 performs curve fitting processing wherein camera shaking information is calculated based on the inter-frame camera shaking information (affine matrix) (step S1020). This curve fitting processing is the same as the processing procedure shown in FIG. 16 (step S930), so description here will be omitted.

Next, at loop L1001, the processes of loop S1002 and step S1060 are repeated. In loop S1002, the processes of steps S1030 through S1050 is performed regarding the small areas around the reliable points included in the extracted reliable point list. That is to say, the motion compensating unit 414 performs camera shaking correction processing for the short-time-exposure RGB images at each small area (step S1030). The camera shaking correction processing for the short-time-exposure RGB images is the same as the processing procedure shown in FIG. 17 (step S950), so description here will be omitted.

Next, the local PSF rendering unit 413 performs local PSF image generating processing wherein local PSF images are generated at the small areas (step S1040). This local PSF image generating processing is the same as the processing procedure shown in FIG. 18 (step S980), so description here will be omitted.

Next, the local PSF updating unit 415 performs local PSF image updating processing, where the local PSF images are updated at the small areas (step S1050). This local PSF image updating processing will be described in detail with reference to FIG. 28.

In the event that the processing in step S1030 through S1050 has ended regarding the small areas around the reliable points included in the extracted reliable point list, the loop L1002 ends, and the flow advances to step S1060.

Next, the camera shaking information updating unit 416 performs camera shaking information updating processing, wherein the camera shaking information is updated based on the inter-frame camera shaking information, camera shaking information at the current point-in-time, and the updated local PSF images (step S1060). In the event that the correction amount of the updated camera shaking information is greater than the preset threshold ϵ2, loop L1002 and step S1060 are repeated. On the other hand, in the event that the correction amount of the updated camera shaking information is not greater than the preset threshold ϵ2, loop L1001 is ended, and the operations of the camera shaking estimating processing end.

Figure 27:
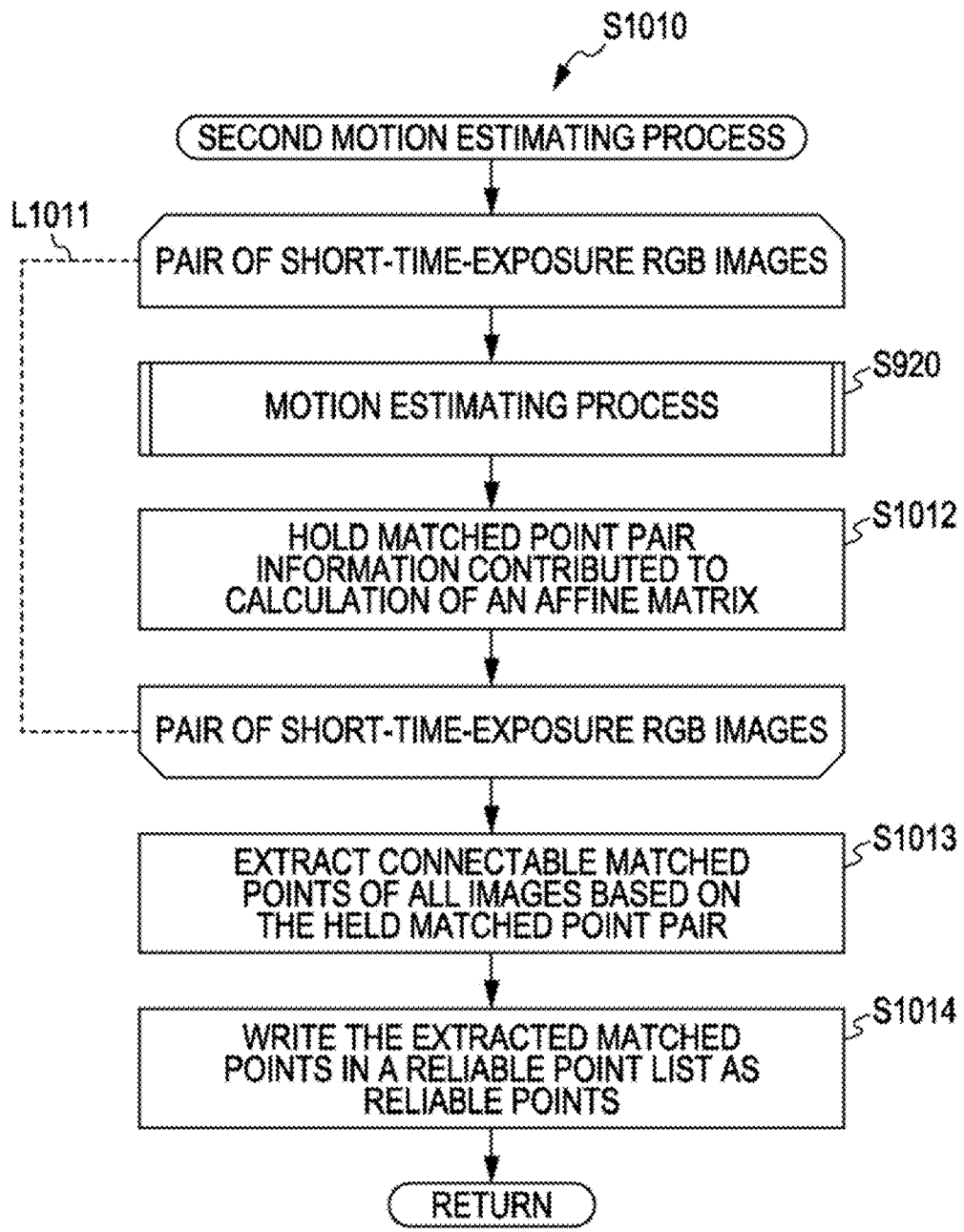
FIG. 27 is a flowchart illustrating the procedure of a second motion estimating process by a motion estimating unit according to the second embodiment of the present invention.

FIG. 27 is a flowchart illustrating the processing procedures of the second motion estimating processing performed by the motion estimating unit 411 according to the second embodiment of the present invention (step S1010 in FIG. 26).

In loop S1011, the motion estimating unit 411 performs the processing in step S920 (shown in FIG. 15) and step S1012 on the image pairs of the multiple short-time-exposure RGB images. That is to say, matched point pairs actually contributing to calculation of the affine matrix are extracted from the matched point pairs extracted at the time of affine matrix calculation, and the information of the extracted matched point pairs is held (step S1012). Upon the processing of steps S920 and S1012 being completed for all images, loop L1011 is ended, and the flow advances to step S1013.

Next, the motion estimating unit 411 extracts matched points which can be connected throughout all frames, from the held matched point pair information (step S1013), and the extracted matched points which can be connected throughout all frames are written out in the reliable point list, as reliable points (step S1014).

Figure 28:
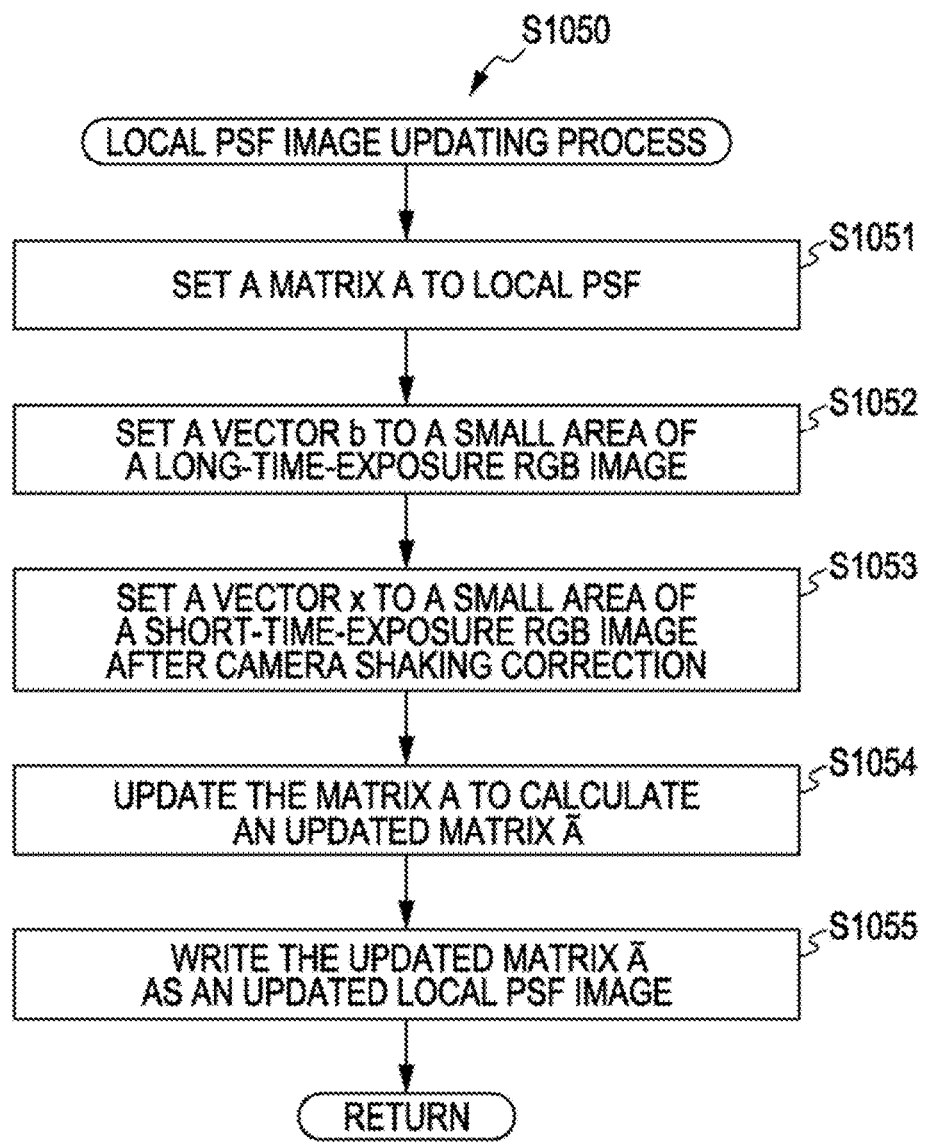
FIG. 28 is a flowchart illustrating the procedure of a local PSF image updating process by a local PSF updating unit according to the second embodiment of the present invention.

FIG. 28 is a flowchart illustrating the processing procedures of the local PSF updating unit 415 performing local PSF updating processing (step S1050 in FIG. 26) according to the second embodiment of the present invention.

First, the local PSF updating unit 415 transforms the values of local PSF images corresponding to the small areas around the reliable points included in the reliable point list, to create a matrix A (step S1051).

Next, the local PSF updating unit 415 transforms the pixel values of the long-time-exposure images of the small areas into vector format, to create a vector b (step S1052). Next, the local PSF updating unit 415 transforms the pixel values of the short-time-exposure RGB images of the small areas following camera shaking correction into vector format, to create a vector x (step S1053).

Next, the local PSF updating unit 415 calculates an updated matrix Ã of the matrix A using Expression 6 (step S1054). The local PSF updating unit 415 then outputs the updated matrix Ã to the camera shaking information updating unit 416 as an updated local PSF image (step S1055).

Figure 29:
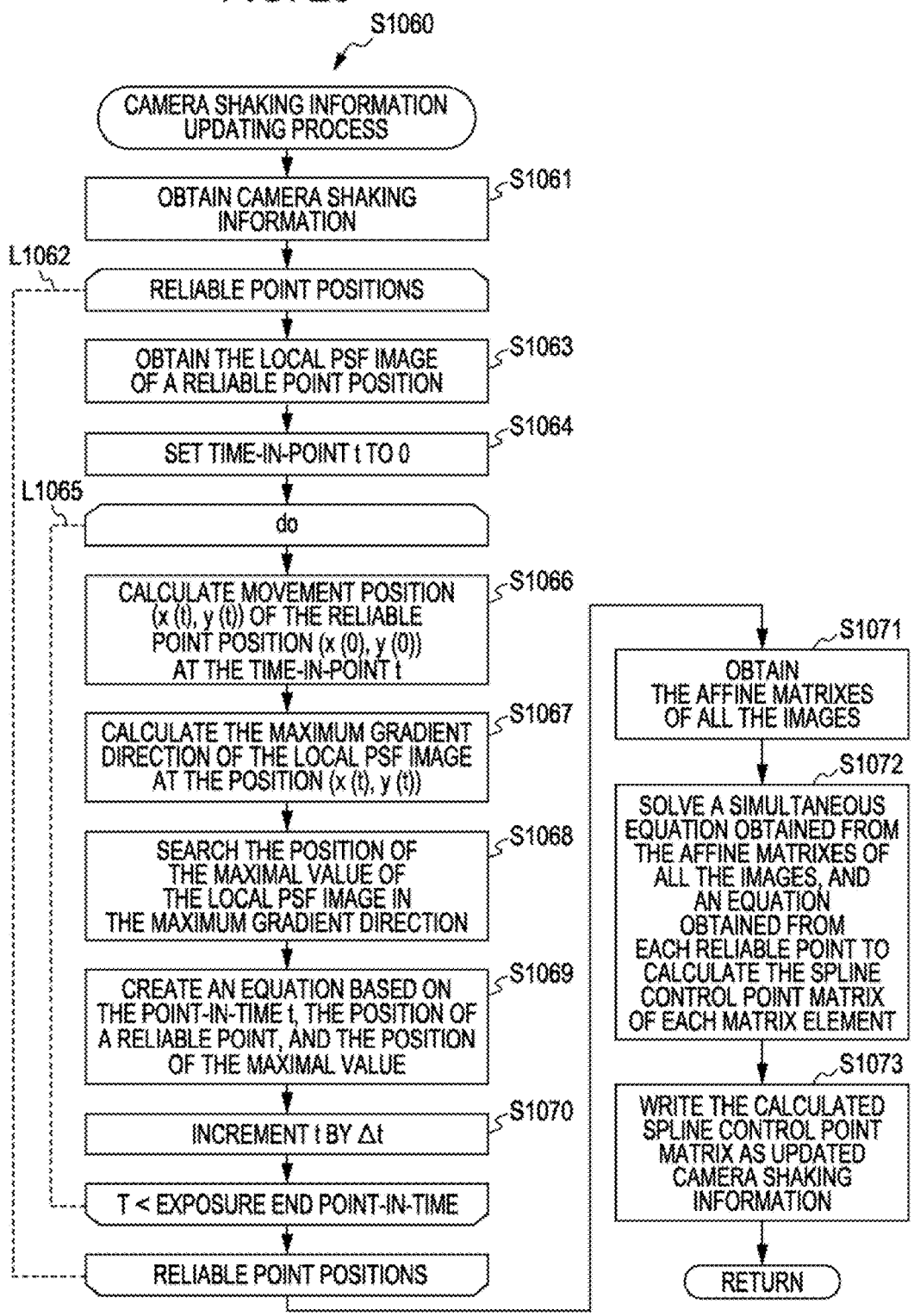
FIG. 29 is a flowchart illustrating the procedure of a camera shaking information updating process by a camera shaking information updating unit according to the second embodiment of the present invention.

FIG. 29 is a flowchart illustrating the processing procedures of the camera shaking information updating unit 416 performing camera shaking information updating processing (step S1060 in FIG. 26) according to the second embodiment of the present invention.

First, the camera shaking information updating unit 416 obtains camera shaking information at the current point-in-time (Step S1061). Next, in loop L1062, the processes of steps S1063 and S1064, and loop L1065, are repeated for each reliable point included in the reliable point list.

In loop L1062, the camera shaking information updating unit 416 obtains updated local PSF images corresponding to the positions of the reliable points included in the reliable point list, from the local PSF updating unit 415 (step S1063). Subsequently, the camera shaking information updating unit 416 initializes the variable t representing the point-in-time to 0 (step S1064). Next, the camera shaking information updating unit 416 calculates the moved position at the current point-in-time t (x(t), y(t)) of the reliable point (x(0), y(0)) from the camera shaking information (step S1066).

Next, the camera shaking information updating unit 416 calculates the direction in which the gradient of the local PSF image is greatest (maximum gradient direction) at the position (x(t), y(t)) (Step S1067). Next, the camera shaking information updating unit 416 extracts the luminance values of the local PSF images following the maximum gradient directions that have been calculated, with the position (x(t), y(t)) as a base, and searches for the position where the luminance value peaks (peak point) (step S1068).

Next, the camera shaking information updating unit 416 generates the equation in Expression 7 regarding the point-in-time t, reliable point position (x(0), y(0)), and searched peak points (step S1069). In loop L1065, the point-in-time t is advanced by a preset suitable step Δt, which is repeated until the point-in-time t exceeds the exposure end point-in-time.

Next, the camera shaking information updating unit 416 obtains an affine matrix calculated by the motion estimating unit 411 (step S1071). The camera shaking information updating unit 416 then forms simultaneous expressions of both the equation obtained from the obtained affine matrix (i.e., the equation in Expression 4), and the equation obtained by updating a local PSF image at a reliable point (i.e., the equation in Expression 7), which are then solved to calculate spline control points indicating the temporal change of the components of the affine matrix (Step S1072).

Next, the calculated spline control points are output as updated camera shaking information (step S1073).

Now, the motion compensating unit 414 of the camera shaking estimating unit 410 shown in FIG. 21 performs the same operations as the motion compensating unit 217 of the short-time-exposure camera shaking correcting unit 216, other than operating as to the small areas around the reliable points. Accordingly, an arrangement may be made wherein the motion compensating unit 217 of the short-time-exposure camera shaking correcting unit 216 is used to this end as well, instead of providing the motion compensating unit 414 to the camera shaking estimating unit 410. In the following third embodiment, a configuration example will be described wherein the motion compensating unit of the short-time-exposure camera shaking correcting unit is used to this end.

Third Embodiment

Figure 30:
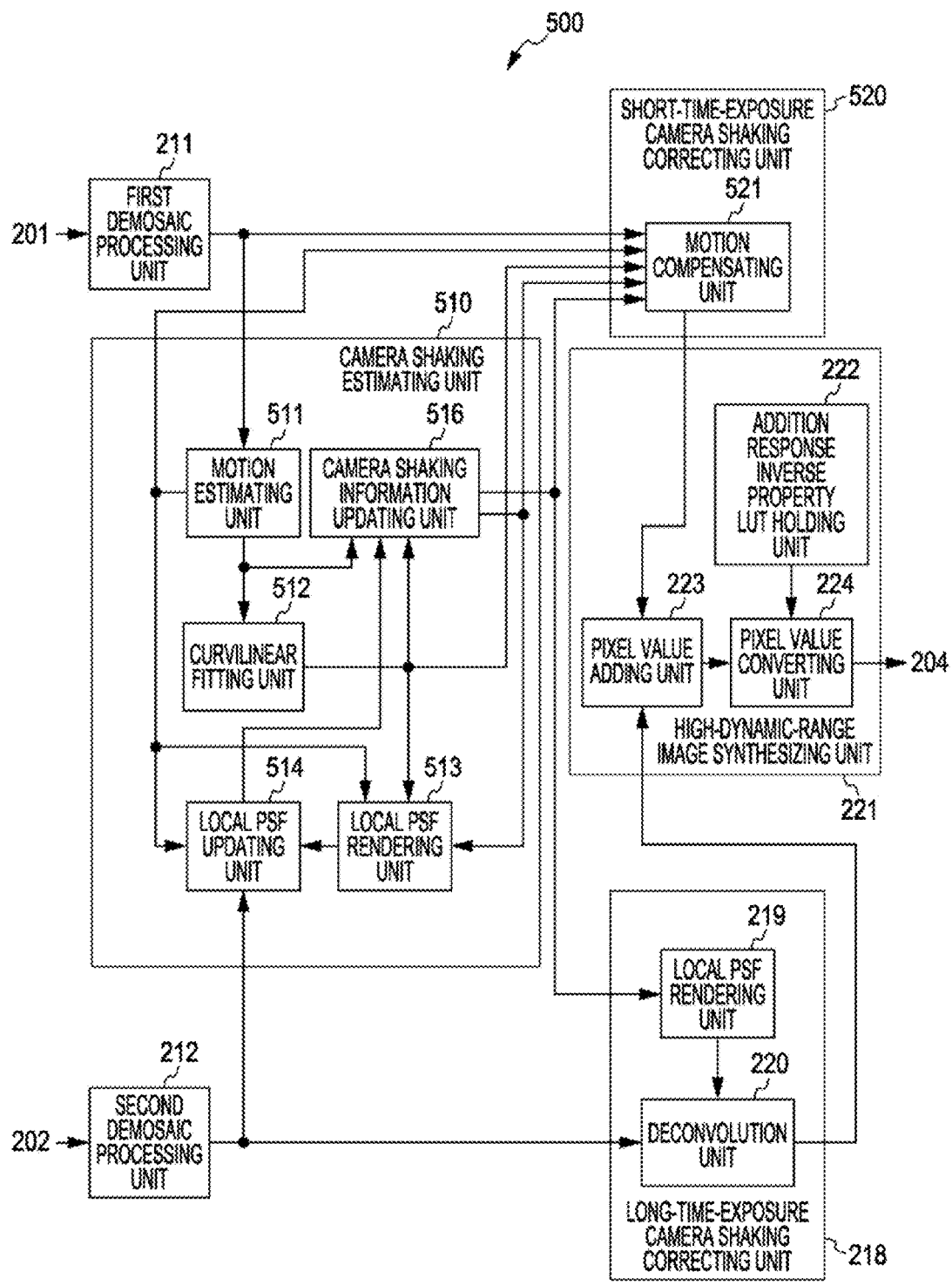
FIG. 30 is a block diagram illustrating a functional configuration example of an RGB image synthesizing unit according to a third embodiment of the present invention.

FIG. 30 is a block diagram illustrating a functional configuration example of an RGB image synthesizing unit 500 according to a third embodiment of the present invention. The RGB image synthesizing unit 500 is a modification of the RGB image synthesizing unit 400 shown in FIG. 21, and differs from the RGB image synthesizing unit 400 in that a short-time-exposure camera shaking correcting unit 520 of a motion compensating unit 521 is used instead of the motion compensating unit 414 of the camera shaking estimating unit 410. Other configurations are. the same as with the RGB image synthesizing unit 400 shown in FIG. 21, so description will be omitted here. Note that a camera shaking estimating unit 510 is an example of the blurring estimating unit referred to in the Summary of the Invention, and the short-time-exposure camera shaking correcting unit 520 is an example of the short-time-exposure blurring correcting unit referred to in the Summary of the Invention.

Now, the RGB image synthesizing unit 203 shown in FIG. 10 and the RGB image synthesizing unit 400 shown in FIG. 21 have the first demosaic processing unit 211 and second demosaic processing unit 212. That is to say, the RGB image synthesizing unit 203 and the RGB image synthesizing unit 400 independently demosaic the multiple short-time-exposure mosaic images and long-time-exposure mosaic image. In this way, with a system which divides the pixels of a single solid-state imaging device into short-time-exposure and long-time-exposure to perform imaging, a color array which is easy to demosaic following dividing (e.g., the array shown in FIG. 6) is preferable. However, with the pixel array of a single solid-state imaging device, the first and second embodiments of the present invention can be applied even without the color array being easy to demosaic following dividing. For example, in the event that planes of each color (data arrayed in a two-dimensional grid) can be obtained simply by dividing and re-arraying the pixels of the mosaic image, a configuration can be realized wherein demosaic processing can be performed at a high-dynamic-range image synthesizing unit. In a fourth embodiment below, a configuration wherein demosaic processing is performed at a high-dynamic-range image synthesizing unit will be described.

Fourth Embodiment

Figure 31:
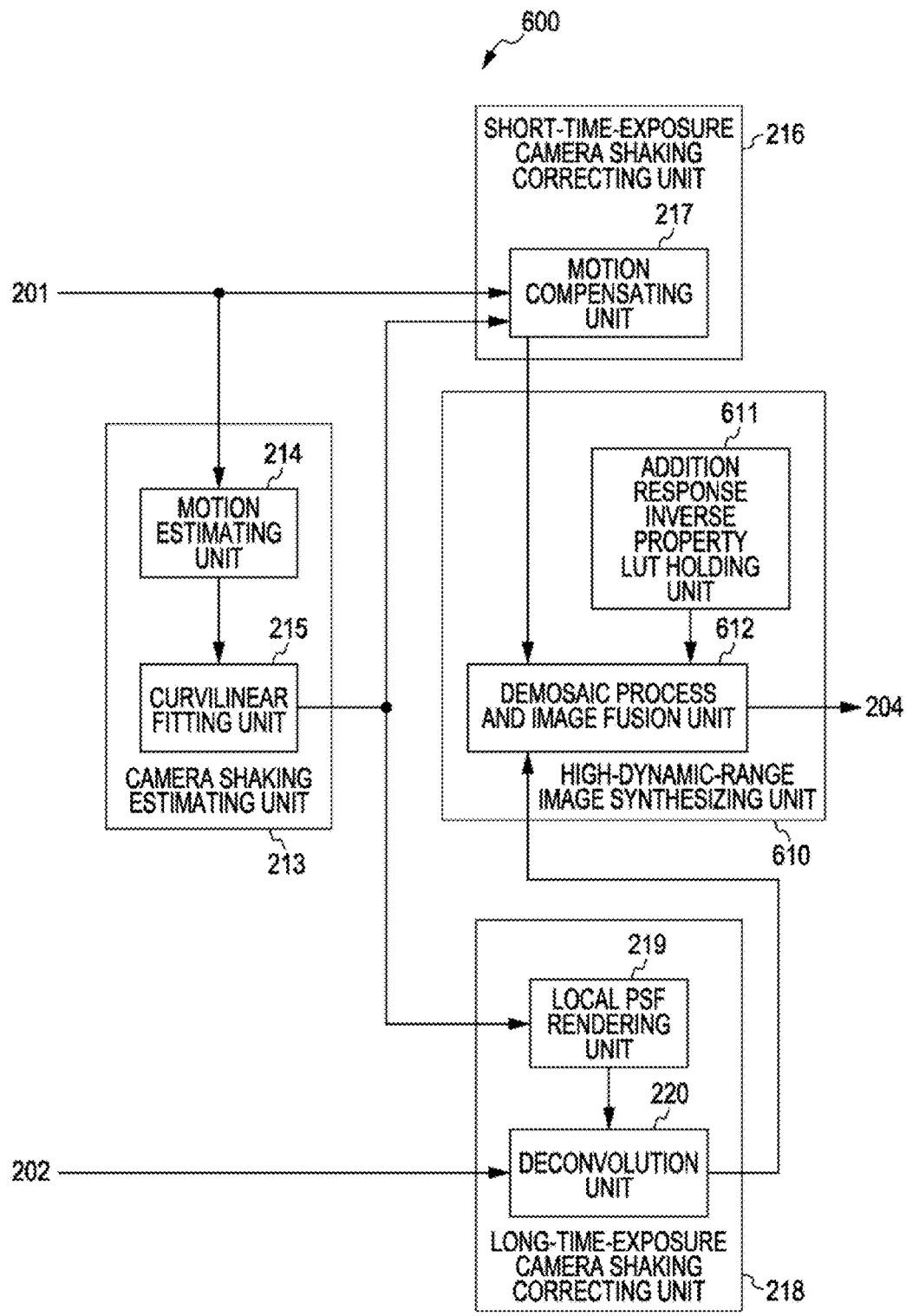
FIG. 31 is a block diagram illustrating a functional configuration example of an RGB image synthesizing unit according to a fourth embodiment of the present invention.

FIG. 31 is a block diagram illustrating a functional configuration example of an RGB image synthesizing unit 600 according to a fourth embodiment of the present invention. The RGB image synthesizing unit 600 is a modification of the RGB image synthesizing unit 203 shown in FIG. 10, and differs from the RGB image synthesizing unit 203 in that a demosaic process and image fusion unit 612 is used instead of the first demosaic processing unit 211 and second demosaic processing unit 212. Other configurations are the same as with the RGB image synthesizing unit 203 shown in FIG. 10, so description will be omitted here. The demosaic process and image fusion unit 612 generates a mosaic image by rearranging the pixels of the short-exposure-time image subjected to camera shaking correction and the pixels of the long-exposure-time image subjected to camera shaking correction according to the same pixel array as the mosaic image output from the solid-state imaging device 13. Demosaic processing is then performed regarding the generated mosaic image. Note examples of color arrays which are readily demosaiced by the RGB image synthesizing unit 600 will be described with reference to FIGS. 32 and 33. Also note that a high-dynamic-range image synthesizing unit 610 is an example of the image synthesizing unit referred to in the Summary of the Invention.

Figure 33:
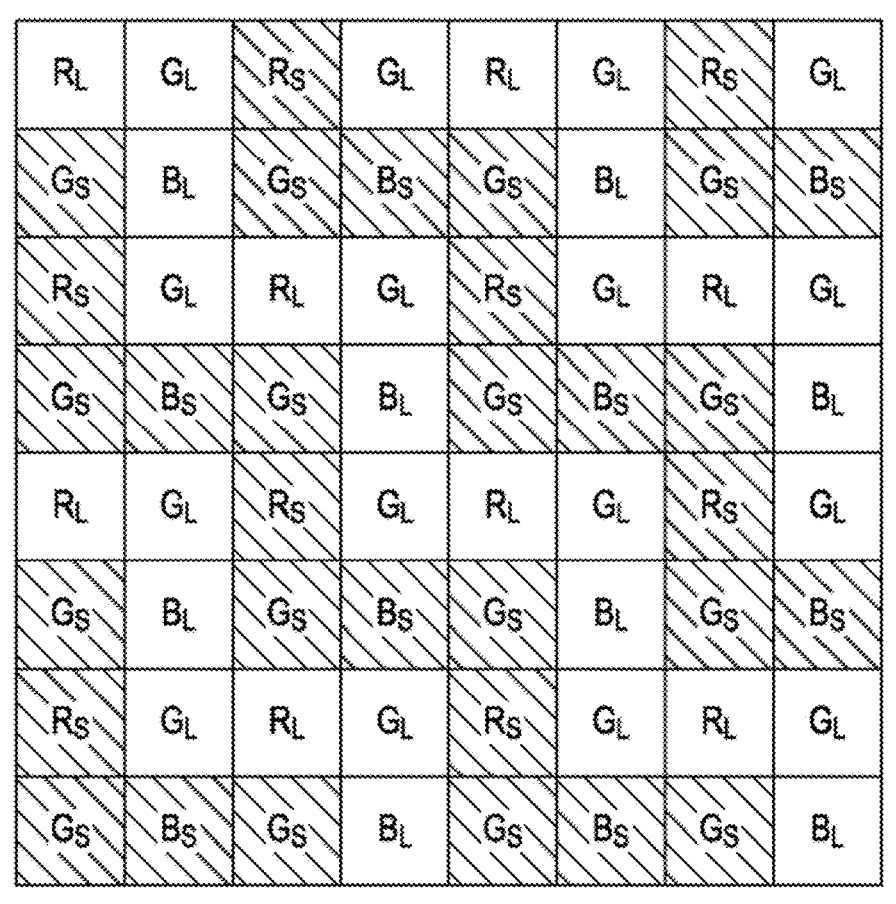

FIGS. 32 and 33 are diagrams illustrating examples of pixel arrays of color filters mounted to the light receiving portion of the solid-state imaging device 13 according to the fourth embodiment of the present invention. FIGS. 32 and 33 illustrate examples of color arrays where planes of each color can be obtained simply by dividing and rearranging the pixels of the mosaic image, and readily demosaiced by the RGB image synthesizing unit 600. The symbols in the squares are the same as with the case in FIG. 6, indicating the types of color filters. The solid-state imaging devices shown in both FIGS. 32 and 33 can be realized using the pixel structure shown in FIG. 2.

Note that both the pixel arrays shown in FIGS. 32 and 33 are grids or diagonal grids, according to the color and exposure time taken into interest. Accordingly, four planes (R, G×2, B) with equal pixel intervals can be created for each exposure time, simply by rearranging the pixels. Each process of camera shaking estimation, short-time-exposure camera shaking correction, and long-time-exposure camera shaking correction, using these as input, can be performed. In this case, processing for synthesizing the short-time-exposure images and long-time-exposure images including demosaicing processing (e.g., see International Publication WO 2002/056604) can be used. Now, the example shown in FIG. 32 enables a pixel array wherein fabrication of the solid-state imaging device is facilitated, due to the spatial placement for exposure control being in horizontal line sequence, with regard to the spatial placement for exposure control for the pixels, and spatial placement of color. Also, the example shown in FIG. 33 enables a pixel array advantageous regarding resolution performance in normal dynamic range imaging to be realized, by giving priority to density and anisotropy of color over the spatial placement for exposure control, with regard to the spatial placement for exposure control for the pixels, and spatial placement of color.

Figure 34:
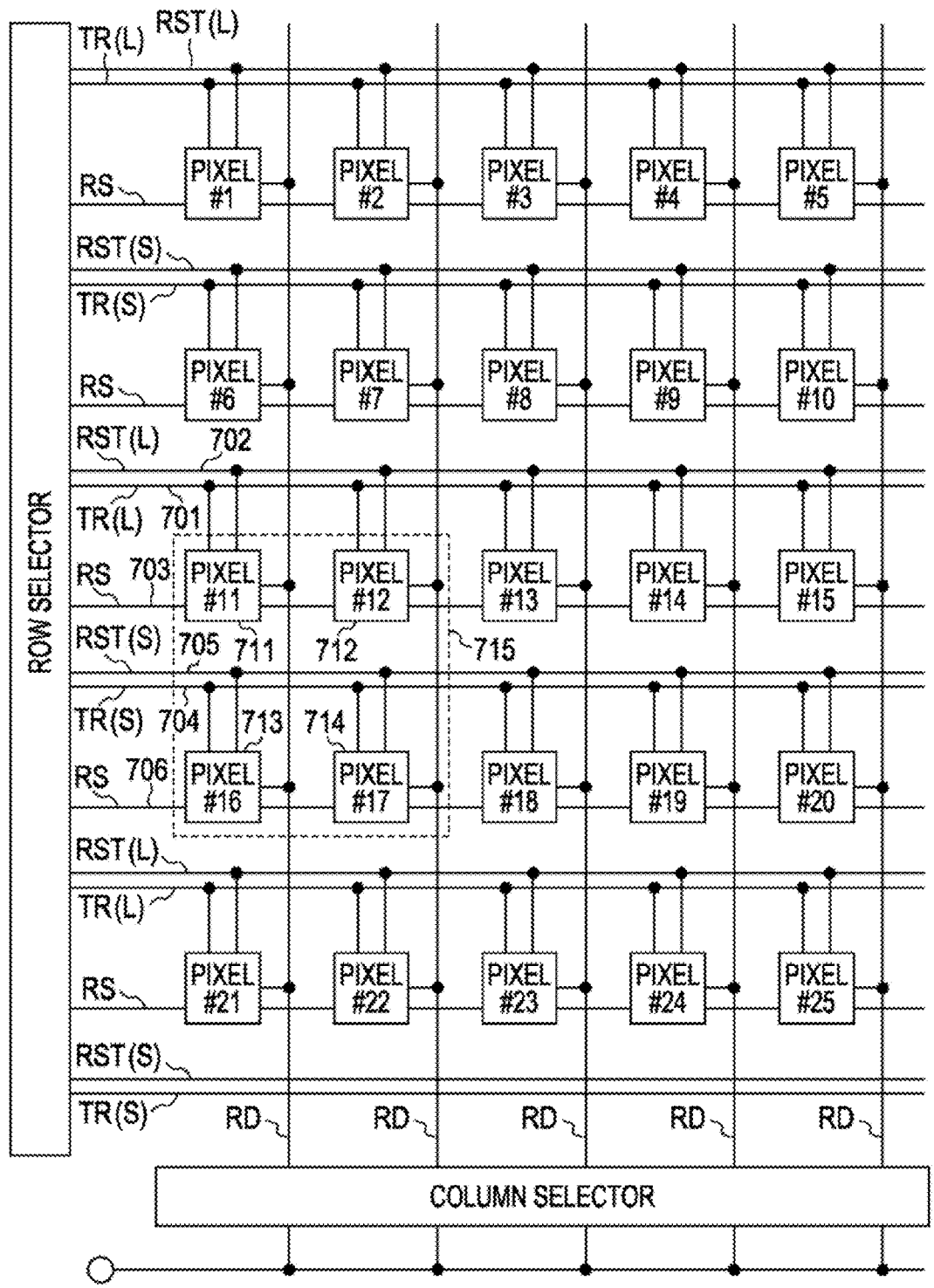
FIG. 34 is a diagram schematically illustrating the pixel wiring of a solid-state imaging device used for realizing the pixel array shown in FIG. 32.
Figure 35:
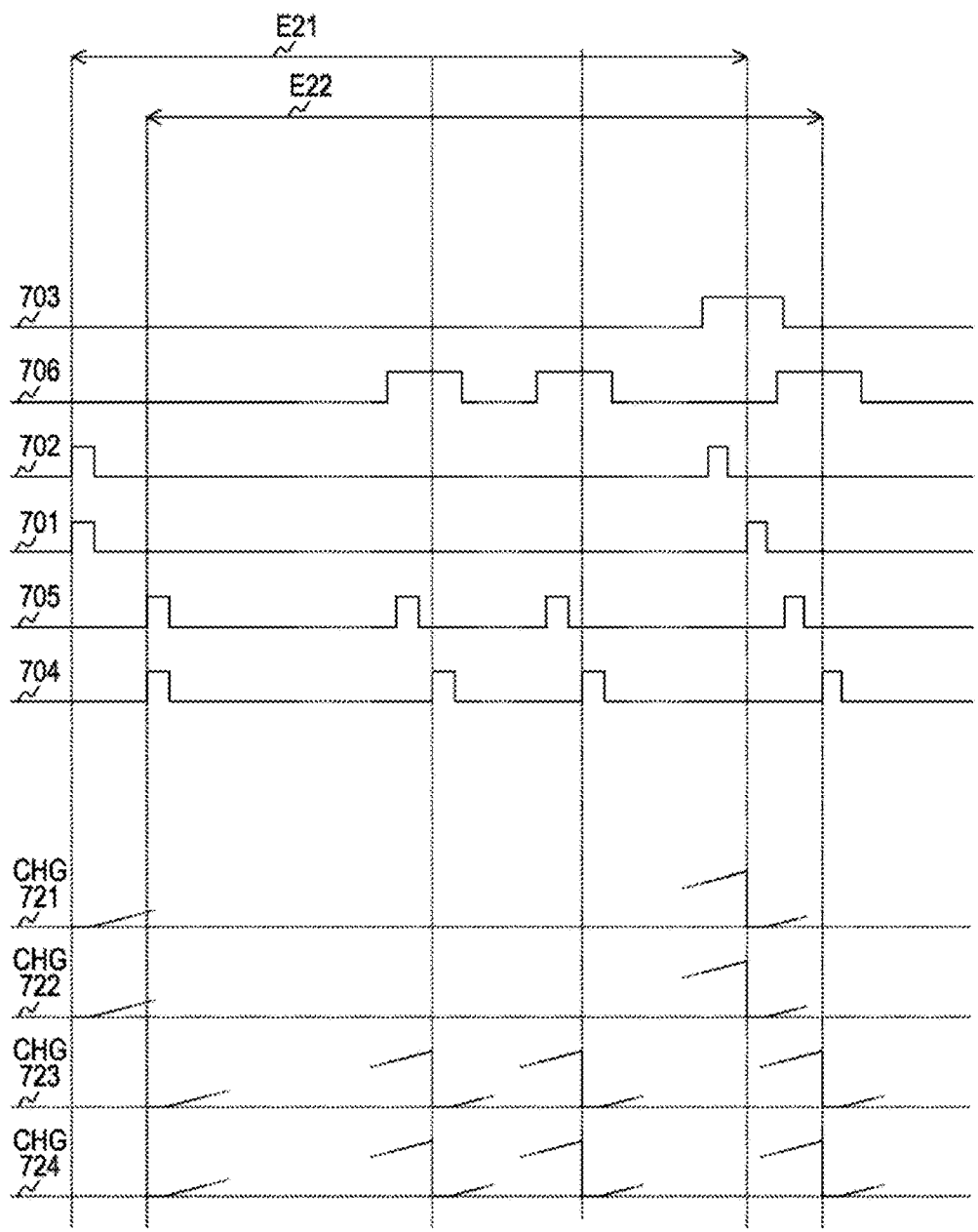
FIG. 35 is a timing chart schematically illustrating control signals as to four pixels of pixels (#11), (#12), (#16), and (#17) shown in FIG. 34, and the way in which charges are stored in each pixel.

FIG. 34 is a diagram schematically illustrating the pixel wiring of the solid-state imaging device for realizing the pixel array shown in FIG. 32. Also, FIG. 35 is a timing chart schematically illustrating control signals as to four pixels of pixels (#11), (#12), (#16), and (#17) shown in FIG. 34, and the way in which charges are stored in each pixel.

Figure 36:
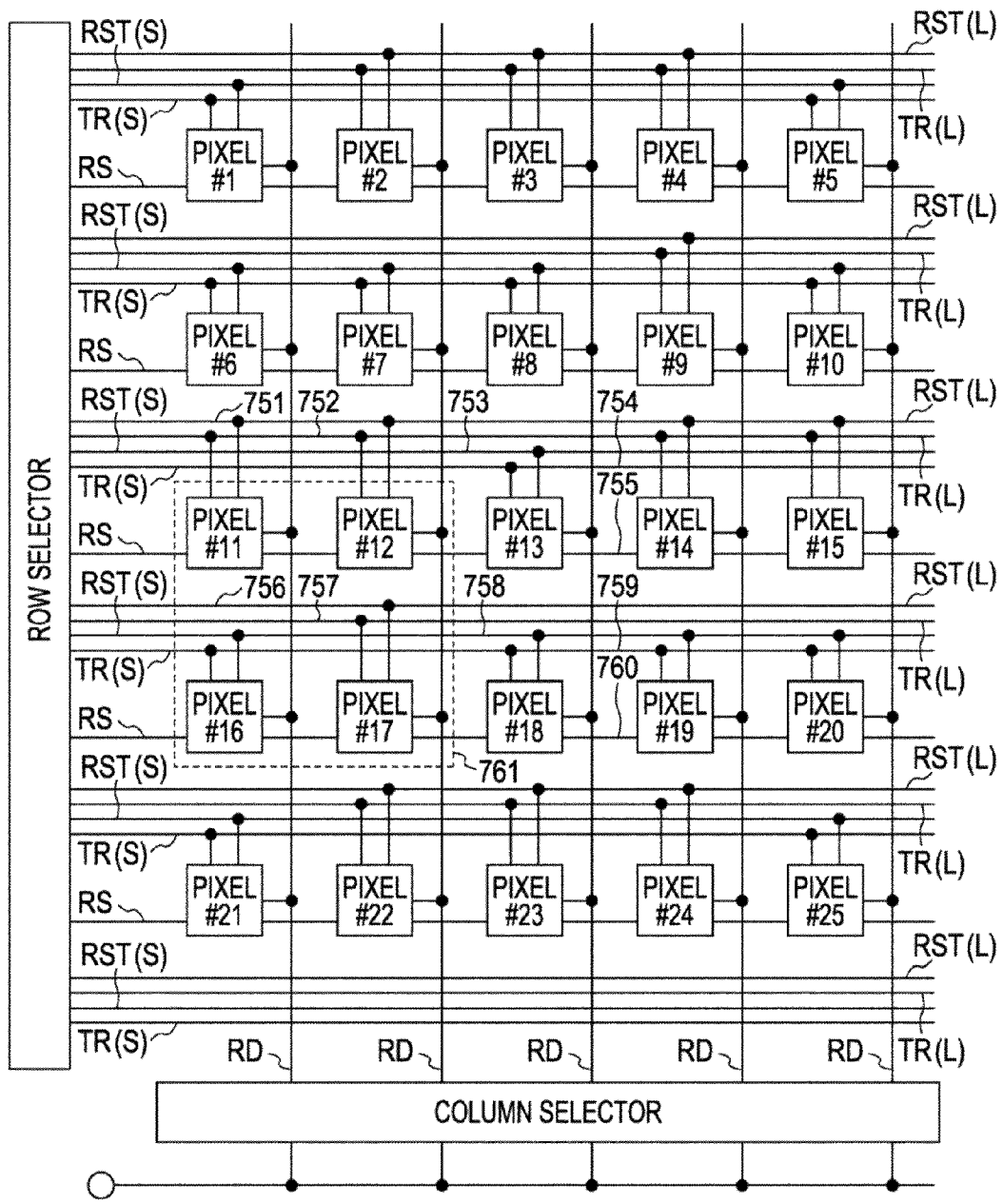
FIG. 36 is a diagram schematically illustrating the pixel wiring of a solid-state imaging device used for realizing the pixel array shown in FIG. 33.

FIG. 36 is a diagram schematically illustrating the pixel wiring of a solid-state imaging device used for realizing the pixel array shown in FIG. 33. Also, FIG. 37 is a timing chart schematically illustrating control signals as to four pixels of pixels (#11), (#12), (#16), and (#17) shown in FIG. 36, and the way in which charges are stored in each pixel. Note that the relation between FIGS. 34 and 35, and the relation between FIGS. 36 and 37, are the same as the relation between FIGS. 3 and 4. Note that with FIGS. 34 and 36, the wiring for controlling the pixels differs from that in FIG. 3 regarding the placement of pixels which perform short-time exposure and long-time exposure. Particularly, with the pixel array shown in FIG. 36, two horizontal lines do not share the same control line, in order to prevent signals from being read out from multiple pixels in the same column at the same timing.

Now, the RGB image synthesizing unit 600 shown in FIG. 31 that has been described here is a modification of the RGB image synthesizing unit 203 shown in FIG. 10, but the placement of each demosaic processing unit may be changed, as with the cases of the RGB image synthesizing units 400 and 500.

Also, in the event of configuring the RGB image synthesizing units 203, 400, 500, and 600 according to the embodiments of the present invention, the array for the color and exposure time of the solid-state imaging device is not restricted to those shown in FIGS. 6, 32, and 33, and other arrays are applicable. Also, the pixels for short-time exposure and for long-time exposure do not have to have the same spectral properties, and may be combined with different spectral properties. In this case, the image processing according to the embodiments of the present invention can be applied by matching the color space by linear matrix transformation or the like following demosaicing.

Also, in the event of using the RGB image synthesizing units according to the embodiments of the present invention, the image processing according to the embodiments of the present invention can be realized for even other than short-time exposure images and long-time exposure images generated by a single solid-state imaging device (imaging sensor). For example, an arrangement may be made wherein two different imaging sensors are used, with one generating short-time exposure images and the other generating long-time exposure images, and the generated images being subjected to the processing of the RGB image synthesizing unit. That is to say, the image processing according to the embodiments of the present invention can be applied to an imaging apparatus having a configuration where multiple imaging sensors are used for obtaining a long-time-exposure image and multiple short-time-exposure images in the same period.

As described above, with the embodiments of the present invention, pixels which continuously expose during a predetermined exposure period and read out at the end, and pixels which expose intermittently during the predetermined exposure period and read out each time, are arrayed and disposed in the imaging plane of the solid-state imaging device 13. Accordingly, exposure periods with different sensitivity can be matched and long-time-exposure images and short-time-exposure images synthesized to generate a high-dynamic-range image. Also, in cases of imaging a scene with a great dynamic range in luminance, an exposure period shorter than the exposure period for imaging a dark subject without noise can be set. Further, short-time-exposure pixels for imaging a bright subject repeat intermittent imaging over the entire period, so information of a moving subject within the predetermined exposure period can be obtained more accurately. Thus, a high-dynamic-range image can be generated by imaging at different sensitivities, and accordingly occurrence of artifacts in moving picture regions due to time lapse between images of different sensitivity, and camera shaking due to long-time exposure, can be reduced.

A structure can be provided wherein horizontal lines of the solid-state imaging device 13 supply both control signals for pixels which expose consecutively during the period and read out at the end, and control signals for pixels which expose intermittently during the period and read out each time. Due to this configuration, the freedom of design of two types of exposure control, and the spatial placement of color, can be improved. Also, supplying the same color signals to two types of control lines when operating enables operations the same as with a normal image sensor.

Also, with the embodiments of the present invention, camera shaking during the exposure period is estimated before synthesizing the long-time-exposure image and short-time-exposure images to generate the high-dynamic-range image, the camera shaking in each of the long-time-exposure image and short-time-exposure images being corrected based on the camera shaking. Thus, correcting camera shaking allows the exposure time for imaging high-dynamic-range images to be reduced.

Also, with the embodiments of the present invention, camera shaking (e.g., temporal change in the affine matrix during exposure period) is estimated by parametric curve format. Using the parametric curve format allows cases wherein the PSF format differs depending on the positions of the image due to rotational components to be handled readily as well. That is to say, problems which have been difficult to deal with the related art which handles camera shaking in the PSF image format (point blurring function) can also be handled.

Also, with the embodiments of the present invention, processing is performed for overlaying the multiple images generated by intermittent short-time-exposure following motion compensation being performed, so noise can be reduced at the same time as correcting the camera shaking of the short-time-exposure images. Thus, gradient continuity can be improved at the time of synthesizing a high-dynamic-range image.

Thus, according to embodiments of the present invention, camera shaking is corrected before synthesizing the short-time-exposure images and the long-time-exposure image into a single image, and the images are synthesized following correction, so a high-dynamic-range image with no camera shaking can be generated.

Also, with the second embodiment of the present invention, conversion is temporarily made from the parametric curve expression to the PSF image expression, and following application of blurring estimation and blurring restoration based on an image according to the related art, conversion is made back from the PSF image expression to the parametric curve expression. This enables even more accurate camera shaking estimation and camera shaking correction.

Note that the camera shaking estimation and camera shaking correction processing according to the embodiments of the present invention can also be applied to mosaic images which are RAW data output of the solid-state imaging device. Also, a synthesizing method may be used wherein the brightness of each of the short-time-exposure images and the long-time-exposure image are matched before synthesizing.

Also, while the above embodiments according to the present invention have been described regarding a case wherein the spectral sensitivity of the pixels of the solid-state imaging device (imaging sensor) are the three primary colors of RGB, pixels having spectral sensitivity other than the three primary colors of RGB may be used, such as pixels having complementary color spectral sensitivity of Y (yellow), C (cyan), M (magenta), or the like, for example.

Also, while the above embodiments according to the present invention have been described regarding a case of an imaging apparatus such as a digital video camera, the embodiments of the present invention may be applied to image processing apparatuses which input moving pictures generated by an imaging apparatus and perform image processing thereof, such as personal computers or the like, for example.

Note that the embodiments of the present invention have been made to illustrate examples to realize the present invention, which has a correspondence relationship with each of features of the present invention, as described above. However, the present invention is not restricted to the above-mentioned embodiments, and various modifications can be made without departing from the essence of the present invention.

Also, the procedures described with the above-mentioned embodiments may be taken as a method having these series of procedures, or may be taken as a program through a recording medium which stores the program thereof to cause a computer to execute these series of procedures. Examples of this recording medium include CD (Compact Disc), MD (Mini-Disc), DVD (Digital Versatile Disk), memory card, and Blu-ray Disc (registered trademark).

The present application contains subject matter related to that disclosed in Japanese Priority Patent Application JP 2008-225483 filed in the Japan Patent Office on Sep. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image processing apparatus comprising:
   a shaking estimating unit configured to:
      estimate shaking information of an image generated within a predetermined period of time by comparing image data extracted from a plurality of short-time-exposure images generated due to intermittent exposure within the predetermined period of time, and
      calculate a parametric curve that represents temporal change of image coordinates due to motion of an imaging apparatus within said predetermined period of time, as calculated shaking information; and
   wherein said shaking estimating unit comprises:
      a calculating unit configured to calculate discrete temporal change of each component of a coordinate trans- formation matrix between images making up said plurality of short-time-exposure images, and a curvilinear fitting unit configured to fit the discrete temporal change of each component of said coordinate transformation matrix into said parametric curve;

a short-time-exposure shaking correcting unit configured to correct shaking of the plurality of short-time-exposure images based on said estimated shaking information;

a long-time-exposure shaking correcting unit configured to correct shaking of a long-time-exposure image generated due to consecutive exposure within said predetermined period of time, wherein the shaking of the long-time-exposure image is corrected based on said estimated shaking information generated by comparing image data extracted from the plurality of short-time-exposure images; and an image synthesizing unit configured to synthesize said corrected short-time-exposure images and said corrected long-time-exposure image.

2. The image processing apparatus according to claim 1, said shaking estimating unit further comprising:

an image shaking correcting unit configured to correct shaking of said short-time-exposure images by aligning pixel positions of said plurality of short-time-exposure images to synthesize the short-time-exposure images based on said calculated shaking information;

a rendering unit configured to generate a point blurring function image at a plurality of target positions on said long-time-exposure images based on said calculated shaking information;

a point blurring function image correcting unit configured to correct said point blurring function image for each of said target positions based on an image adjacent to said target positions of said corrected short-time-exposure images, and an image adjacent to said target positions of said long-time-exposure image; and a shaking information updating unit configured to update said estimated shaking information based on said calculated shaking information between images, said corrected point blurring function image, and said calculated shaking information.

3. The image processing apparatus according to claim 2:

wherein said calculating unit calculates matched points between images of said plurality of short-time-exposure images, thereby calculating said estimated shaking information between images;

and wherein said shaking estimating unit includes a reliable point extracting unit configured to extract a matched point where matching has been obtained from short-time-exposure images of said plurality of short-time-exposure images of said matched points, as a reliable point;

and wherein said image shaking correcting unit aligns the pixel positions of said plurality of short-time-exposure images based on said calculated shaking information regarding a region adjacent to said extracted reliable point to synthesize the short-time-exposure images, thereby correcting the shaking of said short-time-exposure images;

and wherein said rendering unit generates a point blurring function image at the position of said reliable point on said long-time-exposure image based on said calculated shaking information;

and wherein said point blurring function image correcting unit corrects said point blurring function image based on an image adjacent to said reliable point of said corrected short-time-exposure images, and an image adjacent to said reliable point of said long-time-exposure image.

4. The image processing apparatus according to claim 1, wherein said short-time-exposure shaking correcting unit aligns pixel positions of images making up said plurality of short-time-exposure images based on said estimated shaking information to synthesize the plurality of short-time-exposure images, thereby correcting the shaking of said short-time-exposure images.

5. The image processing apparatus according to claim 1, said long-time-exposure shaking correcting unit comprising:

a rendering unit configured to generate point blurring function images at a plurality of target positions on said long-time-exposure image based on said estimated shaking information; and a deconvolution unit configured to subject said long-time-exposure image to a deconvolution process for each of said target positions based on each of said generated point blurring function images.

6. The image processing apparatus according to claim 1, wherein said image synthesizing unit adds a pixel value of said corrected short-time-exposure images and a pixel value of said corrected long-time-exposure image for each pixel, employs the inverse property of synthetic property between incident light intensity and pixel value response property according to short-time exposure, and incident light intensity and pixel value response property according to long-time exposure to correct said pixel values added for each pixel, thereby generating a synthetic image between said corrected short-time-exposure images and said corrected long-time-exposure image.

7. The image processing apparatus according to claim 1:

wherein said short-time-exposure images are mosaic images output from a solid-state imaging device;

and wherein said long-time-exposure image is a mosaic image output from said solid-state imaging device;

and wherein said image synthesizing unit disposes a pixel of said corrected short-time-exposure images, and a pixel of said corrected long-time-exposure image so as to obtain a mosaic image having the same pixel array as the mosaic image output from said solid-state imaging device, thereby executing a demosaic process regarding the mosaic image thereof.

8. An imaging apparatus comprising:

a solid-state imaging device where a first pixel used for generating a long-time-exposure image by consecutive exposure within a predetermined period of time, and a second pixel used for generating a plurality of short-time-exposure images by intermittent exposure within said predetermined period of time are arrayed on the imaging surface;

a shaking estimating unit configured to:

compare image data extracted from the plurality of short-time-exposure images in order to estimate shaking information within said predetermined period of time, and calculate a parametric curve that represents temporal change of image coordinates due to motion of an imaging apparatus within said predetermined period of time, as calculated shaking information, and wherein said shaking estimating unit comprises:

a calculating unit configured to calculate discrete temporal change of each component of a coordinate transformation matrix between images making up said plurality of short-time-exposure images, and a curvilinear fitting unit configured to fit the discrete temporal change of each component of said coordinate transformation matrix into said parametric curve;

a short-time-exposure shaking correcting unit configured to correct shaking of said short-time-exposure images based on said estimated shaking information;

a long-time-exposure shaking correcting unit configured to correct shaking of a long-time-exposure image generated by using said first pixel, wherein the shaking of the long-time-exposure image is corrected based on said estimated shaking information generated by comparing image data extracted from the plurality of short-time-exposure images; and an image synthesizing unit configured to synthesize said corrected short-time-exposure images and said corrected long-time-exposure image.

9. The imaging apparatus according to claim 8, wherein, with said solid-state imaging device, a first pixel line where said first pixels are arrayed in the horizontal direction, and a second pixel line where said second pixels are arrayed in said horizontal direction are alternately disposed in the vertical direction.

10. The imaging apparatus according to claim 9, wherein, with said solid-state imaging device, in order for pixels having first spectral sensitivity to be disposed in a checkered pattern, said pixels having first spectral sensitivity are disposed on said first pixel line and said second pixel line alternately, and in order for pixels having second spectral sensitivity and pixels having third spectral sensitivity to be disposed alternately between said pixels having first spectral sensitivity on said first pixel line and said second pixel line, said pixels having second spectral sensitivity according to said first pixels, and said pixels having second spectral sensitivity according to said second pixels, are arrayed alternately in an oblique direction, and also said pixels having third spectral sensitivity according to said first pixels, and said pixels having third spectral sensitivity according to said second pixels are arrayed alternately in said oblique direction.

11. The imaging apparatus according to claim 8, wherein, with said solid-state imaging device, said first pixels and said second pixels are disposed in a checkered pattern.

12. The imaging apparatus according to claim 11, wherein, with said solid-state imaging device, an array made up of said pixels having first spectral sensitivity, said pixels having second spectral sensitivity, and said pixels having third spectral sensitivity according to said first pixels is a Bayer array inclined obliquely, and an array made up of said pixels having first spectral sensitivity, said pixels having second spectral sensitivity, and said pixels having third spectral sensitivity according to said second pixels is a Bayer array inclined obliquely.

13. The imaging apparatus according to claim 11, wherein, with said solid-state imaging device, on the upper side of a horizontal line made up of said first pixels and said second pixels arrayed alternately in the horizontal direction, a line transfer signal line that supplies a control signal used for executing readout by consecutive exposure within said predetermined period of time in said horizontal direction, and a line rest signal line are disposed and connected to said first pixels included in said horizontal line, and on the lower side of said horizontal line, a line transfer signal line that supplies a control signal used for executing readout sequentially by intermittent exposure within said predetermined period of time in said horizontal direction, and a line rest signal line are disposed and connected to said second pixels included in said horizontal line.

14. The imaging apparatus according to claim 8, wherein, with said solid-state imaging device, a first pixel group where said three first pixels arrayed in the horizontal direction, and said three first pixels arrayed in the vertical direction are connected in a staircase pattern, and a second pixel group where said three second pixels arrayed in the horizontal direction, and said three second pixels arrayed in the vertical direction are connected in a staircase pattern, are disposed alternately in said horizontal direction.

15. The imaging apparatus according to claim 14, wherein, with said solid-state imaging device, the array made up of said pixels having first spectral sensitivity, said pixels having second spectral sensitivity, and said pixels having third spectral sensitivity, is a Bayer array.

16. An image processing method comprising the steps of:
comparing of image data extracted from a plurality of short-time-exposure images generated due to intermittent exposure within a predetermined period of time in order to estimate shaking information of an image generated within the predetermined period of time;
wherein said comparing includes:
calculating a parametric curve that represents temporal change of image coordinates due to motion of an imaging apparatus within said predetermined period of time,
calculating discrete temporal change of each component of a coordinate transformation matrix between images making up said plurality of short-time-exposure images, and
fitting the discrete temporal change of each component of said coordinate transformation matrix into said parametric curve;
correcting of shaking of the plurality of short-time-exposure images generated due to intermittent exposure within said predetermined period of time based on said estimated shaking information;
correcting of shaking of a long-time-exposure image generated due to consecutive exposure within said predetermined period of time, wherein the shaking of the long-time-exposure image is corrected based on said estimated shaking information generated by comparing image data extracted from the plurality of short-time-exposure images; and
synthesizing of said corrected short-time-exposure images and said corrected long-time-exposure image.

17. A non-transitory, computer-readable storage medium storing a program that, when executed by a computer, causes the computer to perform a method, the method comprising:
comparing of image data extracted from a plurality of short-time-exposure images generated due to intermittent exposure within a predetermined period of time in order to estimate shaking information of an image generated within the predetermined period of time;
wherein said comparing includes:
calculating a parametric curve that represents temporal change of image coordinates due to motion of an imaging apparatus within said predetermined period of time,
calculating discrete temporal change of each component of a coordinate transformation matrix between images making up said plurality of short-time-exposure images, and
fitting the discrete temporal change of each component of said coordinate transformation matrix into said parametric curve;
correcting of shaking of the plurality of short-time-exposure images generated due to intermittent exposure within said predetermined period of time based on said estimated shaking information;

correcting of shaking of a long-time-exposure image generated due to consecutive exposure within said predetermined period of time, wherein the shaking of the long-time-exposure image is corrected based on said estimated shaking information generated by comparing image data extracted from the plurality of short-time-exposure images; and synthesizing of said corrected short-time-exposure images and said corrected long-time-exposure image.

* * * * *